(12) United States Patent
O'Hagan et al.

(10) Patent No.: US 6,314,406 B1
(45) Date of Patent: *Nov. 6, 2001

(54) CUSTOMER INFORMATION NETWORK

(75) Inventors: Timothy P. O'Hagan, Akron; Gregory Canda, Tallmadge; James E. Traxler, Bay Village, all of OH (US)

(73) Assignee: Telxon Corporation, Holtsville, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,235

(22) Filed: Aug. 29, 1997

Related U.S. Application Data

(63) Continuation-in-part of application No. 08/770,690, filed on Dec. 19, 1996, and a continuation-in-part of application No. 08/752,301, filed on Nov. 19, 1996, and a continuation-in-part of application No. 08/744,109, filed on Nov. 5, 1996, now Pat. No. 5,821,513, and a continuation-in-part of application No. 08/668,343, filed on Jun. 26, 1996, now Pat. No. 5,821,512.

(51) Int. Cl.$^7$ ..................................................... G60F 17/60
(52) U.S. Cl. ................................. 705/14; 705/26; 705/27; 345/189
(58) Field of Search ................................. 705/1, 14, 26; 235/383, 385, 375, 462; 340/825

(56) References Cited

U.S. PATENT DOCUMENTS

| | | |
|---|---|---|
| 3,959,624 | 5/1976 | Kaslow . |
| 4,323,773 | 4/1982 | Carpenter . |
| 4,345,315 | 8/1982 | Cadotte et al. . |
| 4,415,065 | 11/1983 | Sandstedt . |
| 4,703,423 | 10/1987 | Bado et al. . |
| 4,727,245 | 2/1988 | Dobbins et al. . |
| 4,766,295 | 8/1988 | Davis et al. . |
| 4,882,724 | * 11/1989 | Vela et al. ............................... 705/14 |
| 4,973,952 | 11/1990 | Malec et al. . |
| 5,012,349 | 4/1991 | de Fay . |
| 5,013,387 | 5/1991 | Goodwin et al. . |
| 5,047,614 | 9/1991 | Bianco . |
| 5,185,695 | 2/1993 | Pruchnicki . |
| 5,189,291 | 2/1993 | Siemiatkowski . |
| 5,250,789 | * 10/1993 | Johnsen ................................... 705/14 |

(List continued on next page.)

FOREIGN PATENT DOCUMENTS

| | | |
|---|---|---|
| 2286567 | 2/1994 | (GB) . |
| 0840276 | 2/1996 | (JP) . |
| WO 91/10216 | * 6/1991 | (WO) ............................... G07F/7/06 |

OTHER PUBLICATIONS

SSDS INTER ACT SYSTEMS: SSDS Inc., and Inter-Act Systems implement new "clipless" coupon program in major grocery stores in the Northeast; Business Editors, Sep. 1996.*

Primary Examiner—James P. Trammell
Assistant Examiner—Yehdega Retta
(74) Attorney, Agent, or Firm—Amin & Turocy, LLP

(57) ABSTRACT

A retail customer information system which includes: at least one data processing device including a data storage adapted for selectively storing marketing data in a plurality of data fields. The customer information system also includes a portable transaction computer having a graphical user interface adapted to selectively display icon data representing data stored in the data storage. The portable transaction computer further including a random access memory; and a processor adapted to process instructions disposed in the random access memory. The retail customer information system further including a first data channel adapted for selectively communicating marketing data between the portable transaction computer and the data processing device.

30 Claims, 37 Drawing Sheets

U.S. PATENT DOCUMENTS

| | | | |
|---|---|---|---|
| 5,276,857 | | 1/1994 | Hartung et al. . |
| 5,287,266 | * | 2/1994 | Malec et al. .................. 364/401 |
| 5,288,980 | | 2/1994 | Patel et al. . |
| 5,319,181 | | 6/1994 | Shellhammer et al. . |
| 5,323,098 | | 6/1994 | Hamaguchi et al. . |
| 5,340,971 | | 8/1994 | Rockstein et al. . |
| 5,361,871 | | 11/1994 | Gopta et al. . |
| 5,382,779 | | 1/1995 | Gopta et al. . |
| 5,414,250 | | 5/1995 | Swartz et al. . |
| 5,418,354 | * | 5/1995 | Halling et al. .................. 235/383 |
| 5,424,524 | * | 6/1995 | Ruppert et al. .................. 235/462 |
| 5,448,046 | | 9/1995 | Swartz . |
| 5,481,103 | | 1/1996 | Wang . |
| 5,484,991 | | 1/1996 | Shernan et al. . |
| 5,493,107 | | 2/1996 | Gopta et al. . |
| 5,505,494 | | 4/1996 | Belluci et al. . |
| 5,515,081 | * | 5/1996 | Vasilik .................. 345/189 |
| 5,534,684 | | 7/1996 | Danielson . |
| 5,572,643 | | 11/1996 | Judson . |
| 5,586,237 | | 12/1996 | Baecker et al. . |
| 5,602,377 | | 2/1997 | Beller et al. . |
| 5,630,068 | * | 5/1997 | Vela et al. .................. 705/1 |
| 5,637,851 | | 6/1997 | Swartz et al. . |
| 5,640,002 | * | 6/1997 | Rupper et al. .................. 235/462.46 |
| 5,640,193 | * | 6/1997 | Wellner .................. 348/7 |
| 5,650,800 | * | 7/1997 | Benson .................. 345/173 |
| 5,689,101 | * | 11/1997 | Kikuchi et al. .................. 235/383 |
| 5,708,782 | * | 1/1998 | Larson et al. .................. 395/214 |
| 5,789,728 | * | 6/1999 | Barile et al. .................. 235/462 |
| 5,793,029 | * | 8/1998 | Goodwin, III .................. 235/483 |
| 5,821,512 | * | 10/1998 | O'Hagen et al. .................. 235/383 |
| 5,821,513 | * | 10/1998 | O'Hagan et al. .................. 235/383 |
| 5,822,436 | * | 10/1998 | Rhoads .................. 380/54 |
| 5,841,978 | * | 11/1998 | Rhoads .................. 395/200.47 |
| 5,859,414 | * | 1/1999 | Grimes et al. .................. 235/383 |
| 5,862,270 | * | 1/1999 | Lopresti et al. .................. 382/306 |
| 5,870,716 | * | 2/1999 | Sugiyama et al. .................. 705/26 |
| 5,907,830 | * | 5/1999 | Engel et al. .................. 705/14 |
| 5,918,211 | * | 6/1999 | Sloane .................. 705/16 |
| 6,084,528 | * | 7/2000 | Beach et al. .................. 340/825.35 |

* cited by examiner

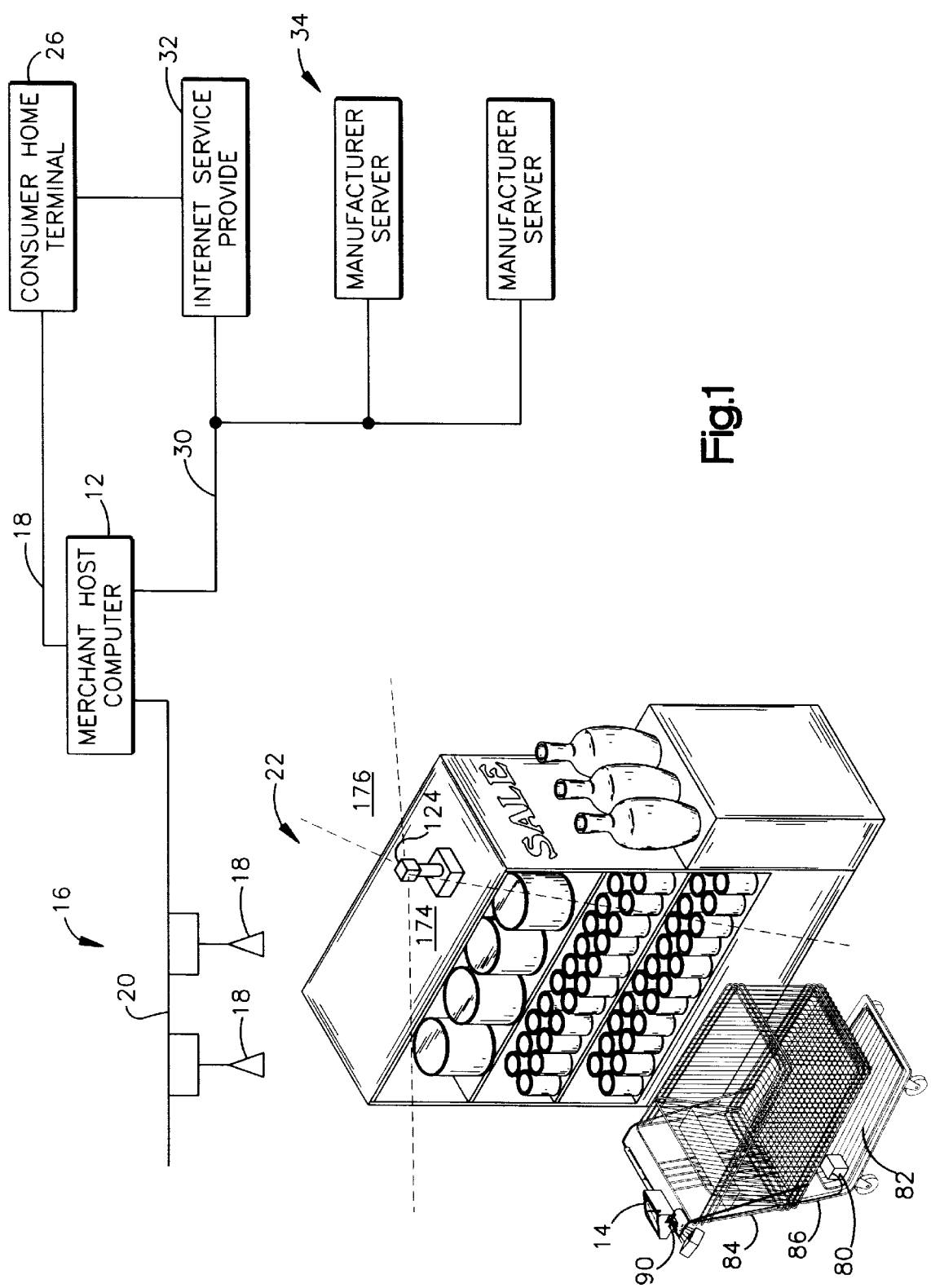

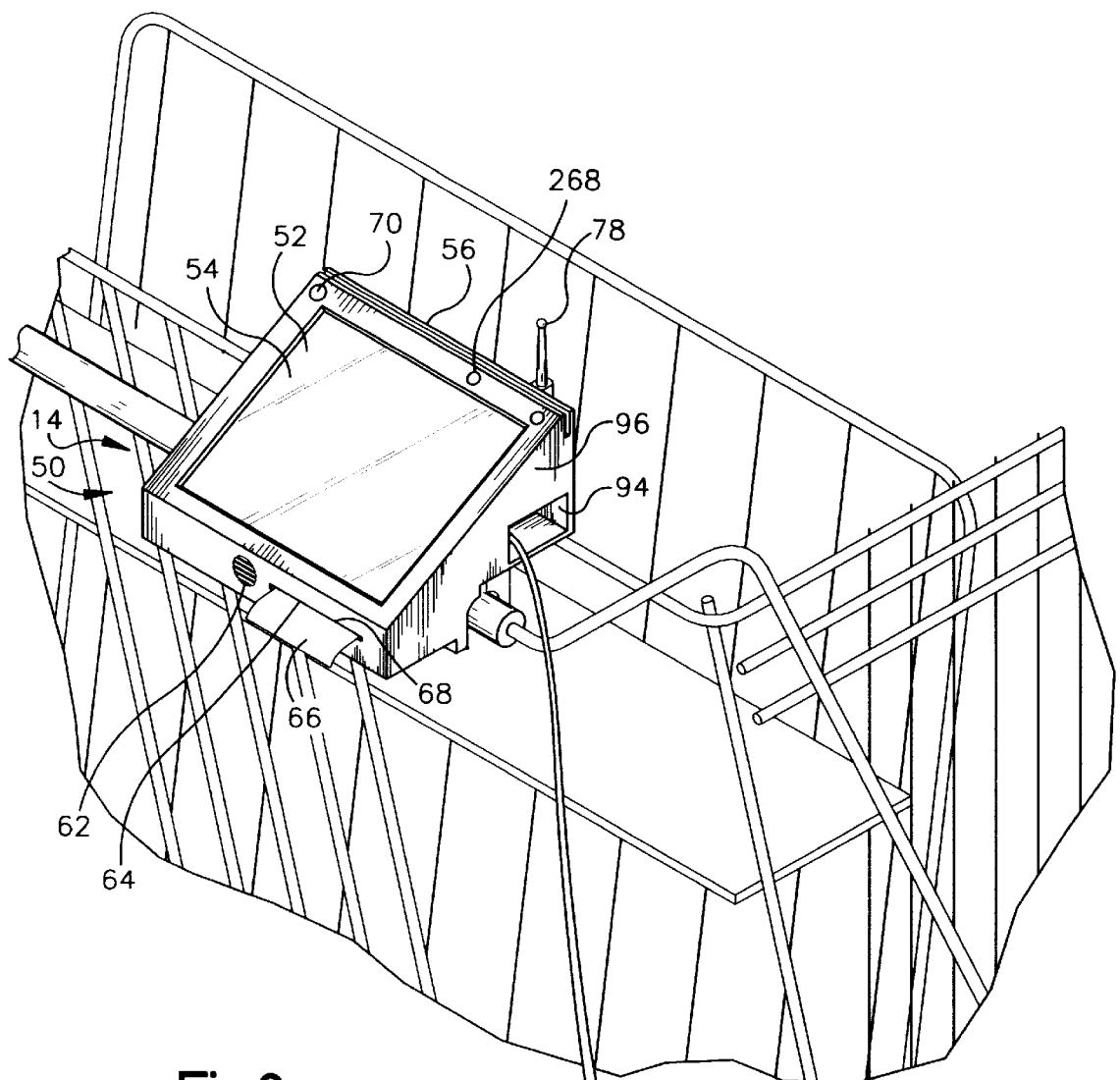
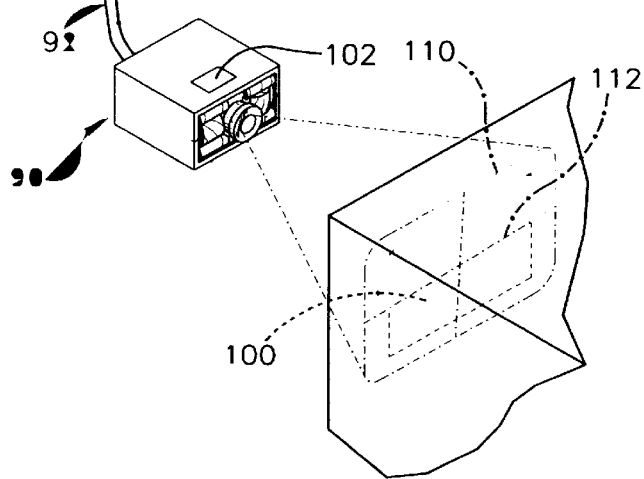
Fig.2a

| SERVER | | |
|---|---|---|
| HTML PAGE STORAGE | DATA BASE STORAGE | PROGRAMS |
| INTRODUCTORY PAGE<br>INVALID I.D. PAGE<br>MAIN MENU PAGE<br>GENERIC CONFIRM PURCHASE PAGE<br>CUSTOM CONFIRM PURCHASE PAGES<br>LOCATION BASED ADVERTISEMENT PAGES<br>RECIPE FORM PAGE<br>STORE MAP PAGE<br>CHECK-OUT PAGE<br>PREPARED ORDER ITEM SUB-MENU PAGE<br>ICON PAGE<br>COUPON PAGE<br>SHOPPING LIST PAGE | UPC<br>PRICE<br>DESCRIPTION<br>RECIPES<br>STORE LOCATIONS<br>COUPON INFO.<br>ICON INFO.<br>EXPIRATION INFO. | CUSTOMER VERIFICATION PROGRAM<br>BAR CODE READ PROGRAM<br>LOCATION SEARCH PROGRAM<br>RECIPE SEARCH PROGRAM<br>RUNNING TOTAL PROGRAM<br>CHECK-OUT PROGRAM<br>CUSTOMER LOCATION PROGRAM<br>COUPON STATE PROGRAM<br>WEB BROWSER STATE PROGRAM<br>SHOPPING LIST STATE PROGRAM<br>"COOKIE" PROGRAM |

| PRODUCT DESCRIPTION | UPC CODE | PRICE QUOTE | PRICE TERMINATION DATE |
|---|---|---|---|
| $PD_1$ | $UPC_1$ | $PQ_1$ | $PTD_1$ |
| • | • | • | • |
| • | • | • | • |
| • | • | • | • |
| • | • | • | • |
| • | • | • | • |
| • | • | • | • |
| $PD_z$ | $UPC_z$ | $PQ_z$ | $PTD_z$ |

← 976 COUPON FILE-JOHN DOE

32 OZ. TIDE     $0.75 OFF EXPIRES 10-31-97

CAKE MIX     $0.50 OFF BY 9-31-97; $0.25 OFF BY 12-31-97

GREEN BEANS     $0.25 OFF DOUBLE COUPON ON SUNDAYS

CAT FOOD     $0.25 OFF $0.50 OFF WITH LITTER

MILK     $0.25 OFF EXPIRES 4-30-97

← 974

CAT

COUPON

Fig. 31

CUSTOMER'S COUPN FILE — 978a

| COMPANY PRODUCT I.D. | COUPON VALUE (FIXED PRICE OR FORMULA) | EXPIRES | BITMAP FOR ICON | MFR. WEBSITE | PRODUCT DATA | DATE USED |
|---|---|---|---|---|---|---|
| 978b | 978c | 978d | 978f | 978g | 978h | 978j |

Fig. 32

CUSTOMER'S SHOPPING LIST/PURCHASE LOG FILE — 980a

| PRODUCT I.D. | TIME ADDED TO LIST | PRICE QUOTE | VALID UNTIL | TIME REMOVED FROM LIST | PURCHASE TIME (MERCHANT HOST ONLY) | PURCHASE PRICE (MERCHANT HOST ONLY) | BITMAP FOR ICON |
|---|---|---|---|---|---|---|---|
| 980b | 980c | 980d | 980f | 980g | 980h | 980j | 980k |

Fig. 33

PRICE LOOK UP TABLE — 982a

| UPC | PRODUCT I.D. | BITMAP FOR ICON (MERCHANT ONLY) | PRICE | VALID UNTIL |
|---|---|---|---|---|
| 982b | 982c | 982d | 982f | 982g |

Fig. 34

| PRODUCT SELECTED | UPC CODE | PRICE QUOTE | VALID UNTIL |
|---|---|---|---|
| $PS_1$ | $UPC_1$ | $PQ_1$ | $VU_1$ |
| • | • | • | • |
| • | • | • | • |
| • | • | • | • |
| • | • | • | • |
| • | • | • | • |
| • | • | • | • |
| $PS_z$ | $UPC_z$ | $PQ_z$ | $VU_z$ |

| PRODUCT IDENTIFICATION | COUPON VALUE | EXPIRES | BITMAP |
|---|---|---|---|
| $PI_1$ | $CV_1$ | $E_1$ | $BM_1$ |
| • | • | • | • |
| • | • | • | • |
| • | • | • | • |
| • | • | • | • |
| • | • | • | • |
| • | • | • | • |
| $PI_z$ | $CV_z$ | $E_z$ | $BM_z$ |

986

CUSTOMER INFORMATION NETWORK

CROSS REFERENCE TO RELATED APPLICATIONS

This application is a continuation-in-part of copending U.S. patent application Ser. No. 08/668,343 filed Jun. 26, 1996; U.S. patent, application Ser. No. 08/744,109 filed Nov. 5, 1996; U.S. patent application Ser. No. 08/752,301 filed Nov. 19, 1996; and U.S. patent application Ser. No. 08/770,690 filed Dec. 19, 1996.

TECHNICAL FIELD

This invention relates generally to a customer information network for a retail store and, more particularly, relates to a system for optically extracting indicia from a coupon and employing the extracted indicia within the network to facilitate customer shopping, manufacturer marketing and store efficiency.

BACKGROUND OF THE INVENTION

In most grocery stores and some retail stores, the typical procedure for obtaining products for many people involves clipping coupons at home, taking the coupons to the store, picking up a shopping cart, moving the cart up aisle after aisle looking for desired products and then taking the cart of found products to the cashier for payment. The procedure is repeated by many on a weekly basis oftentimes taking up a large portion of the day.

In order for a manufacturer to give a discount on a product, it may issue a printed coupon to be redeemed by the manufacturer via a retailer or provide for a rebate to be redeemed directly by the manufacturer. Coupons have been supplied through the mail or newspapers, on the product itself, or printed at a retail outlet. However, the newspapers and leaflets of coupons mailed or delivered to homes is the most common channel for delivering coupons to customers. In order to obtain a discount on a product, the printed coupon must be presented to the checkout station. The printed coupons redeemed by the retailer are sent to a clearing house who in turn separates the coupons and bills the respective manufacturer for reimbursement of the retailer.

This paper system has proven itself to be somewhat of a nuisance to customers as well as the retailers. The customers have to manually take scissors and clip desired coupons, sort them by product categories (e.g., detergents, canned foods, cereals, frozen foods, toiletries, etc.) in order to efficiently find the products when at the store. Furthermore, the customers have to periodically look through their many coupons to remove expired ones. On the other side, the retailers have to expend considerable man hours sorting coupons by manufacturer for redemption as well as monitoring for expired coupons at the check out station. However, most coupons go through a clearing house for sorting where the clearing house pays the retailer cash for the estimated value of the coupons, the difference between the estimated and actual amount be later credited or debited. Nevertheless, the retailer must still monitor for expired coupons and deal with collecting the coupons and sending them to the clearing-house for payment.

Another problem associated with the paper coupon system is misredemption. For example, misredemption may occur through a consumer who expects a cooperative grocer to accept coupons without purchasing the item. In other instances, it may be the checkout clerk who brings coupons to work, puts them in the cash drawer and takes cash out. In some cases the retail store manager may pump substantial quantities of coupons in the redemption stream to reduce his "shrink". Misredemption of coupons is estimated to be as high as 20%–30%.

Another problem associated with typical shopping is finding the desired products. Oftentimes, customers will walk up and down the aisles in a hap hazard manner looking for items. For example, a customer may first look for a particular brand of cookies in aisle 5, then move on to aisle 12 to find cereal only to have to return back to aisle 5 to find jelly. This process is repeated for many and possibly most customers, who cannot possibly remember where every product desired is located in the store. Moreover, even if the locations of the products are known, if the customer's coupons are not arranged according to categories and locations within the store, this may also force the customer to go back and forth between the aisles. If the coupons are not sorted and the customer does not know the locations then the problem is compounded.

Furthermore, manufacturers are faced with the problem of limited shelf space for advertisements of products within the stores due to the many numbers of products competing for valuable shelf space. The manufacturer desires to entice as many customers as possible to buy its products. This is done typically through advertisements and coupons. However, the paper coupon system is plagued with the aforementioned problems and the limited shelf space makes product marketing ever more difficult.

Additionally, the checkout system of grocery stores has problems. When the shopper is finished, he or she proceeds to the cash register/data terminal in a check out area of the store. The cash register/data terminal typically includes a hand held and/or fixed mounted dataform reading and decoding assembly (i.e., "dataform reader"). If a fixed mounted dataform reader is being used, a store clerk presents each item's bar code dataform to the dataform reader, that is, the dataform is moved along an upper surface of a glass window under which the dataform reader is mounted. If a hand held dataform reader is being used, the clerk "aims" the reader at each item's dataform as the item moves past the terminal. In each case, a "good read and decode" signal will be actuated after each successful dataform read and decode to notify the clerk that the item's dataform was successfully read and decoded. The signal may be an audible tone or "beep". If no "beep" is heard, the clerk will repeat the reading process for the item until successful or else manually key enter the product.

A number of problems are associated with such a cash register/data terminal system including: (1) inconvenience for customers waiting in long check-out lines; (2) use of valuable floor space for the check-out area when a number of cash registers/data terminals are utilized; (3) human resource costs for attending to the checkout procedure; and (4) product prices have to be either printed on labels affixed to each item marked on shelving adjacent the item's shelf space so a customer knows the price of the item.

Thus what is needed is an improved shopping system which overcomes the above-mentioned problems associated with a paper coupon system; the difficulty associated with finding products in the store; the problems manufacturers face with advertising to customers; and the problems associated with conventional check-out procedures.

SUMMARY OF THE INVENTION

The present invention relates to a customer information network for a retail store. The present invention provides for a network where a host computer controls the main operations of the system. The host computer is connected via the Internet or other network system to computers of customers and manufacturers. The store also includes a sub-network within the store which includes wireless access points, mobile terminals including bar code scanners tied thereto.

The present invention provides for a system which avoids many of the problems associated with a paper coupon system; the difficulty associated with finding products in the store; the problems manufacturers face with advertising to customers; and the problems associated with conventional check-out procedures.

One particular way the present invention accomplishes the above is by allowing for a customer to scan coupons at home with a scanner coupled to the customer's home computer. The customer is able to generate a coupon list by scanning the coupons into the home customer computer. The customer can access the stores host computer via the Internet, direct dial or any other suitable manner for connecting to the host computer. The customer can generate a shopping list through the host computer and apply the coupon list against the shopping list. After the shopping list and coupon list are completed, the customer can go to the store at any convenient time.

At the store, the customer can use a shopping cart with a portable computing device (i.e., mobile terminal) attached thereto. The customer can identify himself/herself to the portable computing device. Once identified, the portable computer can assist the customer through the store for efficient shopping. The host computer via the access points and portable computer can guide the customer through the store in the most efficient manner. For example, the host computer can generate a map and protocol for the user to find the products desired without having to go back and forth through the store.

Furthermore, the customer can scan the products found at the store with the bar code scanner attached to the portable computing device before placing the products in the cart. This aspect along with the avoidance of handing over paper coupons at checkout substantially reduces the length of time necessary at the check-out line.

The portable computing device can include a speaker and a graphic interface which manufacturers can use to advertise their products as well as provide information about its products to the customer. The retailers may also use the portable computing device to provide the customer with recipes, store advertisements, nutritional information, etc. Icons can be displayed by the graphical interface to promote the various products. The present invention can also be used to provide an easy link for the customer to the manufacturer's web site for product information.

The present invention may also be used by retailers and manufacturers to obtain demographics regarding product trends, customer behavior, purchasing activities, etc.

The present invention provides for avoiding many of the hassles associated with conventional coupon systems as well as retail and grocery store systems. The present invention makes shopping easier, faster and more enjoyable for customers. The present invention also reduces the costs associated with misredemption of coupons. Furthermore, the present invention provides a system which affords manufacturers with a way to better market their products and provide product information to customers at the customer's point of decision.

According to one specific aspect of the present invention, a retail customer information system is provided which includes: at least one data processing device including a data storage adapted for selectively storing marketing data in a plurality of data fields; a portable transaction computer including: a graphical user interface adapted to selectively display icon data representing data stored in the data storage; a random access memory; and a processor adapted to process instructions disposed in the random access memory; and a first data channel adapted for selectively communicating marketing data between the portable transaction computer and the data processing device.

Another aspect of the invention includes: a shopping system network, including: a host computer coupleable to a network; a customer computer coupleable to the network; an optical scanner coupleable to the customer computer; and a coupon including graphical indicia thereon and optically identifiable indicia thereon; wherein a customer can scan the coupon with the optical scanner to provide the customer computer with the optically identifiable indicia which is processed by the customer computer to generate first data which is provided via the network to the host computer, the first data being used by the host computer to facilitate the customer's shopping.

According to another aspect of the present invention, a coupon for use in a computerized shopping system is provided, including: paper having optically identifiable indicia printed thereon, the optically identifiable indicia including encoded bitmap data for generating a bitmap image for display on the graphical user interface.

In accordance with still another aspect of the present invention, a shopping system network is provided, including: a host computer coupleable to a network, the host computer storing a product list in a host computer memory; a client computer communicatively coupleable to the host computer via the network; wherein a customer can generate a customer shopping list from the product list.

To the accomplishment of the foregoing and related ends, the invention, then, comprises the features hereinafter fully described and particularly pointed out in the claims. The following description and annexed drawings set forth in detail certain illustrative embodiments of the invention. These embodiments are indicative, however, of but a few of the various ways in which the principles of the invention may be employed.

Other objects, advantages and novel features of the invention will become apparent from the following detailed description of the invention when considered in conjunction with the drawings.

BRIEF DESCRIPTION OF THE DRAWINGS

FIG. 1 is a block diagram of a customer information system and perspective view of a portion of a retail store utilizing the customer information system in accordance with the present invention;

FIG. 2a is a perspective view of the customer information terminal as mounted on the shopping cart with a dataform reader of the device being employed in a presentation mode;

FIG. 3 is a view, partly in section and partly in top plan, of the retractable, tethered dataform reader of the customer information terminal of FIG. 2a;

FIG. 4 is a view, partly in section and partly in elevation, of the customer information terminal of FIG. 2a;

FIG. 12 is a table of programs and data stored at the host computer and/or customer computer in accordance with the present invention;

FIG. 29 is a partial table representative of a product list in accordance with the present invention;

FIG. 30 is an HTML page representation of a coupon file in accordance with the present invention;

FIG. 31 is a packet format for a customer coupon file in accordance with the present invention;

FIG. 32 is a packet format for a customer shopping list/purchase log file in accordance with the present invention;

FIG. 33 is a packet format for a price lookup table in accordance with the present invention;

FIG. 34 is a partial table representative of a shopping list in accordance with the present invention;

FIG. 35 is a partial table representative of a coupon list in accordance with the present invention;

DETAILED DESCRIPTION OF THE PREFERRED EMBODIMENT

Figure 2B:
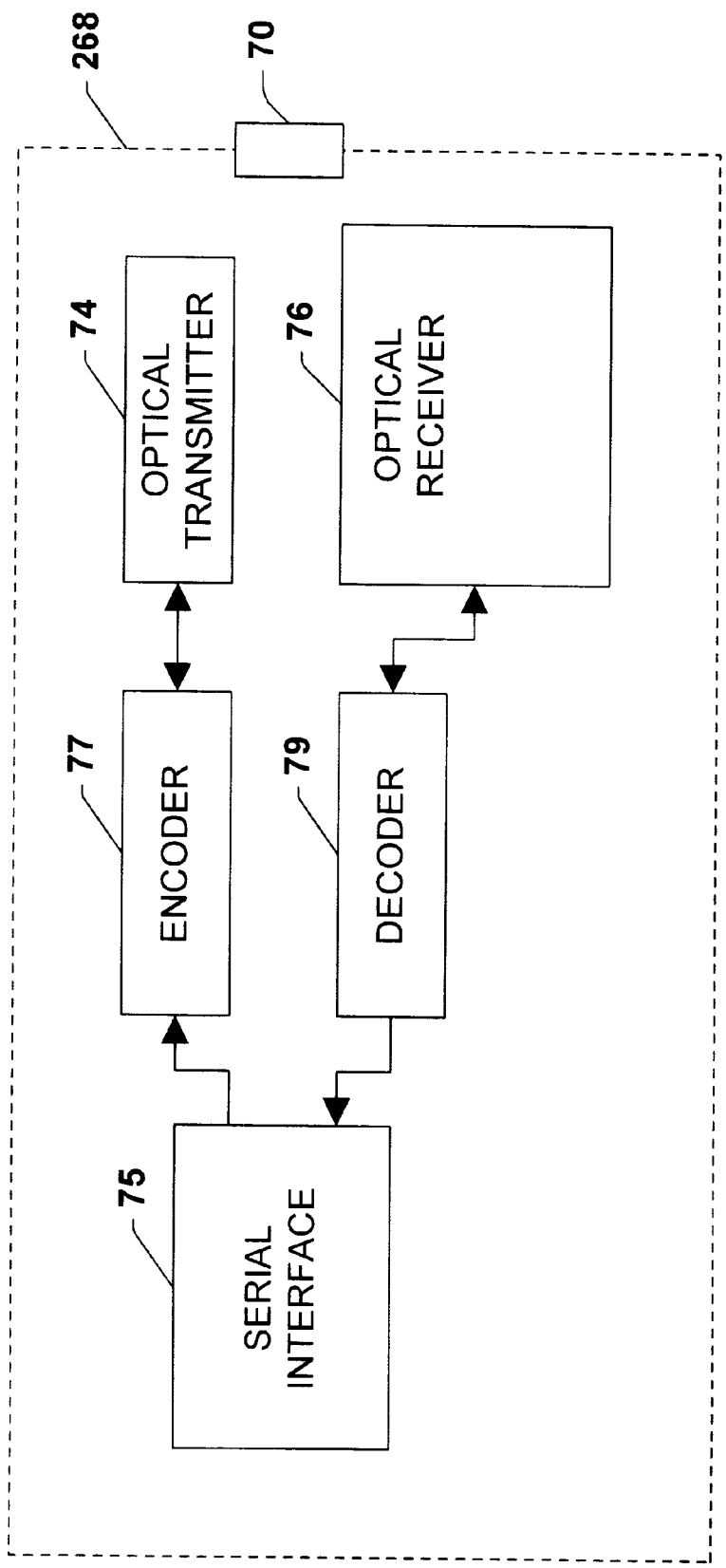
FIG. 2b is a block diagram of an optical device in accordance with the present invention.

Referring now to the drawings which are for purposes of illustrating the preferred embodiment of the invention only and not for purposes of limiting same. In the drawings, like reference numerals are used to refer to like elements throughout.

A customer information network 10 in accordance with a preferred aspect of this invention is represented in FIG. 1. Such a network would be installed for use in connection with a retail or grocery store, for example, where bar codes are read by a customer to rapidly input product and coupon data to facilitate throughout the shopping experience. The customer information network generally comprises a merchant's host computer 12, an in-store portable transaction computer (PTC) 14, a wireless local area network 16 including a plurality of access points 18, and a wired backbone 20 for communicating data between the host 12 and the PTC 14. The terms "portable transaction computer (PTC)" and "customer information terminal (CIT)" are used interchangeably throughout the specification and claims. An infrared portable transaction computer (IR PTC) position detection system 22 including a plurality of IR transmitters 24 generating a unique signature pattern which is detected by an IR receiver on PTC 14 when the PTC 14 is located within range of the transmitter 24 and a customer's home terminal (CHT) 26 is connecteable to the host computer 12 via a data channel 28. The data channel 28 will typically be either a direct dial modem connection 28 or an internet connection 30 through an internet service provider (ISP) 32. The network 10 may also include a plurality of manufacturer's servers 34, each corresponding to the manufacturer of a product available at the merchant's store. Each manufacturer's server is communicatively coupled to the merchant's host 12 via the internet 30.

The present invention advantageously makes use of standard Internet protocols including TCP/IP and HTTP. TCP/IP is a common transport layer protocol used by a worldwide network of computers. HTTP is a known application protocol that provides users access to files (which can be in different formats such as text, graphics, images, sound, video, etc.) using a standard page description language known as Hypertext Markup Language (HTML). Known HTML web browsers allow for graphical user interface (GUI) based access to HTML documents accessible on servers communicatively linked to the client. These documents are commonly referred to as "web pages".

Before discussing the operation of the network 1 0 in detail, a description of each component will be discussed. FIG. 2a shows a perspective view of a first embodiment of a customer information terminal (CIT) 14 in accordance with the present invention. The CIT 14 is removably mountable to a shopping cart. The CIT 14 includes a housing 50 which is preferably made of metal, high strength plastic, or the like. Protruding from the bottom side of the housing 50 are mounting clips (not shown). The mounting clips afford for firmly mounting the CIT 14 to a shopping cart. Of course, it will be appreciated that the CIT 14 may be mounted in any of a variety of manners suitable for preventing dislodgement of the CIT 14 from a desired location. The housing 50 is adapted for easy disassembly to accommodate repair and replacement of parts such as batteries or lights for example.

The CIT 14 includes a display 52 such as a liquid crystal display (LCD) or the like. As is conventional, the display 52 functions to display data or other information relating to ordinary operation of the CIT 14. For example, software operating on the CIT 14 may provide for display pricing information, inventory detail, etc. to a user on display 52. Additionally, the display 52 may display a variety of functions that are executable by the CIT 14. In the preferred embodiment, the display 52 displays graphics based alphanumerical information such as for example the price of a product. The display 52 also provides for the display of graphics such as icons representative of particular products, for example. As will be discussed in greater detail below, the display 52 is controlled by electronic circuitry within the CIT 14.

The CIT 14 further includes an operator input device 54 in the form of an integrated contact panel overlaying the display 52 which enables a user to enter data, information, function commands, etc. as is conventional. For example, the user may input information via virtual key buttons.

The CIT 14 also includes a speaker 62 for providing audial information to a customer, a printer system 64 advantageously disposed within the housing 50, for discharging printed paper 66 through a slot 68 in the housing 50, an antenna 78 for wireless communicating information with an RF access point 18, and an IR transceiver 268 for communicating information with an IR access point.

Turning now to FIG. 2b, IR transceiver 268 includes an optical window 70 for passing optical encoded information (e.g., infrared signals) from another device. An optical transmitter 74 and an optical receiver 76 are positioned to transmit and receive data through the window 70, respectively. In the preferred embodiment, the optical transmitter 74 includes an emitter diode and the optical receiver 76 includes a detector diode. Transceiver 268 is selected to communicate with optical transceivers 124 (FIG. 1) positioned throughout the store in the ceiling or on top of gondolas. The detector diode is preferably provided with a narrow band color filter adapted to suppress incident radiation at all other wavelengths than those selected for the transmission.

The transceiver 268 is oriented so that its axes of reception and transmission are aligned (e.g., pointing upwardly toward transceiver 124) in order to optimize communications with the transceiver 124.

The transceiver 268 preferably is coupled to the CIT processor via a programmable serial interface device (SID) 75 such as a 16550 or 16450 UART (universal asynchronous receiver and transmitter) from National Semiconductor. Technically equivalent interface devices include but are not limited to universal synchronous and asynchronous receivers and transmitters (USARTs), asynchronous communications interface adapters (ACIAs), serial input/output (SIO) devices, data link controllers, multiple protocol communications controllers and serial communications controllers.

Figure 5:
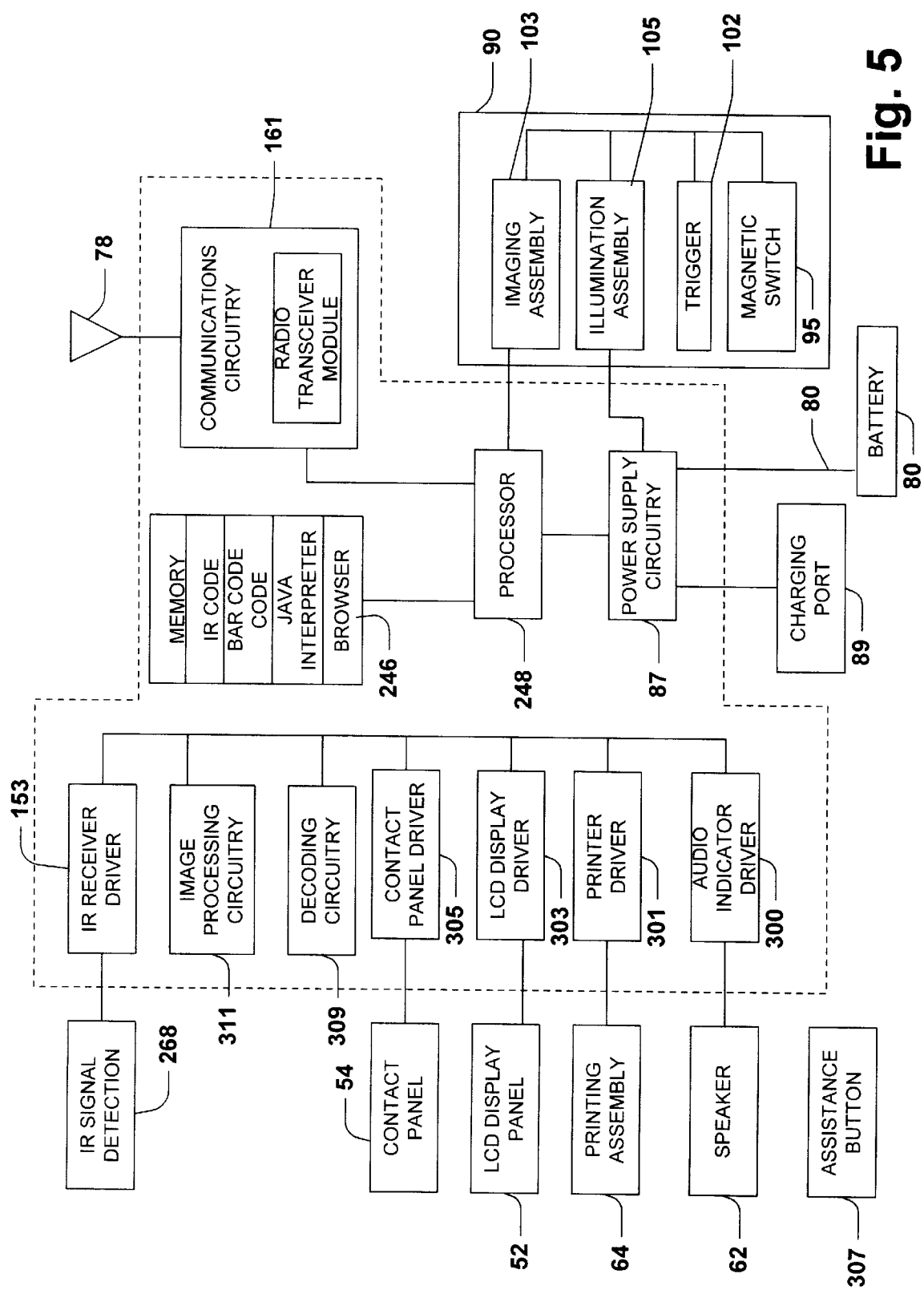
FIG. 5 is a schematic representation of selected electronic modules and circuitry of the customer information terminal in accordance with the present invention.

The serial interface device 75 receives data (typically in parallel format) from the CIT processor through a serial output location and transmits an equivalent serial bit stream to an encoder 77. The encoder 77 transforms the bits into electrical pulses that occupy less than the full bit time and passes them to the optical transmitter 74 (e.g., infrared transmitter). The optical transmitter 74 transforms the electrical pulses into infrared light pulses for example and broadcasts the light pulses at a selected baud rate. The receiving side of the optical device 72 includes the optical receiver 76 (e.g., an IR receiver) that receives similar light pulses from a transmitter from an another device and transforms them into electrical pulses. The optical receiver 76 passes these electrical pulses to a decoder 79 for decoding the electrical pulses into a serial bit stream. The decoder 79 in turn routes the bit stream to a serial input location on the serial interface device 75 for communication to a CIT processor 248 (FIG. 5). The optical device 72 preferably operates in half-duplex mode (ite., with only the optical transmitter 74 or optical receiver 76 active at any given time) in order to prevent the optical device 72 from receiving the data it transmits. However, it will be appreciated that with additional shielding, the optical device 72 could be operated in full-duplex mode (i.e., both the optical transmitter 74 and the optical receiver 76 simultaneously active).

It will be appreciated that the serial interface 75 may include or be coupled to a programmable baud rate generator (not shown) for transmitting the serial bit stream at selectable baud rates. The serial interface 75 also may include an SID clock (not shown) that runs at a multiple of the baud rate so as to clock the encoder 77 and decoder 79. Accordingly, an operator of the host 12 could selectably control the optical transmission rate.

As can be seen in FIG. 1, a high capacity battery 80 which is mounted in a case disposed on a bottom rack 82 of the shopping cart 84 powers the CIT 14. The battery 80 preferably uses lead-acid technology because of its low cost, high energy capacity and lack of memory effect. The weight associated with a lead-acid battery is not a concern because it is mounted on the cart 84. A typical 6 volt, three cell lead-acid battery, such as the type used on a motorcycle, has an energy capacity sufficient to power the CIT 14 for a time period in excess of 24 hours. A power lead 86 connects the battery 80 to power circuitry (shown schematically in FIG. 5) in the CIT 14 which controls converting battery power to appropriate electrical parameters for operating the various components of CIT 14.

The power circuitry 87 also includes charging circuitry and an external power supply port 89 for connecting external power supply for charging the battery. It will be appreciated that other suitable power systems, such as a photovoltaic system or hybridized power system may also advantageously be employed. Further, alternative shopping carts, such as motor-drive carts for the physically impaired, will have their own power plant which can be utilized to supply sufficient power for the CIT 14.

Turning back to FIG. 2a, the CIT 14 includes a dataform reader 90 which is retractably tethered or attached to the CIT 14 with an electric cable 92. The dataform reader 90 is adapted to operate in at least two modes: a) a hand held mode; and b) a presentation mode. The hand held mode of operation is represented in FIG. 2a, wherein the reader 90 is removed by the customer from an opening 94 in a side 96 of the housing 50 of CIT 14.

When supported in the opening 94, the reader 90 extends slightly beyond the side of the housing 50 so that the customer can easily grasp a front portion of the reader 90 and slide it out of the opening 94. The customer moves the reader 90 to a dataform 100 of an item so desired to be purchased or priced by the customer. The customer activates a suitable selector, such as depressing a trigger 102 to actuate an imaging assembly 103 (FIG. 5) and an illumination assembly 105 (FIG. 5) of the reader 90. The illumination assembly 105 advantageously provides a uniform illumination pattern that substantially corresponds to an imaging area or field of view 110 of the imaging assembly 105 and additionally generates a more intense cross hair illumination pattern 112 to aid the customer in positioning the reader 90 so that the dataform 100 of an item is properly within the imaging area of the reader 90.

The uniform illumination pattern and cross hair aiming pattern are rapidly alternated between off and on states, such that one is off while the other is on. This alternation of illumination patterns avoids the difficulty of having to decode a captured dataform image which has intense cross hair illumination patterns imposed thereon. The alternation of the illumination and cross hair patterns is rapid enough that it appears to the customer that the cross hair aiming pattern is continuously on.

While keeping the trigger 102 depressed, the customer aims the cross hair pattern 112 at a center of the dataform 100. The customer moves the reader 90 toward the item until an audible tone or "beep" is emitted by the speaker 62 indicating the dataform 100 has been successfully read and decoded. The item's price, product name or description and product size will appear on the display 52 (this functionality will be discussed in more detail later). After the "beep" is heard, the reader 90 is returned to the opening 94 and slid into the housing 50. It should be appreciated that the cable could be replaced by standard RF or IR wireless communication techniques.

In the presentation mode of operation shown in FIG. 1, the reader 90 is disposed in the housing opening 94 and the customer reads a dataform 100 affixed to an item by moving the item to the reader 90. While the reader 90 remains in the housing opening 94, a magnetic switch enclosed in a back portion of a reader module housing of the reader 90 is turned on by a magnet positioned in the opening 94. Actuation of the magnetic switch causes the imaging assembly and the illumination assembly to remain actuated. Thus, the reader 90 is continuously able to read a dataform when it is disposed in the opening 94. When a "beep" is heard, the customer knows that the dataform 100 has been successfully imaged and decoded.

In this presentation mode, the illumination pattern is continuously on and the cross hair illumination pattern is deactivated since properly "aiming" the reader 90 is not a concern. A customer will typically pass an item by the reader to read a code much like a cashier passes an item over a common countertop scanner. The hand held mode is advantageously used when an item on a shelf is too large or too clumsy to move from the shelf or if the customer just wishes to check a price without removing the item from the shelf. The presentation mode is advantageously employed when a selected item is smaller and more easily handled.

Figure 3:
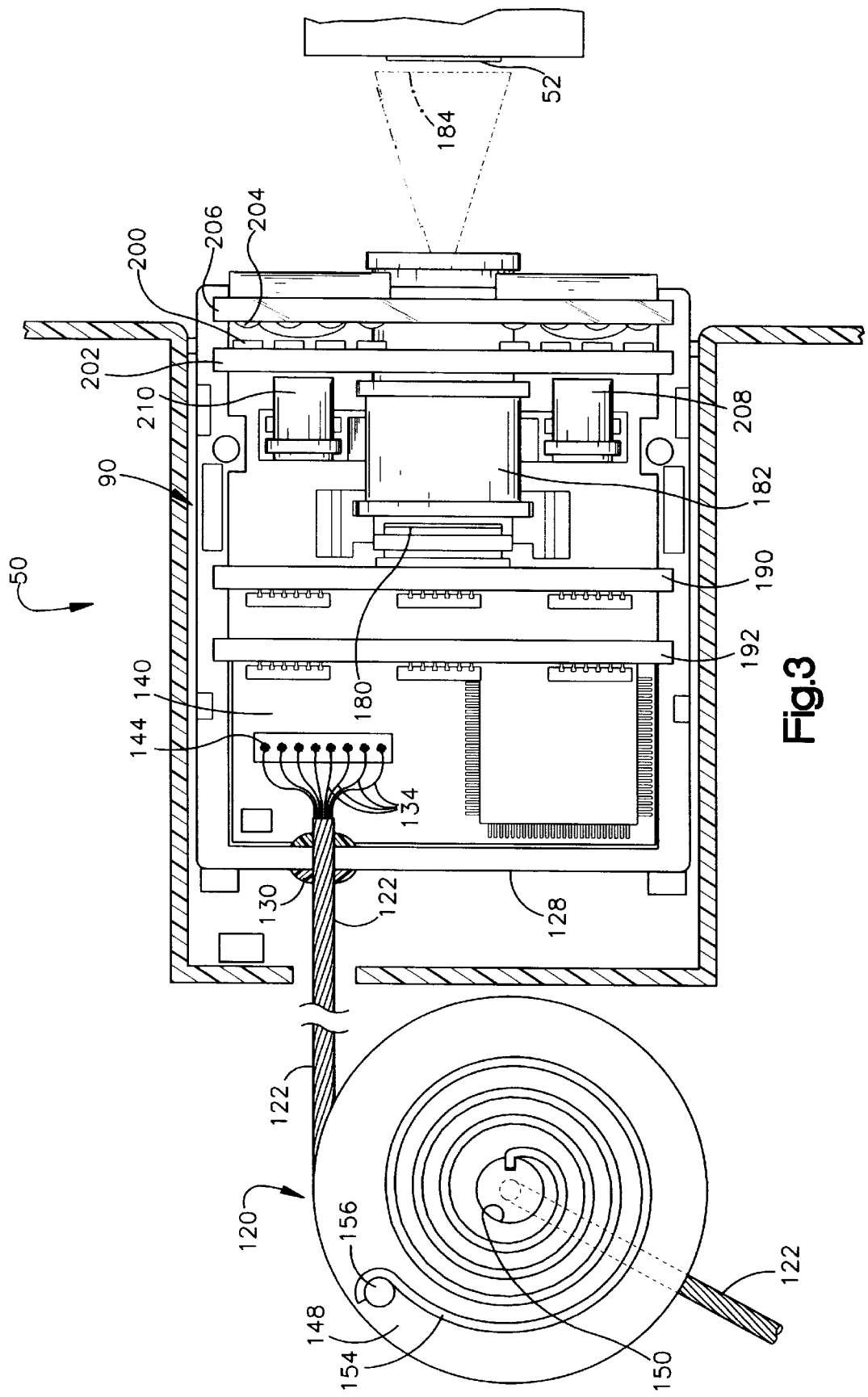

FIG. 3 is a cut-away view of the reader 90 and a portion of the CIT 14 in the region of the opening 94 showing more details of a recoil or cable retraction mechanism 120 of the dataform reader 90. The reader module housing 50 is a modular unit that includes a top half and a mating bottom half. Only the bottom half of the reader housing is shown in FIG. 3 so that the internal components of the reader 90 are visible. The reader 90 is connected to the housing 50 with cable 122. The cable 122 includes the plurality of conductors for: a) coupling operating power to the reader 90; and b) coupling the data signal on a control board to the reader 90. The cable 122 is secured to the module housing 128 of the reader with a clamping grommet 130 to prevent the reader 90 from being physically separated from the cable 122. To further secure the reader 90 to the cable 122, a knot (not shown) may be tied in the cable just inside the reader housing 128. The plurality of conductors 134 are electrically coupled to a printed circuit board 140 within the reader housing 128 by a connector 144. It should be appreciated that the reader and common RF/IR circuitry could be used to replace the cable.

The CIT 14 is advantageously weather-proofed to accommodate its being periodically exposed to the elements during periods of exposure, such as while in the parking lot. Within the housing 50, the cable 122 is wrapped around a recoil spool 148. The recoil spool 148 spins about a center pin 150 of the spool. The pin 150 is a hollow cylinder such that the cable 122 may be threaded through the pin 150 and connected to circuitry within the housing 50. A spirally wound bias spring 154 is secured to join to the pin 150 at the center of the recoil spool 148 and to the spring tab 156 at the perimeter of the recoil spool 148 to bias the spool 148 in a counter clockwise direction (as viewed in FIG. 3). This arrangement keeps the cable 122 under tension when the reader 90 is removed from the house opening 94. The edge formed by the housing wall and the side wall 96 is rounded to avoid wearing an outer surface of the cable 122.

The reader 90 preferably utilizes a two-dimensional imaging assembly. The imaging assembly includes a two-dimensional photo sensor 180 and an optic assembly supported in a lens housing or shroud 182 for focusing an image of the dataform 100 in the field of view 184 onto the photo sensor array 180. Conventionally available circuitry on printed circuit boards 190, 192 and 140 operate to sequentially read out charges accumulating on photosensors of the photo sensor array 180, generate an analog composite video signal, store a digital representation of a captured image, and decode the captured image to generate the decoded data signal. At least a portion of this image capture, image processing, and decoding circuitry may be implemented in code executed by a processor on the printed circuit board.

The illumination assembly of the reader 90 includes four sets of illumination light emitting diodes ("LEDs") 200, which are surface mounted in the preferred embodiment and positioned on a printed circuit board 202 (only two sets of the four sets of four illumination LEDs are seen in FIG. 3). The illumination LED's direct illumination through corresponding aligned lens portions 204 of a lens array 206 towards the imaging field of view 184. Two targeting LEDs 208, 210 operate to direct illumination through aligned apertures in board 210 and through aligned lens portion in the lens array 206 and generate the cross hair illumination pattern in the field of view 184 to assist the operator in relatively positioning the reader 90 and the dataform 100. As noted above, the cross hair illumination pattern is only generated when the reader 90 is used in the hand held mode. A more detailed description of the components of a suitable two dimensional imaging assembly for a hand held dataform reader and its operation can be found in U.S. patent application Ser. No. 08/609,344, filed Mar. 1, 1996, and entitled PORTABLE DATA COLLECTION DEVICE WITH LED TARGETING AND ILLUMINATION ASSEMBLY, the contents of which are incorporated herein in its entirety by reference.

Figure 4:
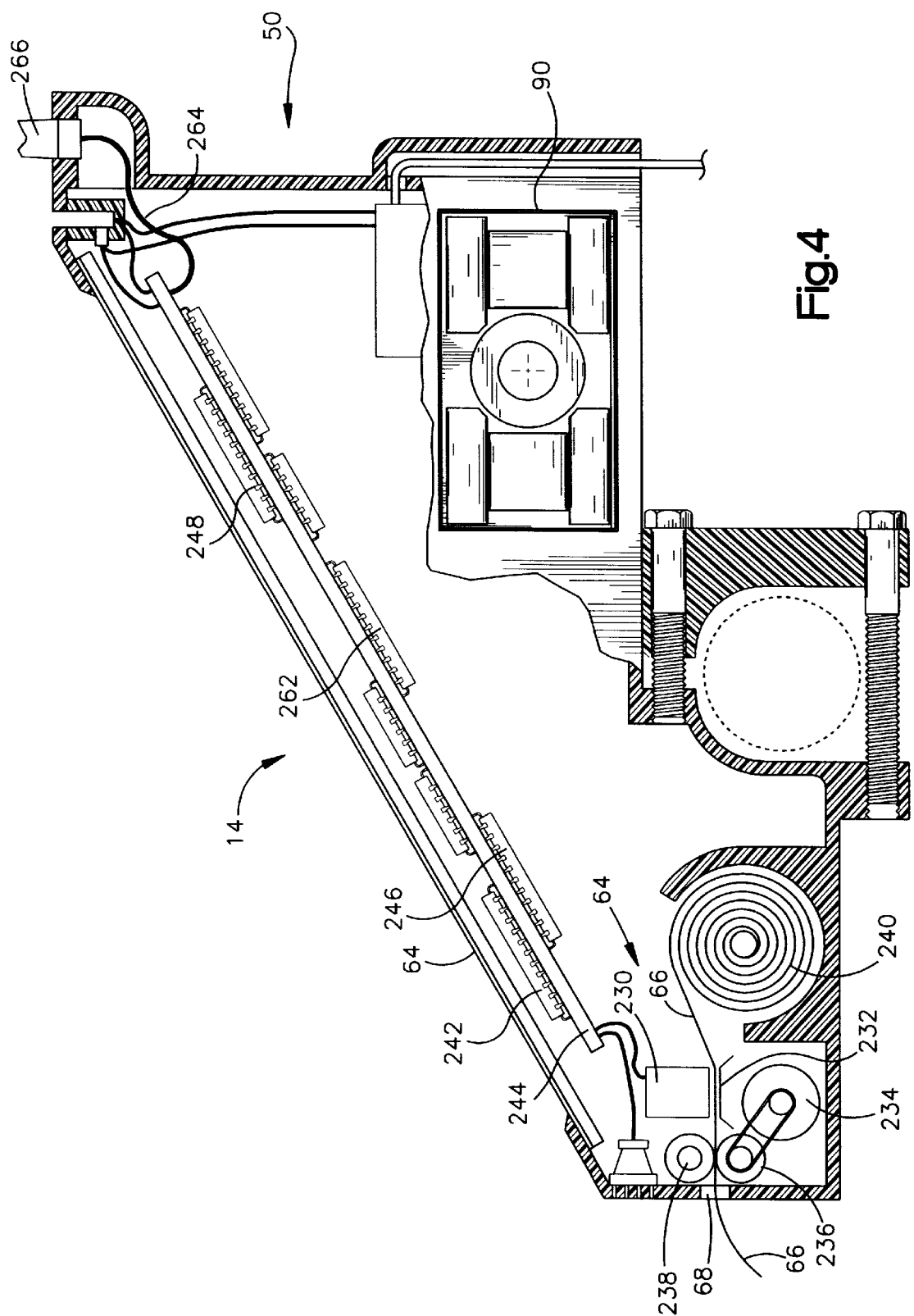

Referring now to FIG. 4, a printing assembly 64 is shown comprised of a thermal printer which functions to print out a paper receipt 66 for the customer at the completion of a shopping session or a recipe for an item. The printing assembly 64 discharges the receipt or the recipe printout through a slot shaped opening 68 in an upright front surface of the housing 50. The thermal printer assembly 64 includes a thermal printhead 230 and an opposing platen 232 to position the paper 66 against the printhead 230. A motor 234 drives a feed roller 236. The feed roller 236 operates in conjunction with an idler roller 238 to draw paper 66 from a paper roll 240 past the printhead 230 and feed the receipt 66 or recipe printout 66 out of the slot shaped opening 68 in the housing 50. Printer driver circuitry 242 for operating the printer assembly components is mounted on the control printed circuit board 244 disposed in the housing 50. At least a portion of the circuitry 242 is suitable embodied in code stored in a memory 246 represented by a memory chip and executed by the processor 248, both on printed circuit board 244. Thermal printing assemblies including these components are commonly available. It should be appreciated that the cost of the printer could be saved by placing common printers at convenient locations within the store. The CIT 14 would transmit data via the RF network 16 to a chosen common printer. The common printer will typically be chosen based on the location of the terminal within the store as determined by the location detection system.

The user interactive display screen 64 suitably includes a liquid crystal display ("LCD") panel and an overlying touch sensitive resistive contact panel as is commonly known. However, it will be appreciated that any variety of video display terminals, such as thin film transistor (active or passive), may suitably be used. Circuitry for operating the display panel and the contact panel includes LCD driver circuitry and contact panel driver circuitry on control board 244. The circuitry for operating the LCD display and contact panels may, at least in part, be implemented in software stored in the memory 246 and executed by the processor 248.

The housing 50 also supports the speaker 62 which is mounted behind a grated opening in the housing 50. The speaker 62 is driven by audio indicator driver circuitry mounted on the control printed circuit board 244 and provides audio feedback suitably in the form of a ½ second "beep" to the customer to indicate a successful bar code dataform read and decode. The terminal 14 is secured to the cart pushing handle. The clamping assembly includes adjustable clamp and an accurate clamping surface of the housing 50. Two sets of two threaded bolts (not shown) suitably extend between the clamp and threaded openings in the housing 50 to secure the adjustable clamp to the housing 50. When the two sets of threaded bolts are tightened, the housing 50 is secured to the pushing handle of the cart.

Referring briefly to FIG. 5, in the preferred embodiment the CIT 14 includes a RF transceiver 161 for communication with access point 18 and thereby communication with the host computer 12 via a wireless local area network 16. Each access point 18 includes a RF transceiver for wireless communication with a customer terminal 14 located within the cell. An appropriate access point is the Aironet 640 and appropriate RF circuitry for customer terminal 14 includes the Aironet 025, both available from Aironet Wireless Communications, Inc. of Akron, Ohio. Other acceptable wireless networks include any spread spectrum networks operating in accordance with IEEE802.11 Standard or infrared communication networks.

Referring back to FIG. 4, the spread spectrum radio communications circuitry 161 may be embodied in a PCMCIA card 262 mounted on the printed circuit board 244. An antenna lead 264 connects the communications circuitry to an antenna mast 266 extending through an opening in the upper surface of the housing 50. Alternatively, the antenna mast 266 is suitably disposed inside the housing 50.

Referring yet again to FIGS. 1 and 2, the infrared transceiver 268 is located on the top portion of the upper surface of the customer information terminal 14. The receiver 268 detects the signature illumination pattern generated by each of a plurality of infrared transmitters 124 positioned throughout the store. It is anticipated that these transmitters 124 will be placed on top shelving or in the ceiling such that the signature pattern is detectable only within a predetermined area of the store 174 and 176. Detection of a particular signature pattern indicates that the CIT 14 is within the predetermined zone of the store. Each emitter modulates the IR illumination source on and off in a distinctive 1/0 pattern. The infrared transceiver 268 includes a photo detector which generates an analog waveform in accordance with the distinctive illumination pattern which, based on thresholding, can easily be decoded into the signature pattern of ones and zeros in the IR receiver driver. Alternatively, any position locator, such as a transponder based system, may suitably be substituted for the above-detailed zone-based system and still accomplish the position detection.

FIG. 5 is a block diagram of customer terminal 14. The customer terminal 14 includes a processor 248 which is responsible for controlling the general operation of the CIT 14. The processor 248 is programmed to control and operate the various components within the CIT 14 in order to carry out the various functions described herein. The processor or CPU 248 can be any of a plurality of processors, such as the p24T, Pentium 50/75, Pentium 60/90, and Pentium 66/100, Pentium PRO and Pentium 2, and other similar and compatible processors. The manner in which the processor 248 can be programmed to carry out the functions relating to the present invention will be readily apparent to those having ordinary skill in the art based on the description provided herein. Coupled to the processor 248 is power supply circuitry 87 which is responsible for delivering power to the CIT 14. As mentioned above, the power circuitry 87 also includes charging circuitry and an external power supply port 89 for connecting external power supply for charging the battery 80.

The reader 90 is also coupled to the processor 248. The reader 90 includes an imaging assembly 103, an illumination assembly 105, a trigger 102 and a magnetic switch 95 the operations of which have been described above. As noted above, the reader 90 is adapted for reading dataforms, namely in the way of two-dimensional bar codes.

The speaker 62 is tied to the processor 248 via an audio driver 300. The speaker 62 serves to provide the customer with audial information as is conventional. The LCD display 52 and the contact panel 54 are connected to and controlled by the processor 248 via display driver circuit 303 and contact panel driver 305, respectively.

A memory 246 tied to the processor 248 is also included in the CIT 14 for storing program code executed by the processor 248 for carrying out operating functions of the CIT 14 as described herein. The memory 246 also serves as a storage medium for temporarily storing information such as pricing information, advertisements, inventory or the like received from or intended to be transmitted to the access points 18 and/or host computer 12. The memory 246 is adapted to store a complete set of the information to be displayed. According to a preferred embodiment, the memory 246 has sufficient capacity to store multiple sets of information, and the processor 248 could include a program for alternating or cycling between various sets of display information. This feature enables the display 52 to show rolling, scrolling or animation effects. Furthermore, the memory 246 will include information such that the processor 246 can effect IR coding and decoding; bar code decoding; a JAVA interpreter, a web browser, etc.

IR signal detection circuitry 72 is also coupled to the processor 246 via an IR receiver driver 153. Image processing circuitry 311 and decoding circuitry 309 are also coupled to the processor 246. The operation of such circuitry is well known in the art and thus further discussion related thereto has been omitted for sake of brevity.

Figure 6:
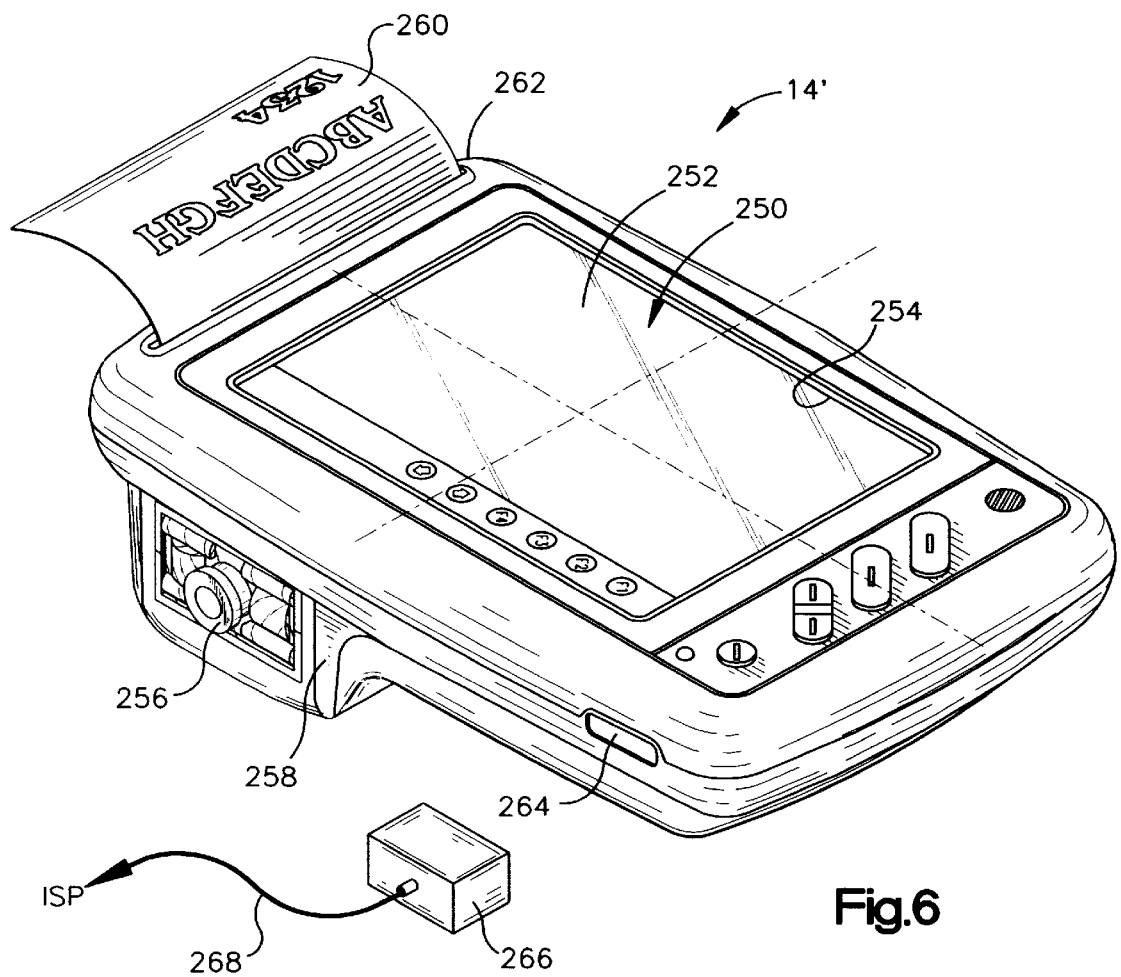
FIGS. 6–8 are perspective views of another embodiment of a customer information terminal in accordance with the present invention.
Figure 7:
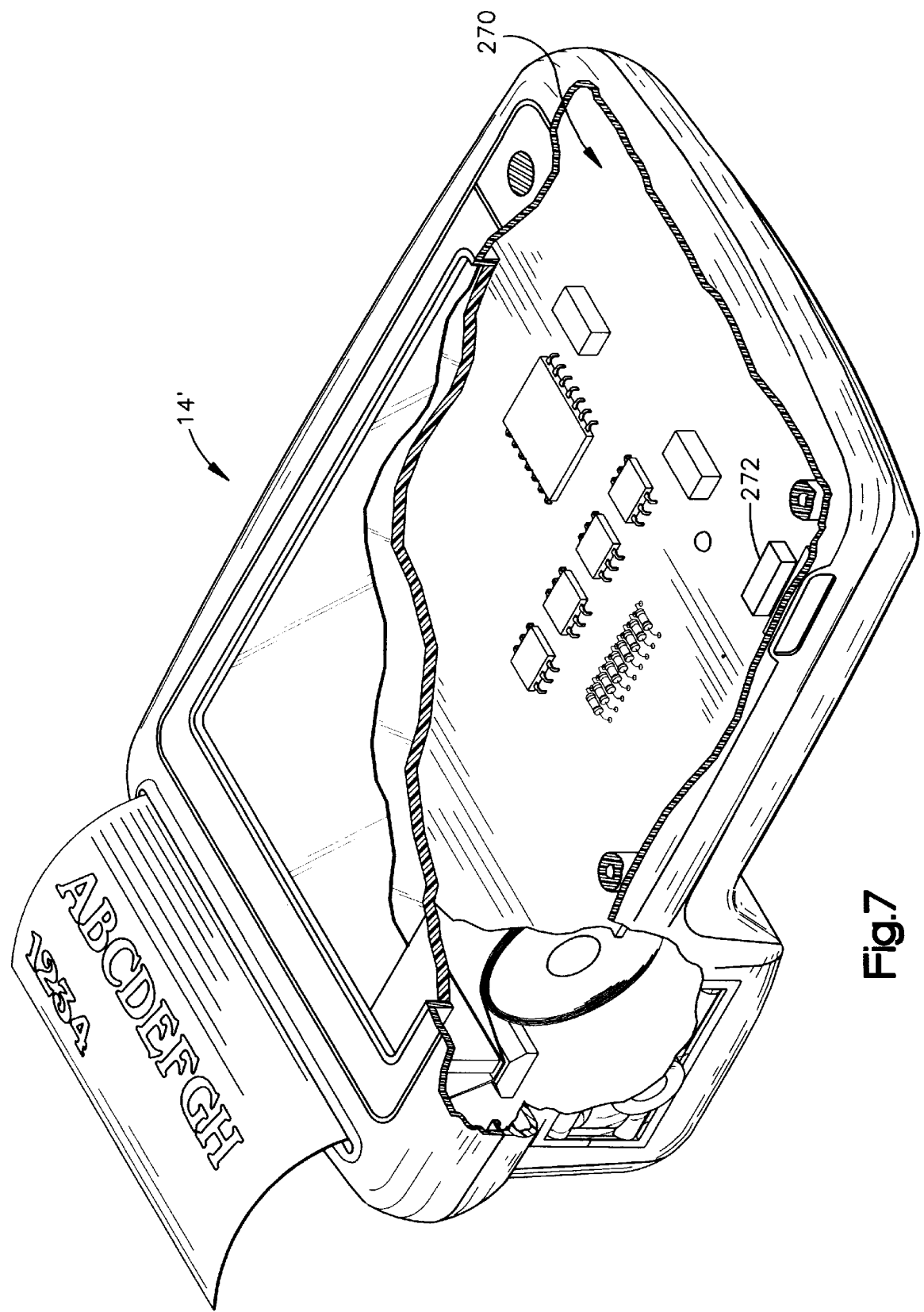
Figure 8:
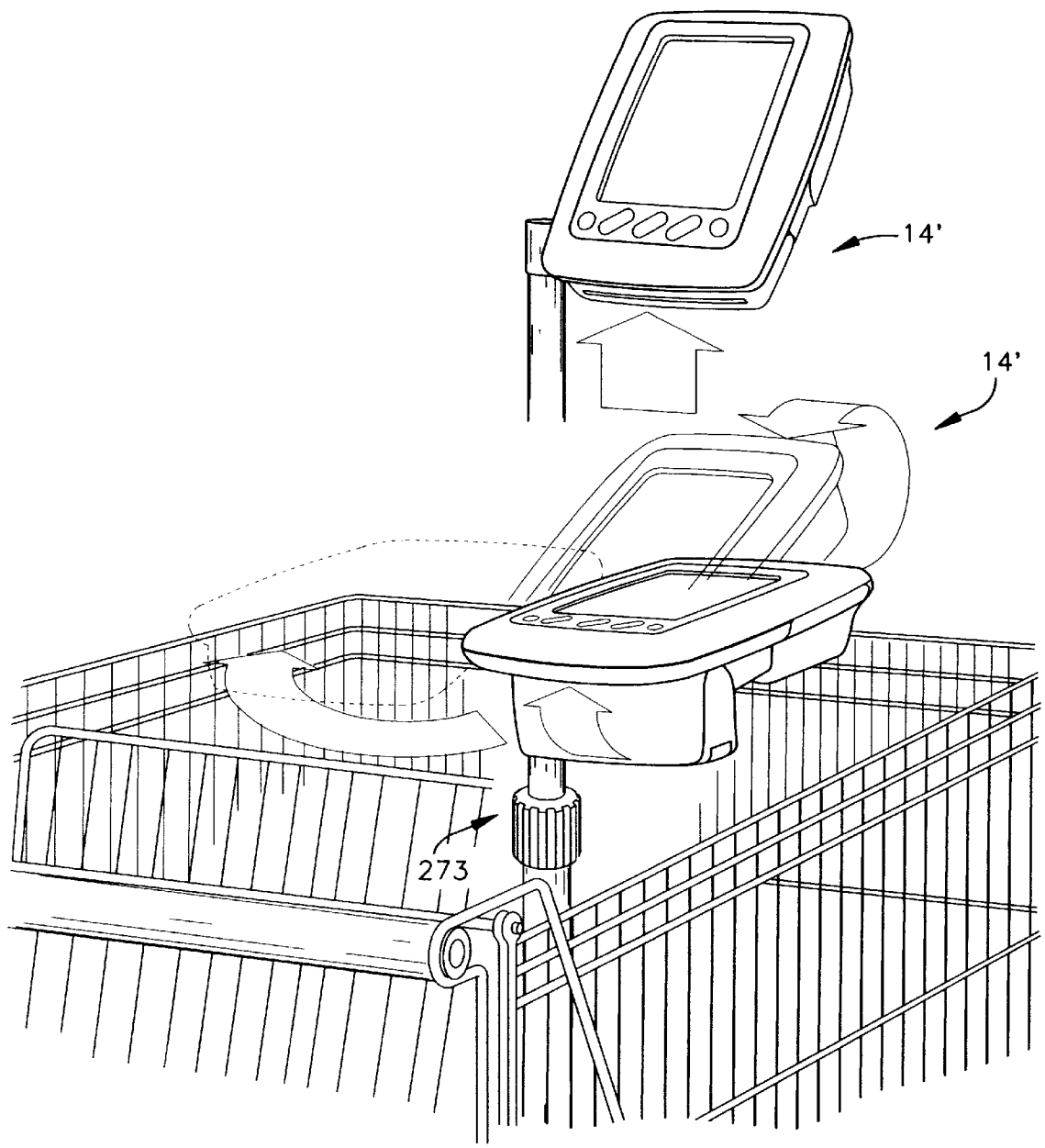

FIGS. 6–8 shown an alternate embodiment of the CIT 14' which is removably seated in a docking system on the shopping cart 84. The CIT 14' includes an interactive display screen 250 which suitably includes a liquid crystal display screen 252 with an overlaying or integrated contact panel 254. A bar code reader 256 of construction, suitably similar to that described above, is mounted within the housing 258. A printer system advantageously integrated in the housing 258, and is suitably of similar construction to that described with reference to the CIT 14 described above. The printer (not shown) discharges paper 260 through a slot shaped opening 262 in the housing 258. It should be appreciated that this device is architecturally the same as CIT 14, however, it is physically constructed for removably mounting to the cart. As can be seen in FIG. 8, the CIT 14' may by attached to a telescopic supporting mechanism 273 which allows for the CIT 14' to be adjusted to a height suitable for interaction by the customer.

The terminal 14' also includes a communications port 264 for coupling to the host if used outside the store for instance in the customer's home, and is the preferred embodiment for the customer home terminal 26.

The port 264 may be modem circuitry with an RJ II connector 266 for communication with an ISP via plain old telephone service subscriber loop 268. Alternatively, in FIG. 22 the port may include IRDA circuitry 270 and a LED/ photo sensor 272 combination for infrared communication with an aligned IRDA port in a docking cradle (not shown) which subsequently includes modem circuitry. It will be appreciated that any physical/transparent layout scheme including integrated services digital network, asynchronous mode transmission, etc. may also be suitably employed.

Figure 9:
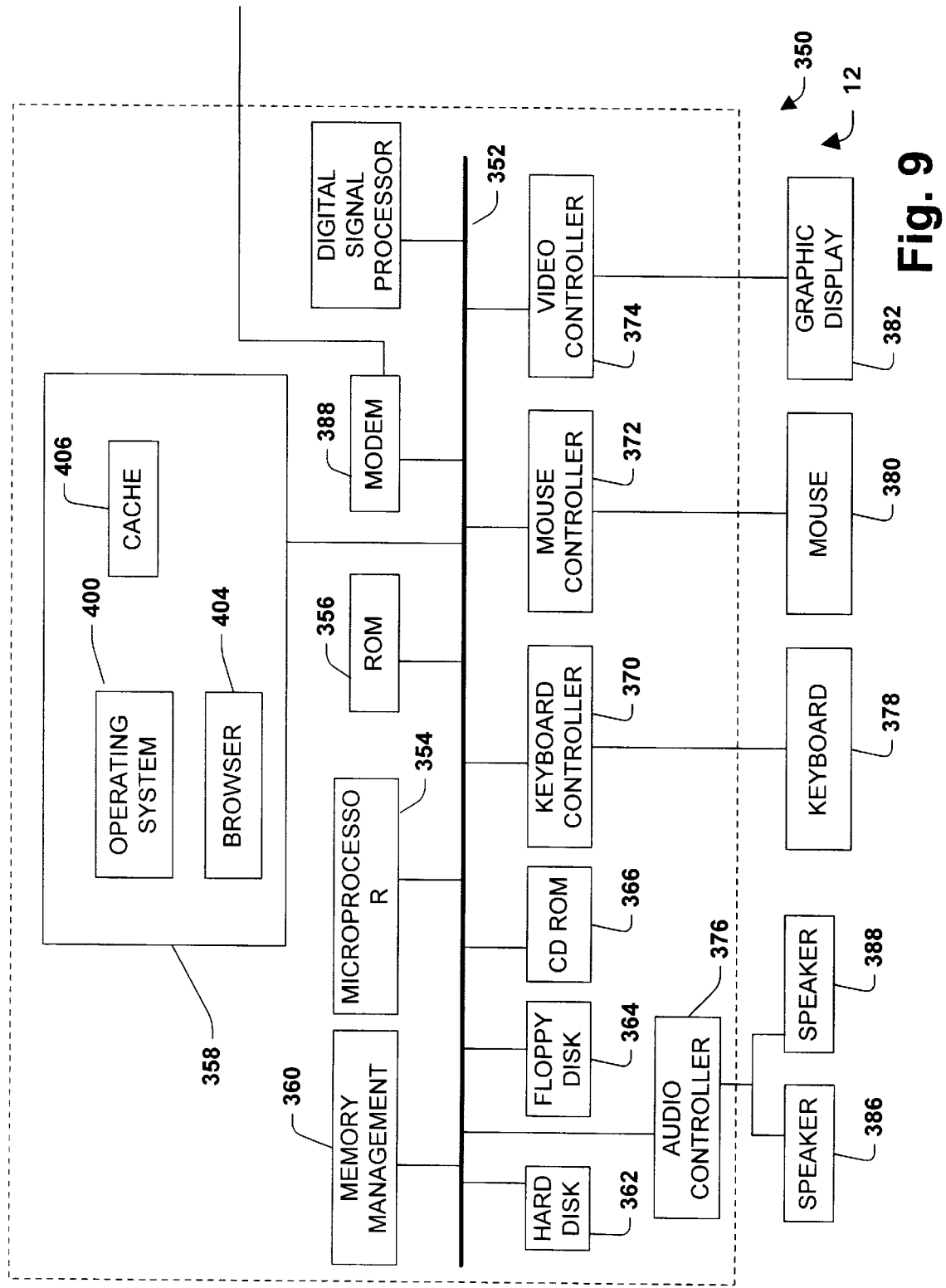
FIG. 9 is a schematic representation of selected electronic modules and circuitry of the host computer, manufacturer's computer in accordance with the present invention.

FIG. 9 is a block diagram of the architecture of the host computer 12 and manufacturer's computer 34, respectively. The general structure of these computers is basically the same.

The system unit 350 includes a system bus or plurality of system buses 352 to which various components are coupled and by which communication between the various components is accomplished. The microprocessor 354 is connected to the system bus 352 and is supported by read only memory (ROM) 356 and random access memory (RAM) 358 also connected to the system bus 352. The ROM 356 contains among other code the Basic Input-Output system (BIOS) which controls the basic hardware operations such as interaction and the disk drives and the keyboard. The RAM 358 is the main memory into which the operating system and application programs are loaded. The memory management chip 360 is connected to the system bus 352 and controls direct memory access operations including, passing data between the RAM 358 and hard disk drive 362 and floppy disk drive 364. The CD ROM 366, also coupled to the bus system 352, is used to store a large amount of data (e.g., multimedia program or large database).

Also connected to the system bus 352 are various I/O controllers: the keyboard controller 370, the mouse controller 372, the video controller 374, and the audio controller 376. The keyboard controller 370 provides the hardware interface for the keyboard 378, the mouse controller 372 provides the hardware interface the mouse 380 (or other point and click device). The video controller 374 is the hardware interface for the display 382, and the audio controller 376 is the hardware interface for the multimedia speakers 386, 388. A modem 390 enables communication over the network 30 to other computers.

The operating system 400 of the computer may be DOS, WINDOWS3.x, WINDOWS '95, OS/2, AIX, JAVA® or any other known and suitable operating system. The RAM 358 also supports a number of Internet access tools including, for example, the HTTP-compliant web browser 404. Known software includes Netscape, Netscape Navigator, Mosaic, and the like. The present invention is designed to to operate within any of these known or developing web browsers. The RAM 358 also supports other Internet services including simple mail transfer protocol (SMTP) or e-mail, file transfer protocol (FTP), network news transfer protocol (NNTP) or "Usenet", and remote terminal access (Telnet).

Operation of the Terminal Unit

Figure 10:
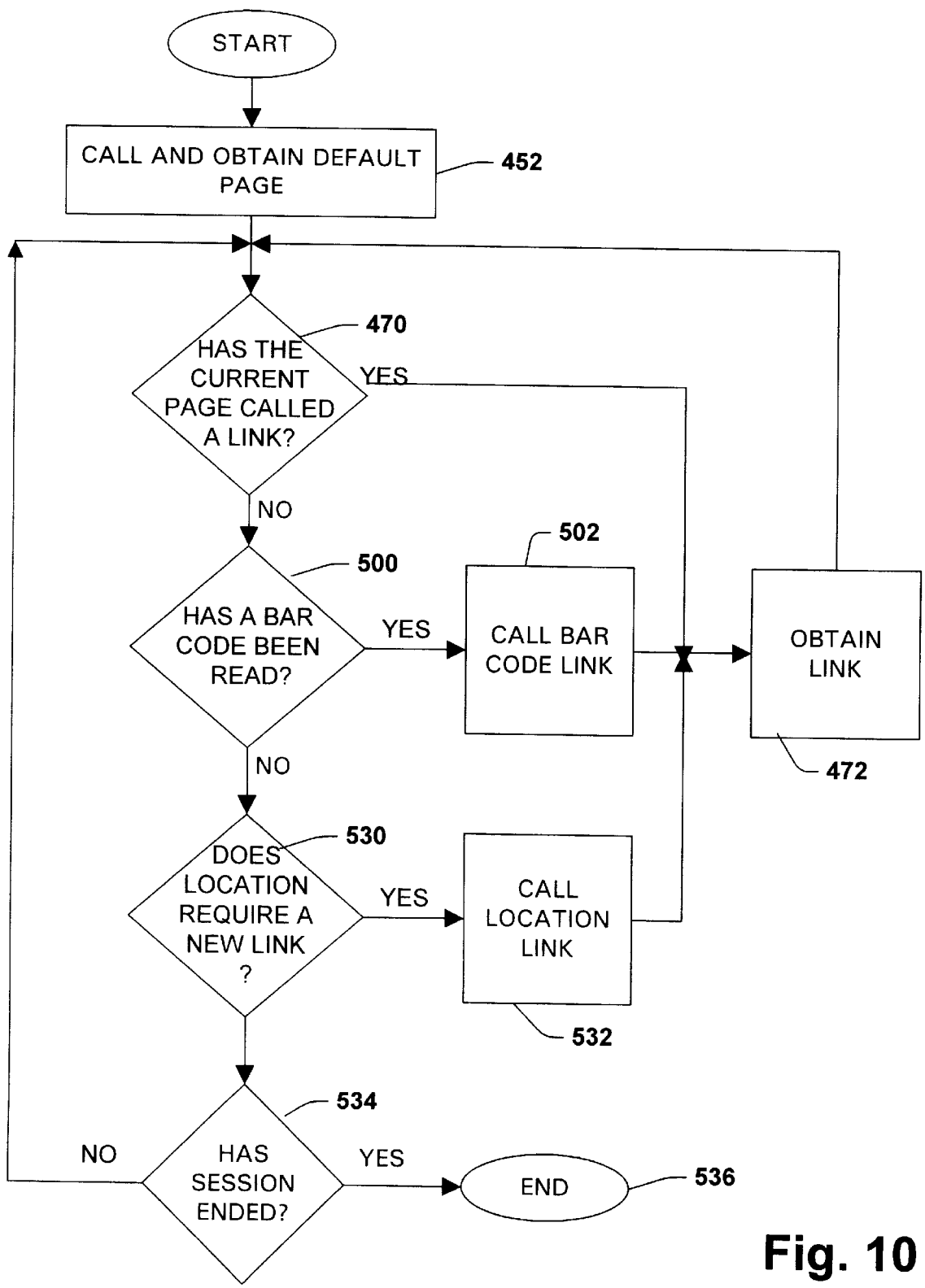
FIG. 10 is a flow chart representing processing steps of a customer information terminal in connection with a shopping session at a retail store using the device.
Figure 11:
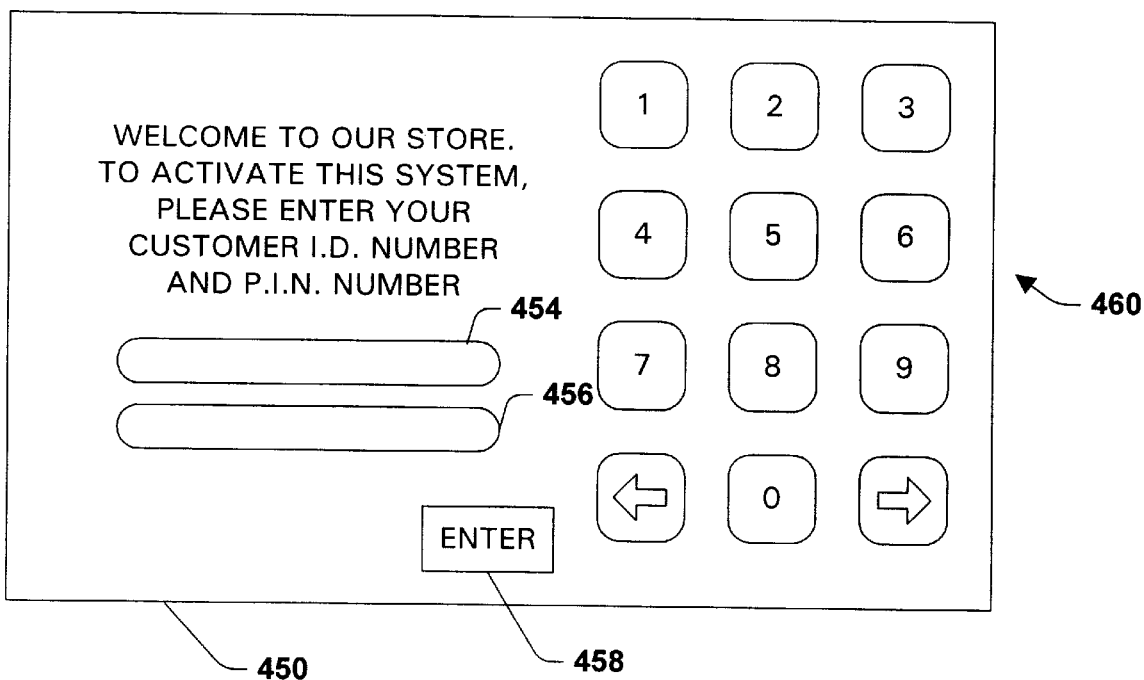
FIG. 11 is a representative HTML page displayed on a touch sensitive display screen of a customer information terminal in accordance with the present invention.

Referring to FIG. 10, the CIT 14 operates as a modified TCP/IP web browser. When the shopping cart terminal is first powered, a default HTML page is requested from the host and, after received from the host is displayed on the screen at step 452. Typically the default page will be a welcome form 450 and will graphically appear as FIG. 11.

Figure 15:
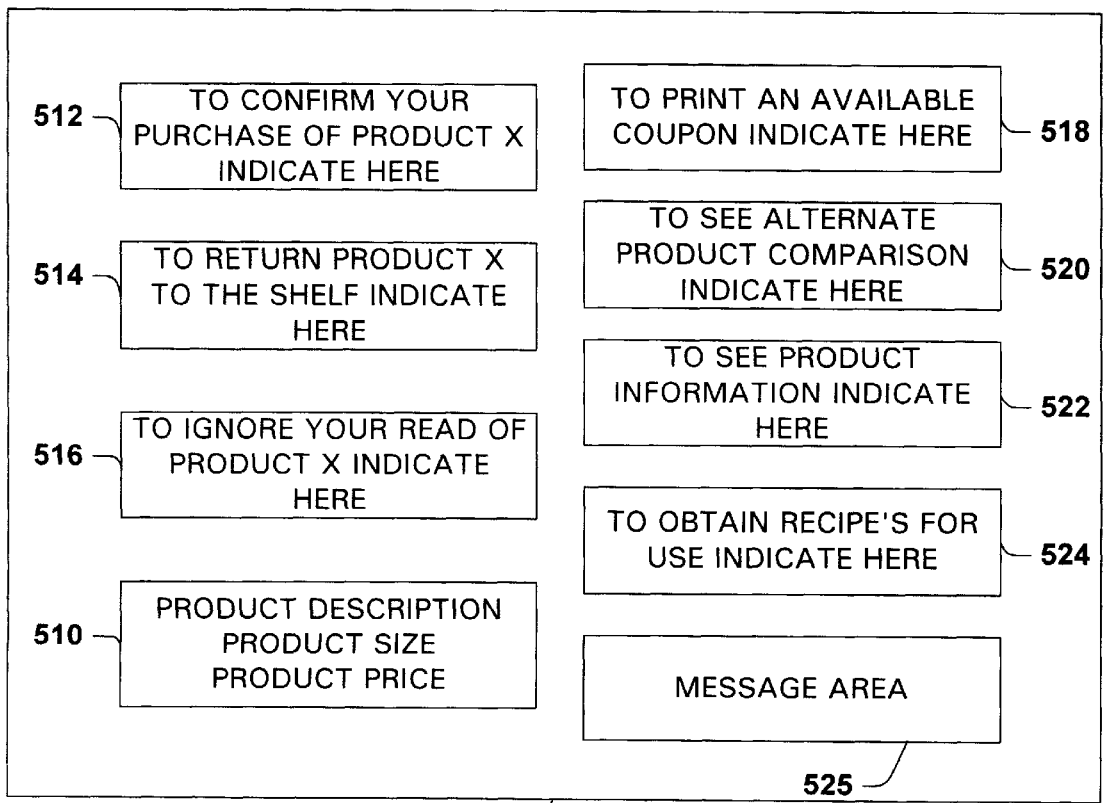
FIG. 15 is a representative generic confirmation HTML page displayed on the touch sensitive display of the portable data collection device after an item's bar code data form has been read in accordance with the present invention.

This page includes fields 454 and 456, virtual button 458 and 12 other buttons labeled 0–9, left arrow and right arrow, indicated generally at 460. By including exeutable code in the HTML form page (using Sun Micro Systems Java programming code for example), each of these buttons, when activated by the user, functions as a virtual keyboard for manually entering a customer ID number. Alternatively, the operator may enter his or her customer ID number by reading a barcode on an ID card. The barcode reader circuitry decodes the data and enters it into a field using typical keyboard wedge emulation routines. The customer's PIN number is entered through the virtual keypad. Activating the enter button 458 calls a link defined in the HTML page which relays the ID number and PIN to the host 12 at step 470, FIG. 10. For security, the transmission of the customer ID number and the PIN number may be encrypted using standard public key encryption techniques. The link is a TCP/IP data packet addressed to the host, and when received by the host, causes the host to launch a customer verification program (See FIG. 12) stored on the host 12. The program verifies the customer ID number and PIN in fields 454 and 456 and returns a new HTML page to the CIT. The returning HTML page may be one of either an invalid ID page or the main menu page. The invalid ID page will typically include HTML code to self generate a link request for the welcome page 450 after predetermined period of time. A typical main menu HTML page is shown in FIG. 15. It may include a plurality of labeled buttons 480–486 which, if user activated, generates a link request for a selected sub menu page corresponding to the selected button at 470. Each of the sub menu pages which could be received at 472 will be discussed in more detail later.

At step 500 the system determines whether a bar code has been read. As discussed previously, the bar code reading system will be connected to the processor 248 through a data connection, such as a serial port which generates a software interrupt when a bar code has been successfully decoded. The interrupt triggers the processor 248 to transmit a barcode link request to the host at step 502. The barcode link request is a TCP/IP data packet which includes the decoded data and instructions to the host 12 to launch a barcode program on the host. The barcode program will include a lookup of parameters associated with the code number and return of an HTML confirmation page associated with the product. Step 472 represents receipt of the page. Typically the confirmation page will be a generic page which enables the customer to verify his or her desire to purchase the product.

Alternatively the merchant may wish to use verification pages which include advertisements for promotional products when the bar code for particular products are read. These are referred to as product specific verification pages. The confirmation page includes field 510 which displays the product description and price. The page also includes button 512, 514 and 516 which, if activated, cause the CIT 14 to transmit a link request 470 which launches a host program to either add the product to the customer purchase list, remove from the customer purchase list or to return to the main menu ignoring the read, respectively. Additionally, the page includes virtual buttons 518, 520, 522 and 524 which if activated cause the page to generate a link request 470 to a corresponding sub menu page.

Step 530, represents a determination of whether the CIT 14 has moved to a new location in the store. The infrared receiver will typically be connected to the processor through a serial port. When the CIT 14 detects that it has moved to a new zone, the CIT 14 transmits a link request at step 532. The request is a TCP/IP packed addressed to the host which includes the new location and instructions to launch a location program on the host. The location program determines whether to transmit a new HTML page to the CIT 14 or whether to return the same page as currently display (customer sees no change). Step 472 again represents receipt of the page. Typically a new page will be an advertisement which is associated with a product near the location of the CIT 14.

Alternatively, the location detection system may be an RF system wherein a radio transceiver in a terminal interrogates and detects return signals from passive short range RF ID tages.

Step 534 represents a determination of whether the session has ended which typically would only be represented by shutdown of CIT 14 to end the process at step 536. If the session has not ended at 534, the system 16 merely loops back to step 470 to continue the iterative process of sending link requests to the host and receiving HTML web pages in return.

It should be appreciated that a checkout routine does not end the session, but it is merely a link request from the main menu at step 470. Furthermore, after a customer has successfully checked out, return to the introductory page for the next customer is also merely a link request at 470. It should also be appreciated that more commonly used HTML pages may be stored locally on the CIT 14 to reduce air traffic.

Host Operation

FIG. 12 is a table of a suitable setup of the host 12. The host 12 includes storage of HTML web pages, databases, and programs launchable by CIT link requests. If the host 12 receives a link request from a client for a specific page, the host 12 merely returns the requested page. Alternatively, if the link request launches a program, the host executes the program and returns a page as determined by the program.

As can be seen from the foregoing, the CIT 14 basically generates link requests and receives return data. All programs associated with the system for interacting with the customer are stored and run on the host 12. These programs will be discussed with reference to the flowcharts discussed below.

Figure 13:
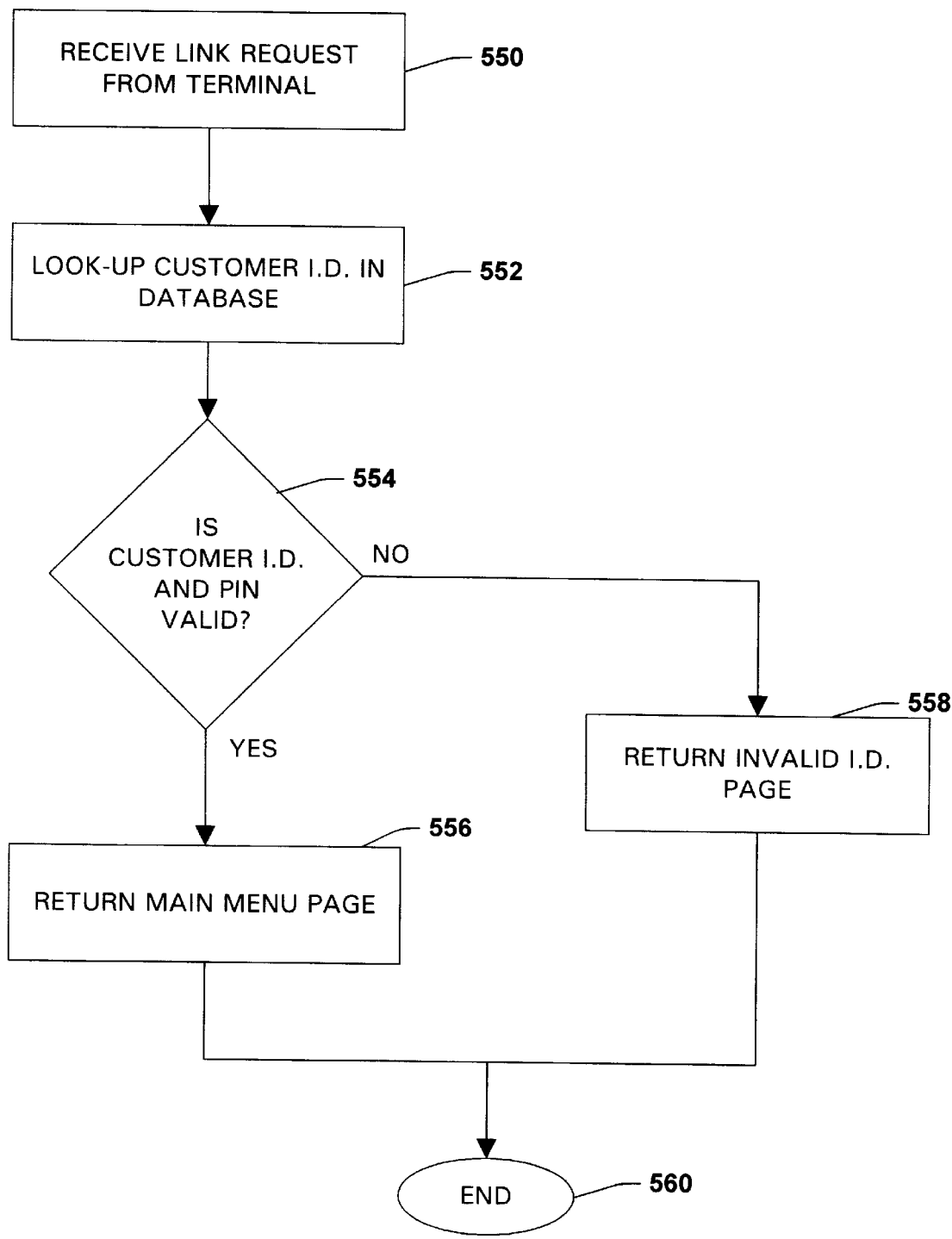
FIG. 13 is a flow chart representing processing steps of the host computer in connection with verifying the validity of a customer ID and PIN number in accordance with the present invention.

FIG. 13 is a flowchart showing operation of the customer verification program at the host 12. As previously discussed, activation of virtual buttom 458 or the welcome screen (FIG. 11) causes the terminal to send a link request to the host computer 12 which includes the customer ID number, the PIN number and instructions to launch the customer verification program. The program starts at step 550 which represents receipt of the link request from the customer terminal 14. At step 552, the host 12 looks up the customer ID number in the database, and, at step 554, checks whether the ID number and PIN number combination is valid. If it is valid, the host 12 returns the menu page to the CIT 14 at step 556. Alternatively, if the number is invalid, the host 12 returns an "invalid PIN number" page to the CIT 14 at step 558. The program ends at step 560.

Figure 16:
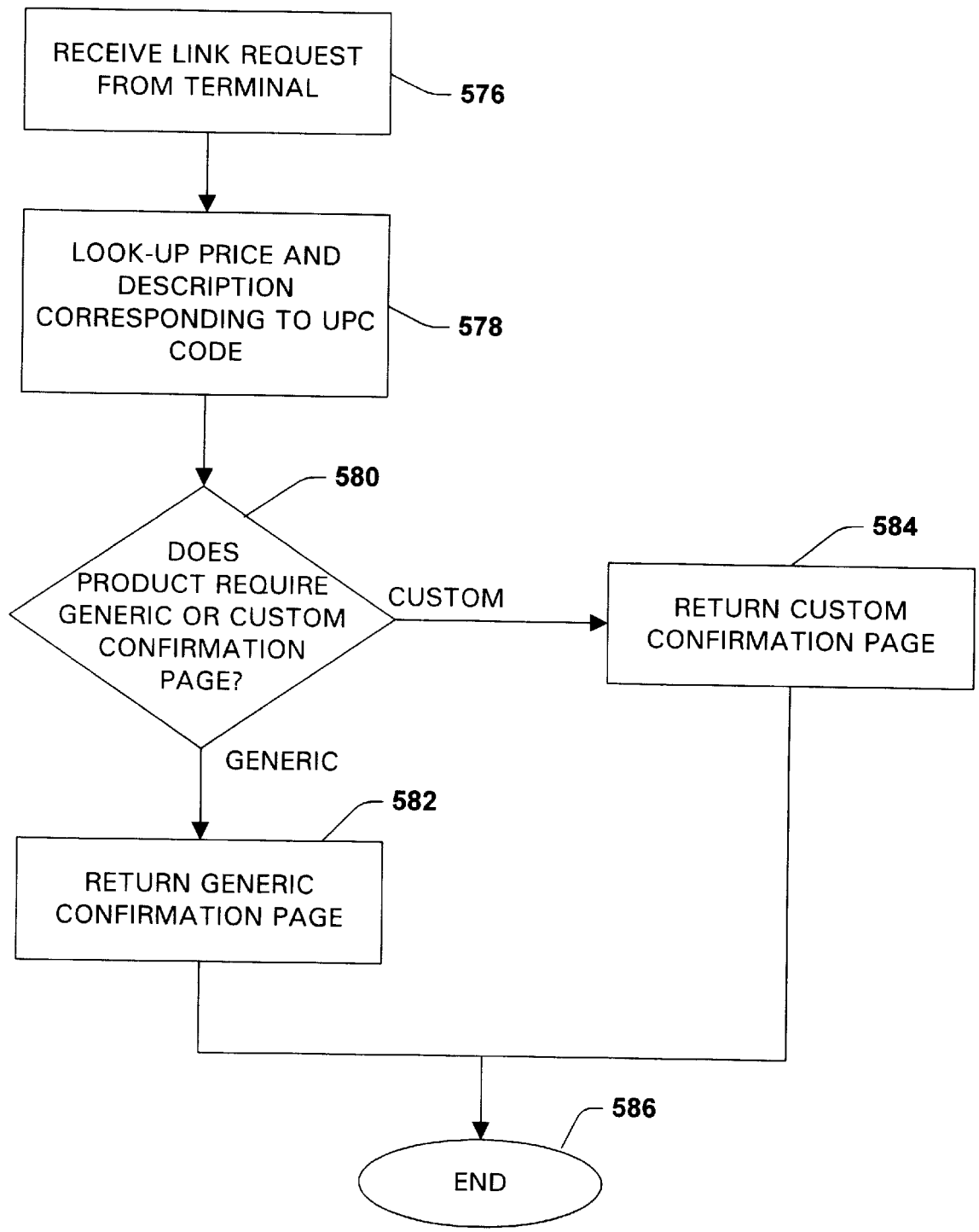
FIG. 16 is a flow chart representing processing steps at the host computer in connection with the customer information terminal scanning a bar code in accordance with the present invention.

As previously discussed, the customer can use the bar code reader to read a bar code which, in turn, causes the CIT 14 to transmit a link request to launch a bar code program at the host 12. FIG. 16 is a flowchart showing operation of the bar code program. The program starts at step 576 which represents receipt of link request from the CIT 14. At step 578, the system looks up the price and description corresponding to the UPC code in the price and description databases. At step 580, the system determines whether the confirmation page to be associated with the particular product is generic or custom. Typically this will include looking up the UPC code in a list of products to associate with a custom confirmation page. If a generic page is used, the price and description are inserted into the appropriate fields of the generic page and the page is returned to the CIT 14 at step 582. Alternatively, if a custom page is to be used, it is returned to the CIT 14 at 584 and the process ends at step 586.

FIG. 15 shows a sample of a generic confirmation page. The page includes message field 510 which includes a description of the product and its price. Message field 525 may be used to display other information about the product. For example, if the product is a tobacco product, the message field 525 may display the Surgeon General Warning. The page includes two virtual buttons 512 and 514 which if activated, cause the CIT 14 to transmit a link request to the host 12 which will launch the running total program at the host. The running total program will add or remove the item from the customer's running receipt as required by the link request. Virtual button 516 causes the CIT 14 to transmit a link request for the main menu HTML page. The page also includes virtual buttons 518, 520 and 522 which if activated cause the terminal to transmit a link request to the host 12 or a particular HTML page associated with a product coupon, product information, or alternate product information, respectively. Virtual button 524, if activated, causes the terminal 14 to transmit a link request which launches the recipe search program on the host 12. A custom confirmation page would typically include the same virtual buttons, but may additionally include custom graphics related to marketing the scanned product or associated products.

Figure 17:
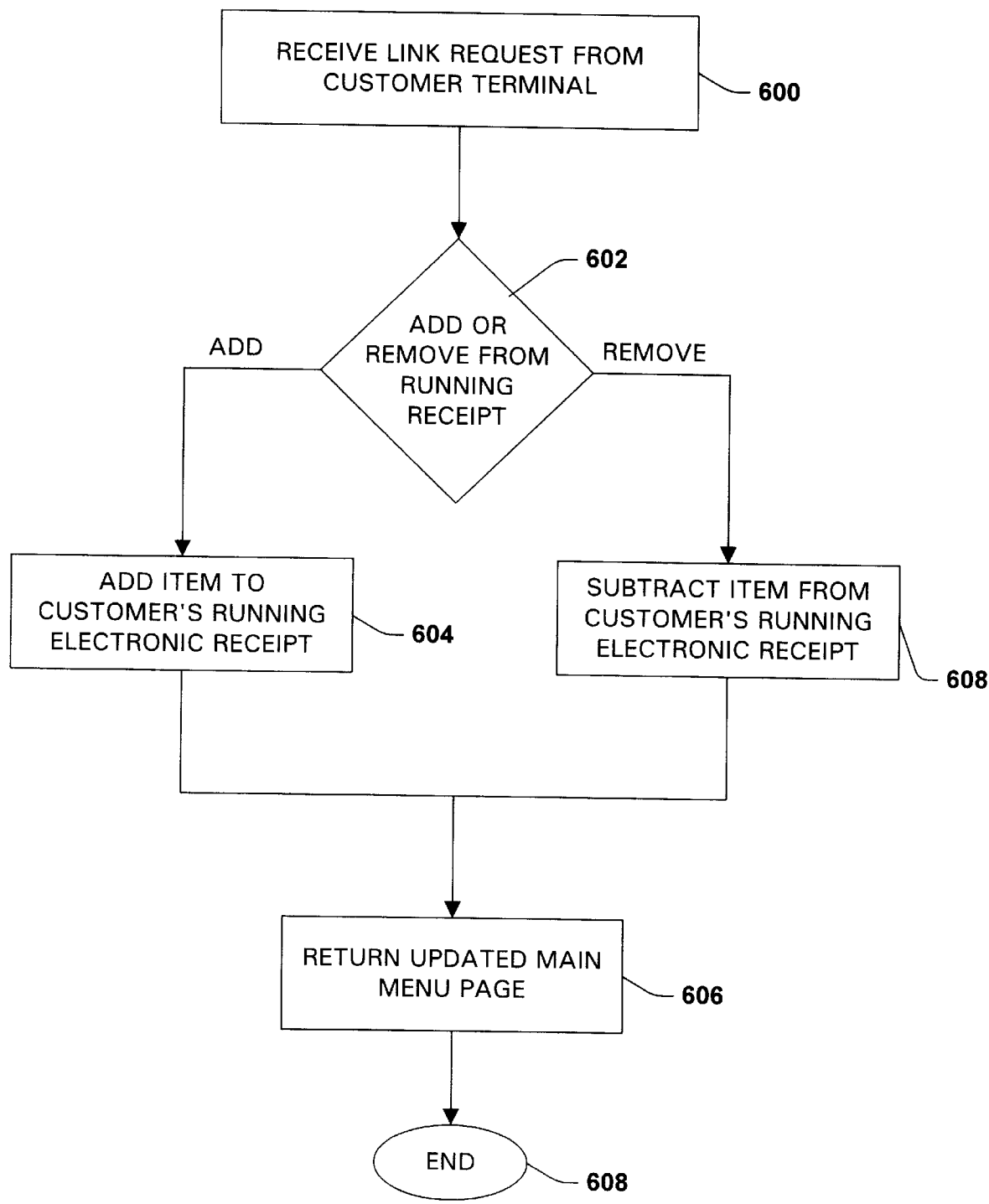
FIG. 17 is a flow chart representing processing steps of a portable data collection device in connection with a help routine for aiding a customer find a desired item in accordance with the present invention.

FIG. 17 is a flowchart representing the processing steps at the host computer 12 which add or remove the item from the customer's running total. The program starts at step 600 which represents receipt of the link request from the customer terminal 14. The link request is a TCP/IP data packet addressed to the host 12 which includes instructions to launch the running total program and a data field indicating whether the item is to be added or removed from the customer's running total. Step 602 represents the host 12 determining based on the data field whether to add or remove the item from the customer's running total. If the item is to be added, the host 12 adds the item to the running receipt at step 604 and returns a main menu page to the customer at step 606 with updated running receipt totals in the appropriate fields. Alternatively, if the item is to be removed at step 602, the host 12 removes the item at step 608 and returns an updated menu page at step 606. The program ends at step 608.

Figure 18:
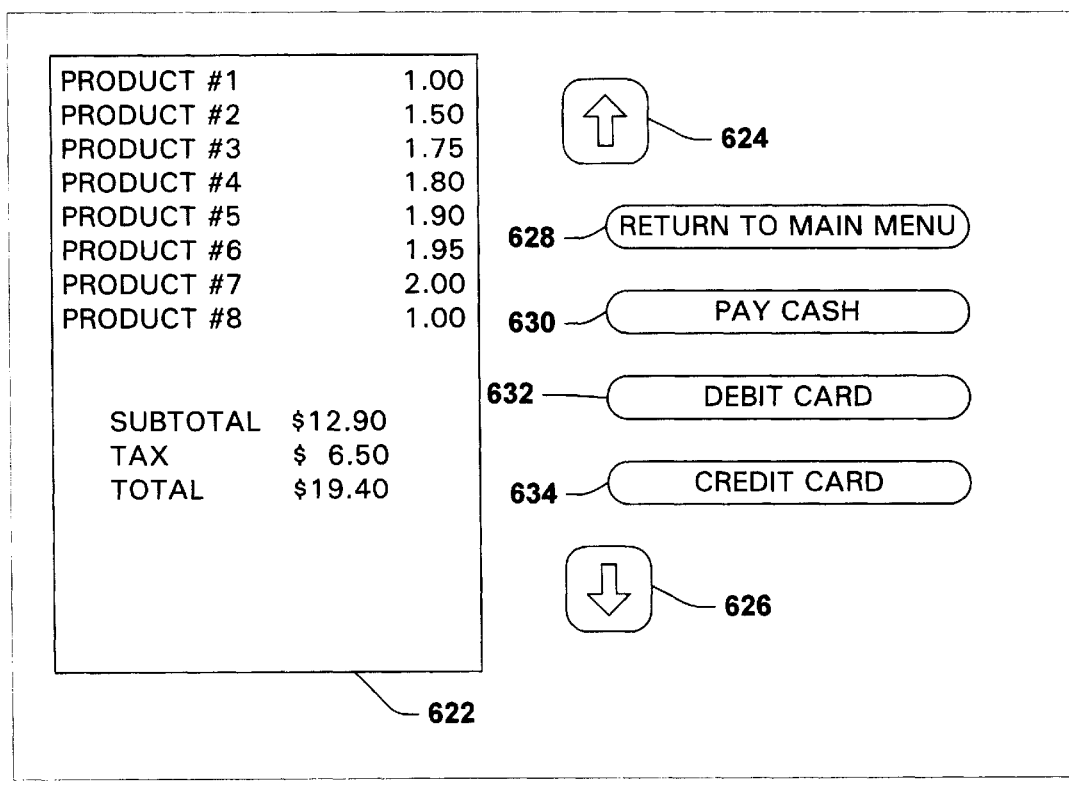
FIG. 18 is a representative HTML page displayed on the touch sensitive display screen of a customer information terminal in connection with a routine for providing a recipe using a selected food item in accordance with the present invention.

When the customer has finished shopping, the customer activates the checkout button on the main menu. Activation of the button causes the CIT 14 to generate a link request for the checkout page which is graphically shown at 620 in FIG. 18.

The checkout form page 620 includes virtual representation of the custumor's receipt in field 622. Virtual buttons with arrows 624 and 626 are used by the customer to scroll the receipt for viewing. The page includes virtual button 628 which, if activated by the customer, aborts the checkout routine by causing the CIT 14 to generate a link request for the main menu page. Virtual button 630 is activated by the customer to indicate the customer's wish to pay cash which causes the CIT 14 to transmit a link request to the host 12 to launch the cash checkout program. Virtual button 632 and 634 are activated by the customer to indicate the customer's desire to pay with a debit or credit card, respectively. Activation of these buttons cause the CIT 14 to transmit a link request to the host 12 to launch the debit/credit card checkout program.

Figure 19A:
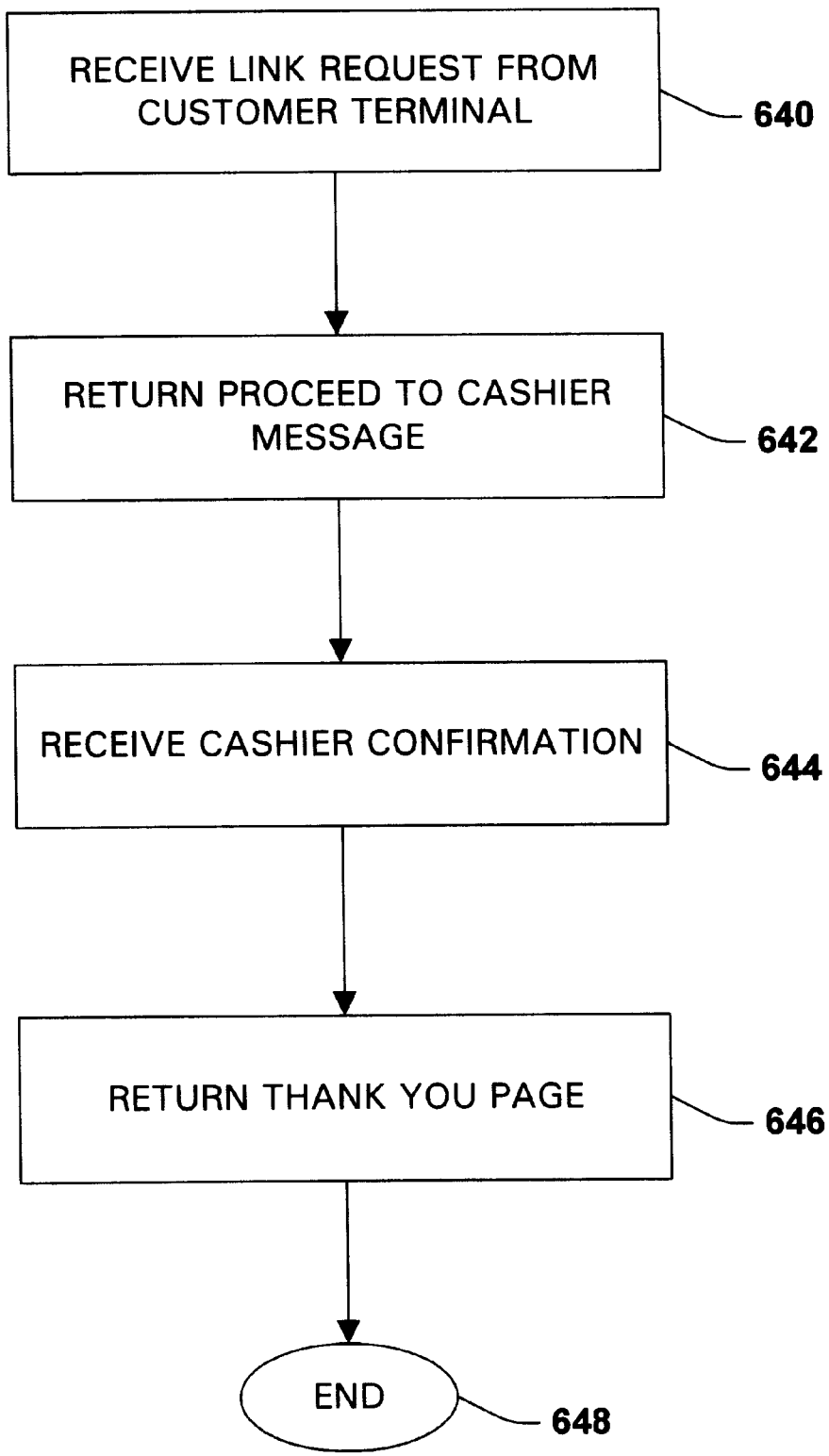
FIGS. 19a and 19b are flowcharts representing processing steps of a customer information terminal in connection with a routine for checking out items selected for purchase in accordance with the present invention.

FIG. 19a is a flowchart representing the cash checkout program on the host 12. The program starts at step 640 which represents receipt of the link request from the CIT 14. At step 642 the host 12 returns a page to the CIT 14 which instructs the customer to proceed to the cashier. Step 644 represents receipt of confirmation from the cashier that the sale is complete. The cashier will typically have a cashier's terminal communicatively coupled to the host 12 via the network 20. After receipt of the cashier's confirmation, the host will send a HTML page with a thank you message to the customer at step 646 and the program ends at step 648. Typically the thank you page will include a timer to generate a link request for the welcome page after a predetermined period of time. This positions the CIT 14 for the next customer.

Figure 19B:
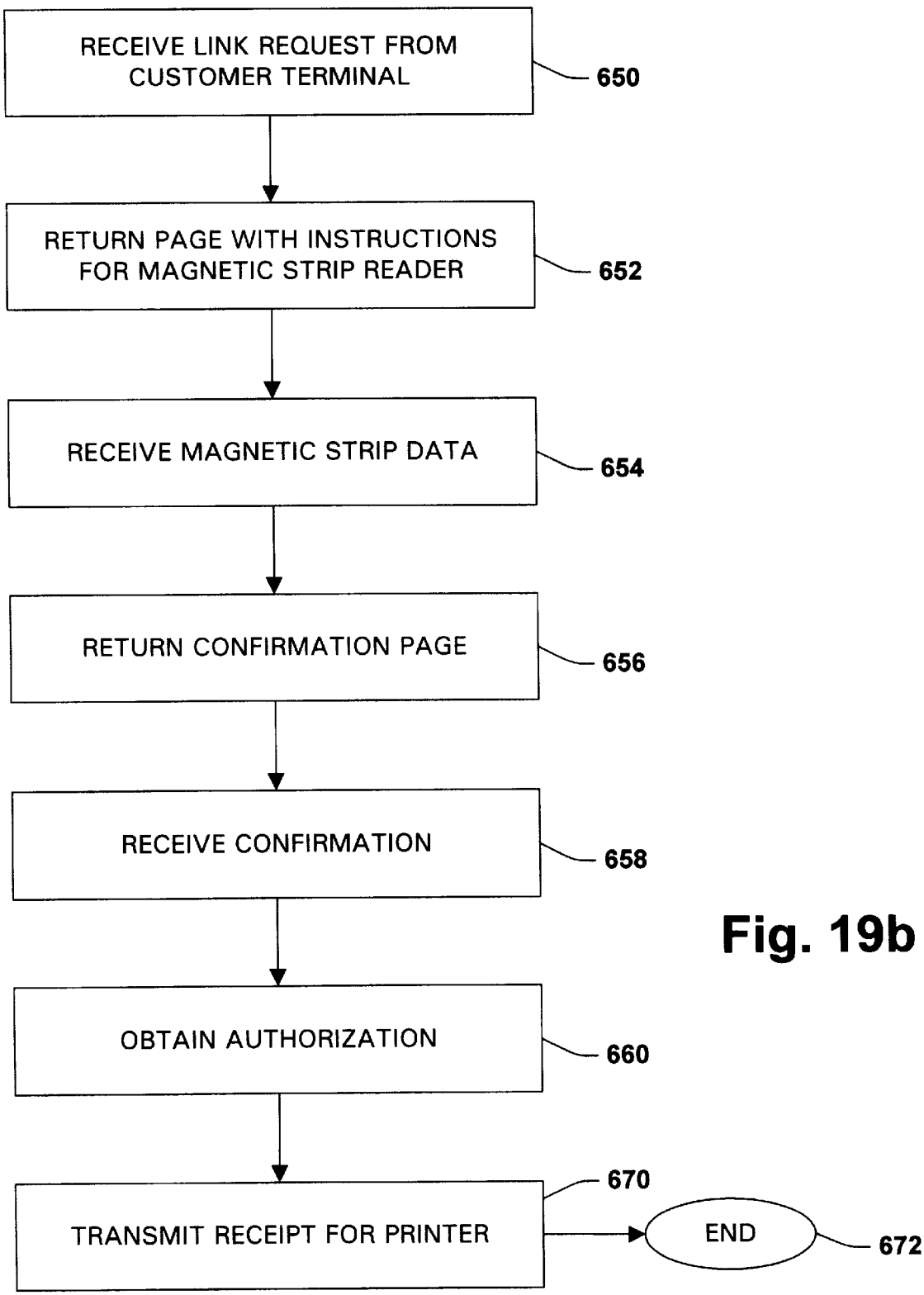

FIG. 19b is a flowchart representing the debit/credit card checkout program on the host. The program starts at step 650 which represents receipt of the link request from the CIT 14. At step 652 the host returns a HTML page with instructions to the customer to swipe the magnetic stripe on his or her credit or debit card. Step 654 represents receipt of the credit or debit card number from the CIT 14. After step 656 the program sends a confirmation page to the CIT 14. The confirmation page includes virtual buttons for verifying the amount of the sale and entering a PIN number as appropriate for a debit card. Step 658 represents receipt of a data packet from the CIT 14 which includes the PIN number and the customer's confirmation. Step 660 represents obtaining card authorization from the appropriate card issuing authority. After authorization is obtained, receipt data transmitted to the customer along with a thank you message. The program ends at step 672.

As previously discussed, various customer assistance routines can be requested by the customer which include a recipe search routine, a location assistance routine and order of specially prepared items.

Figure 20:
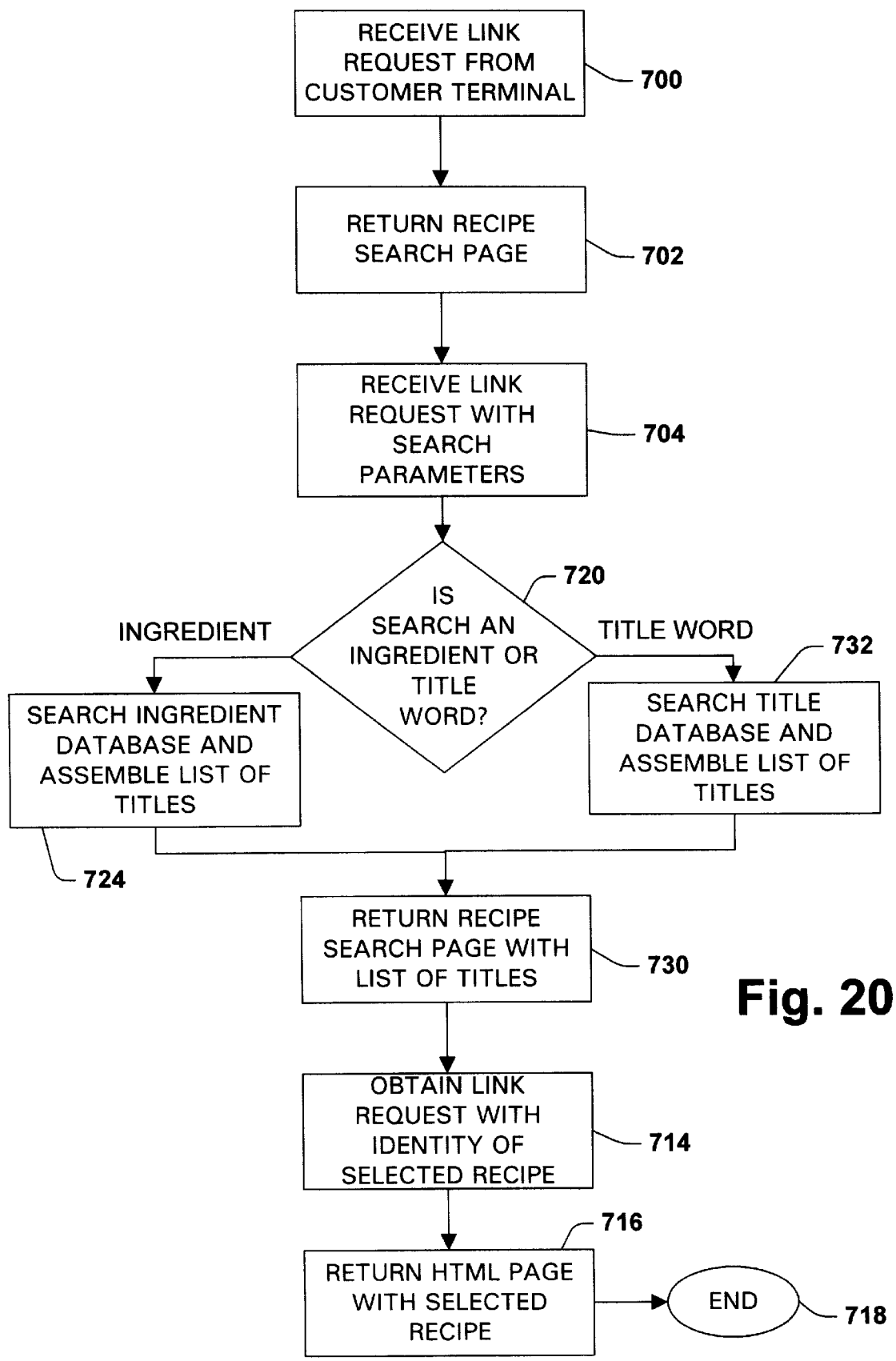
FIG. 20 is a flow chart representing processing steps of the host computer device in connection with a routine for providing a recipe using a selected food item in accordance with the present invention.
Figure 21:
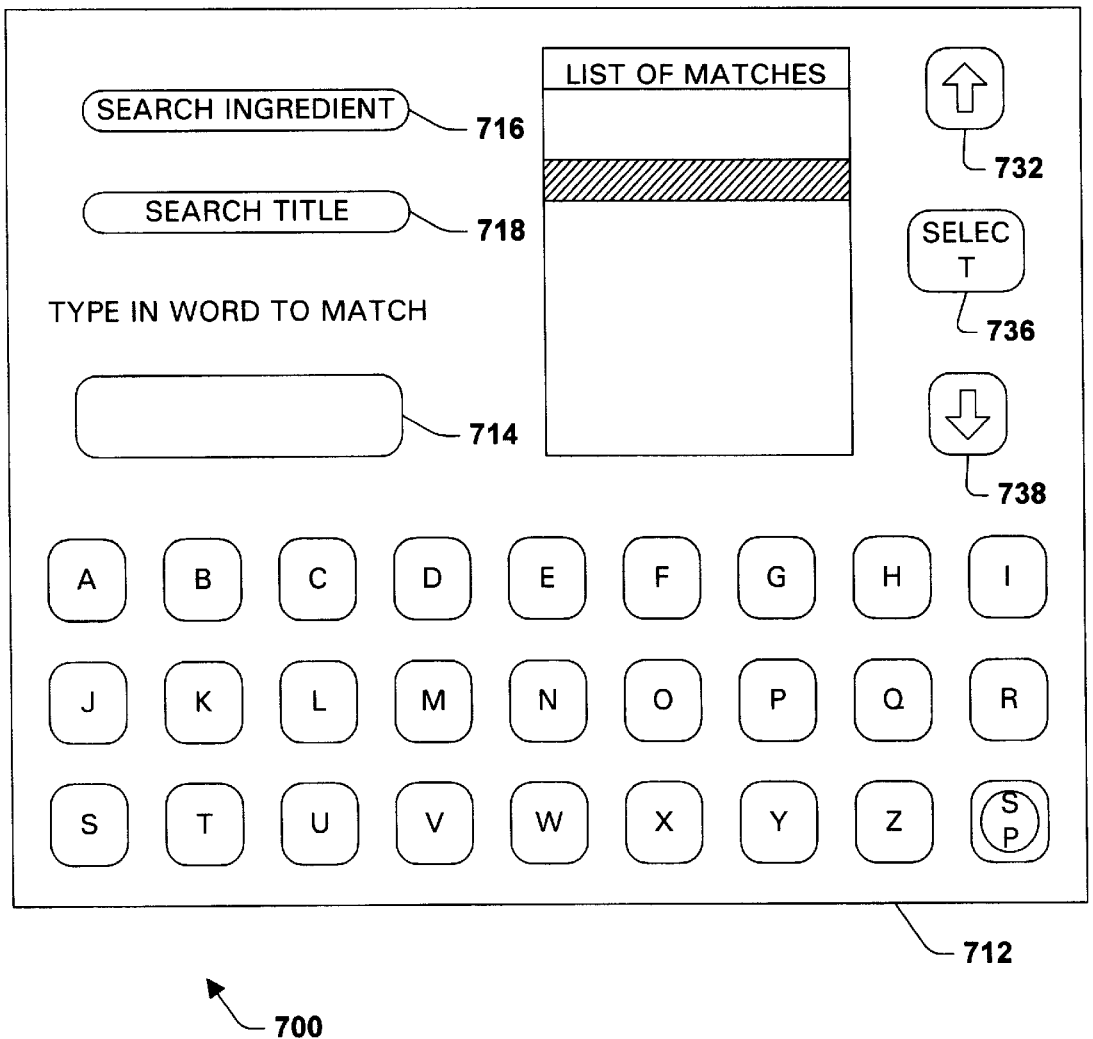
FIG. 21 is a representative HTML page displayed on a touch sensitive display of a customer information terminal in connection with a help routine for aiding a customer find a desired item in accordance with the present invention.

FIG. 20 is a flowchart of operation of a recipe search program on the host. The CIT 14 can be activated to generate a link request to launch this program from either of the main menu page 490 (FIG. 14) or the confirmation page 523 (FIG. 15). The program starts at step 700 which represents receipt of the link request. Step 702 represents return of the recipe search form page to the customer information CIT 14. FIG. 21 shows a sample recipe search page 710 for obtaining search items. The page 710 includes a plurality of virtual buttons A–Z plus "space" (designated generally at 712) which are supported by executable code such as Sun Microsystems Java which, when activated, operate to enter the designated letter into field 714 The operator uses the virtual buttons to enter a search item. It should be appreciated that if the search program is requested from the confirmation page 523, the product description may be automatically placed in field 714 and the virtual buttons 712 used for editing.

After entering the appropriate search term, the user activates either of virtual buttons 716 or 718 to generate a link request. The link request is a TCP/IP packet which includes the search term, instructions to launch the search and a field indicating whether the search is by title or ingredient. Step 720 represents determining whether the search is for an ingredient search or a title search. If an ingredient search, the host searches the recipe database at step 724 and returns the recipe search page with a list of matching recipes in scrollable field 726 at step 730 Alternatively, if a title word search, the host searches the recipe database at step 732 and returns the recipe search page with the list of matching recipes in scrollable field 726 at step 730.

Referring again to FIG. 21, the customer uses the arrow keys 732 and 734 to move a highlight bar 736 to highlight the desired recipe in the scrollable field. Virtual button 738, if activated, causes the CIT 14 to generate a link request for the HTML page with the recipe printed thereon.

Referring back to FIG. 20, step 714 represents receipt of the link request from the CIT 14 for a specific recipe. Step 716 represents sending the recipe from the database to the CIT 14. The host program then ends at step 718.

The HTML page which includes the recipe will typically include a virtual button which, if activated, causes the printer 64 to print a hard copy of the recipe for the customer.

Furthermore, the page will include a virtual button which, if activated, causes the CIT 14 to make a link request to the main menu page or the confirmation page which was originally used to initiate the recipe search and another virtual button, which if activated will cause the ingredients to be added to the shopping list.

Figure 14:
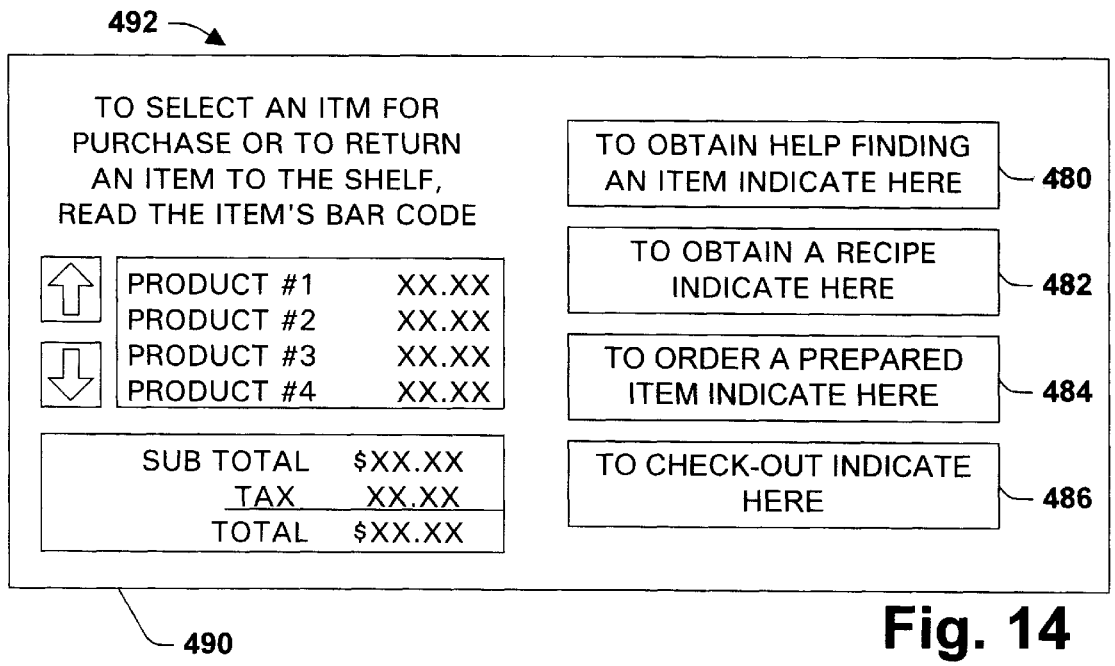
FIG. 14 is a main menu HTML page displayed on the touch sensitive display screen of the portable data collection device in connection with a shopping session in accordance with the present invention.
Figure 22:
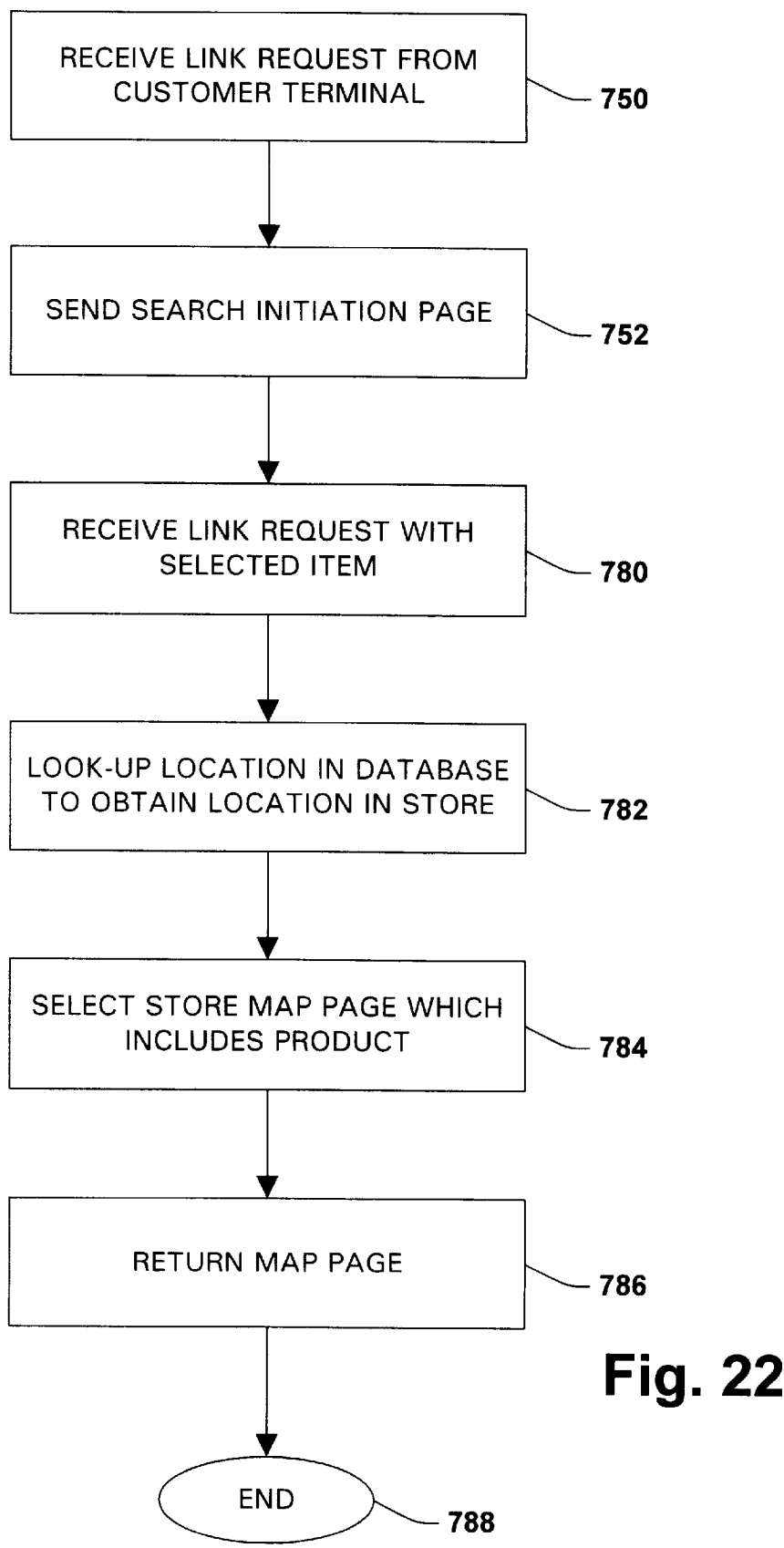
FIG. 22 is a representative screen layout displayed on the touch sensitive display screen of a customer information terminal in connection with a routine for permitting a customer to order a prepared item during a shopping session in accordance with the present invention.

FIG. 22 is a flowchart which represents processing steps at the host computer 12 when the customer elects the location assistance routine by activating virtual button 480 from the main menu 490 of FIG. 14. The program starts at step 750 which represents receipt of the link request from the CIT 14. Step 752 represents return of the search initiation page to the CIT 14.

Figure 23:
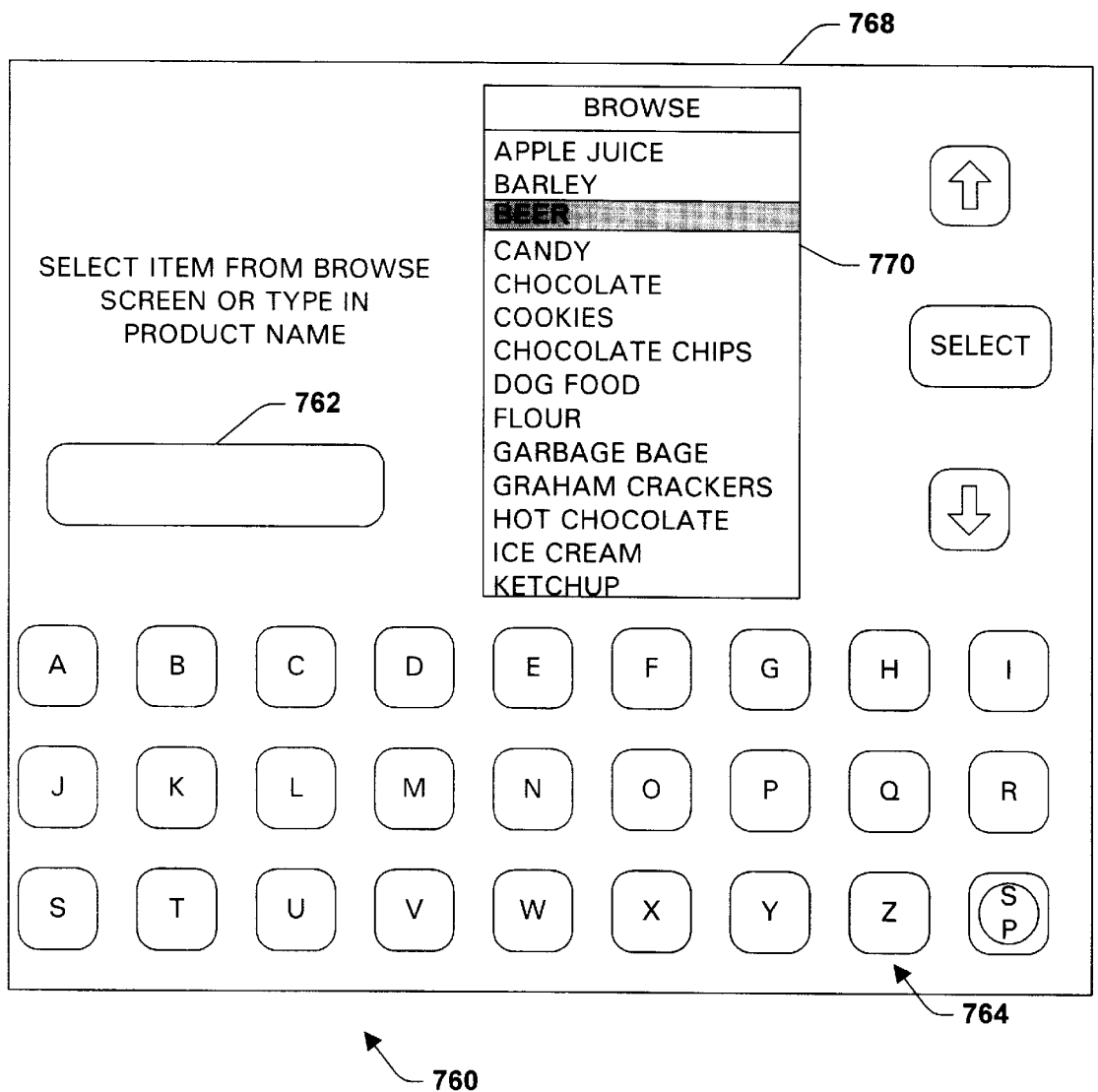
FIG. 23 is a representative HTML page representation of a search initiation page in accordance with the present invention.

FIG. 23 shows a representation of the search initiation page 760. The page 760 includes field 762 into which the customer enters the name of the desired product. The customer uses virtual buttons 764 to enter the product name. Simultaneously, all of the products available in the store are listed in scroll box 768. A highlight bar 770 will be positioned over the first item in the list which matches the letters entered by the customer. The customer in addition to entering the product name via the virtual keyboard 764 can also move the highlight bar 770 over the desired item, virtual button 772 can be activated to initiate a link request for an HTML page which shows the items location in the store.

Returning to FIG. 22, step 780 represents receipt of a link request which includes the selected item at the host 12. At step 782, the host 12 looks up the items location in a database and at step 784, selects a page which includes a map of the portion of the store that includes the desired product. Step 786 represents transmission of the map page to the CIT 14 and the program ends at step 788.

As previously indicated, virtual button 484 of the main menu 490 of FIG. 14, may be activated by the customer to initiate programs for ordering prepared items. Activation of button 484 will generate a link request for a sub menu page which will list the types of items which may be ordered. It is anticipated that such items may include floral products, butcher shop products, bakery products or deli products. Each sub routine will typically include a series of HTML pages which interact with the customer to order a selected item.

The purpose of the customer home terminal is to enable the customer to access all of the services at home as are available through the CIT 14 in the store. The preferred embodiment would be the same hardware as shown in FIGS. 6 & 7 with the addition of a system for connecting to the merchant's host. Such systems may include a modem and RJ II Jack for either a direct telephone line connection to the merchant's host 12 or to an internet service provider 32 which provides an internet connection to the merchant's host, and a bar code scanner for scanning in coupons. However, it will be appreciated that the CHT can be in other forms such as a personal computer.

Figure 24:
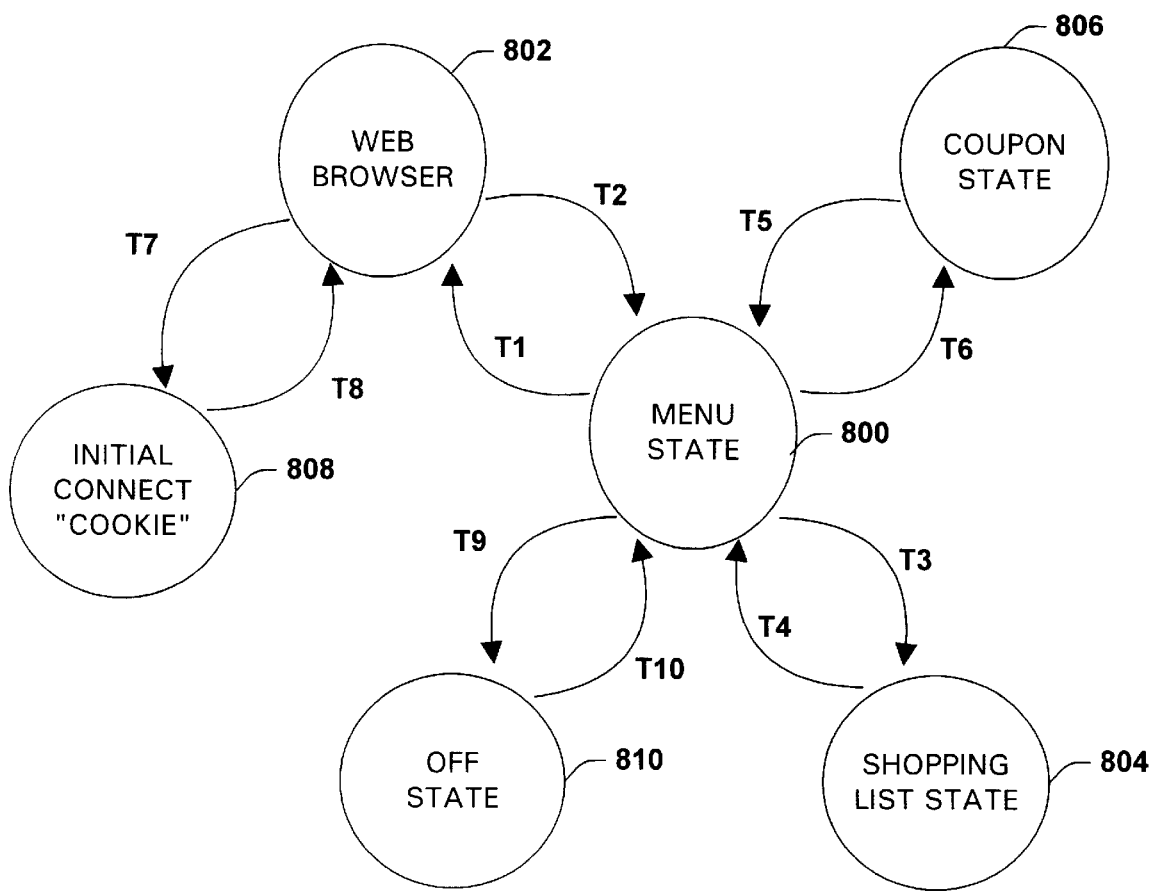
FIG. 24 is a state machine diagram of a customer home terminal in accordance with the present invention.

Referring now to FIG. 24, the CHT 26 is programmed to operate in accordance with the state diagram shown thereat. Briefly summarizing, the customer typically operates the CHT 26 for selecting shopping and product related menu options in the menu state 800. The customer may access services provided by the host computer 12 by transitioning to the web browser state 802 via transition Ti. When in the web browser state 802 and connected to the merchant's host 12, all services can be accessed and the CHT 26 operates just like the CIT 14. The customer may cause the CHT 26 to return back to the menu state 800 by way of transition T2. From the menu state 800, the customer may move via transition T3 to a shopping state where he/she may enter items to add to the customer's personal shopping list 984. The customer can return from the shopping list state 804 to the menu state 800 through transition T4. Furthermore, the CHT 14 includes a coupon state 806 which the customer may reach from the menu state via transition T5 wherein the customer may enter items to add to the customer's personal shopping list 984 or coupons to add to the customer's personal electronic coupon file while not connected to the merchant's host. The customer may return to the menu state 800 from the coupon state 806 via transition T5. When initially entering the web browser state, the CHT 14 enters a cookie state 808 upon connection to the host computer 12 via transition T7. A cookie program updates the shopping list file and the coupon file at the merchant's host 12 and in the CHT 14 such that they match each time the CHT 14 connects to the merchant's host 14. The CHT 14 leaves the cookie state 808 to the web browser state 802 via transition T8. The customer may exit the system by going to an off state 810 from the menu state 800 via transition T9. The customer may return to the menu state 800 from the off state 810 via transition T10.

Figure 25:
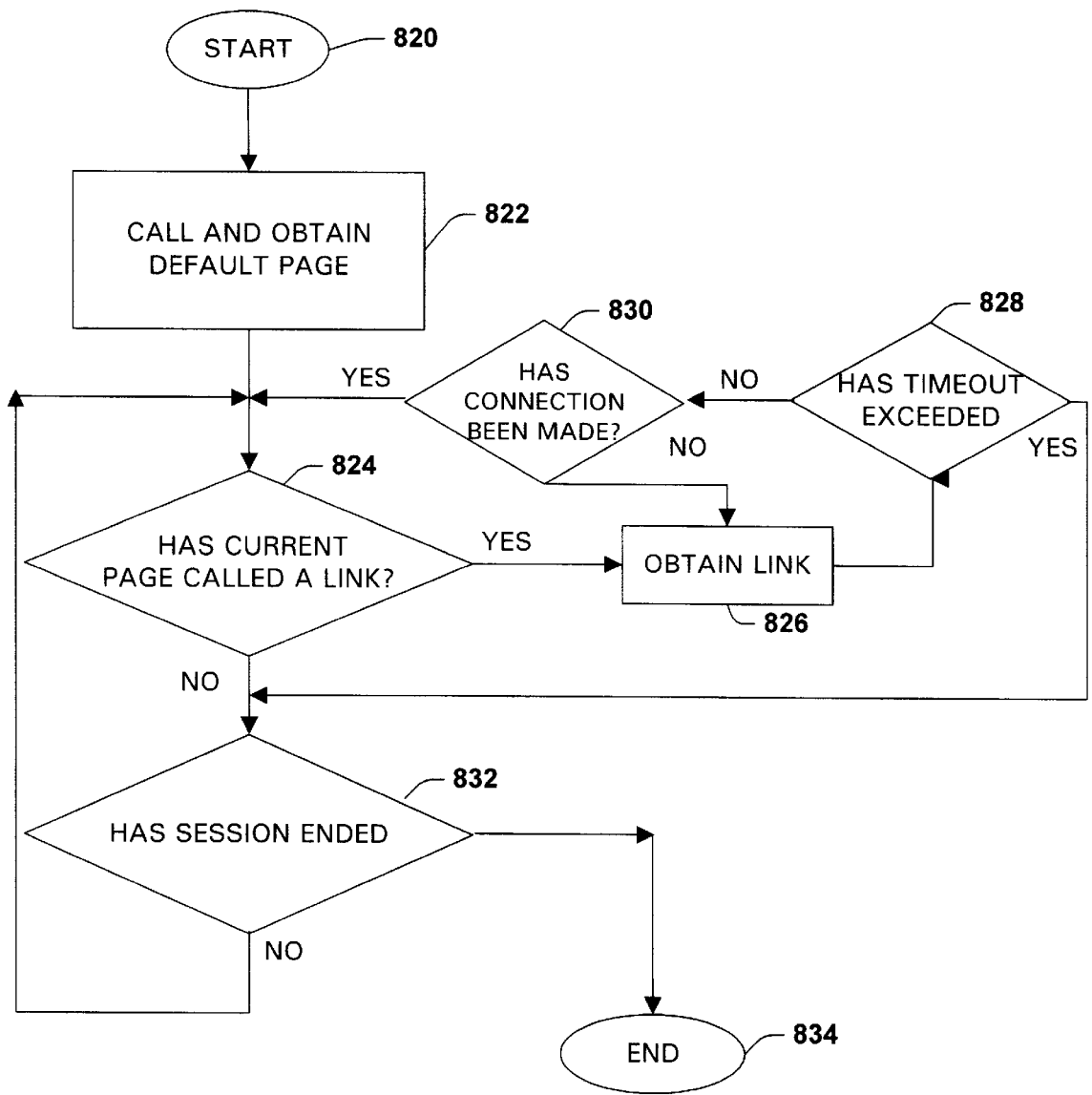
FIG. 25 is a flowchart representing operation of a general web browser in accordance with the present invention.

FIG. 25 relates to a general web browser in accordance with the present invention, and corresponds to the web browser state 802 (FIG. 24). At step 820 this aspect of the system is started and any necessary general initializations are performed. At step 822, the system calls and obtains a default web page. The default web page is generally employed to provide at least some sort of graphical interface to the user. Typically, the default web page is designed to provide general information relating to the system as well as general promotional information relating to the store, for example. After the default web page has been obtained, the system in step 824 determines if the current web page has been requested to call a link. If yes, the system in step 826 tries to obtain the requested link. In step 828 the system checks to see if the time out period for connecting to the link has expired. If no, the system proceeds to step 830. If yes, the system advances to step 832. In step 830, the system determines if the link connection has been made. If yes, the system returns to step 824. If no, the system moves to step 826. Returning back to step 828, the system will loop through the timeout period for a predetermined time (e.g., 3 minutes). If the connection has not been made within the allotted time the loop times out wherein the system proceeds to step 832 as mentioned above. If in step 824, the system determines that the current page has not called a link, the system proceeds to step 832 where it determines if the session has ended. If the session has been ended the system moves to step 834 and terminates the session. If the session is not ended, the system returns to step 824.

Figure 26:
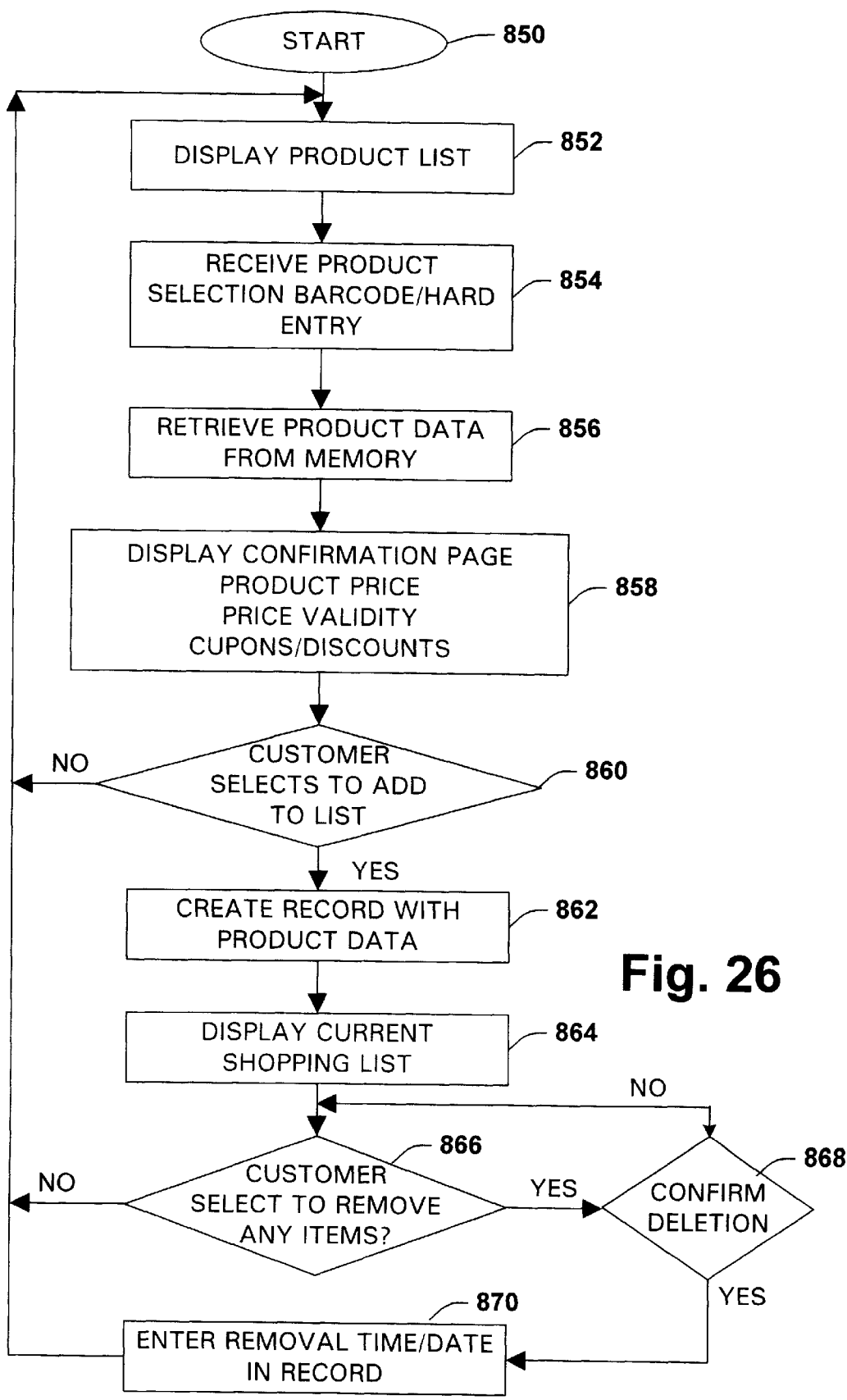
FIG. 26 is a flow diagram representing the process for a user to add an item to a product list according to one particular aspect of the present invention.

FIG. 26 is a flow diagram representing the process for a user to add an item to a shopping list according to one particular aspect of the present invention, and corresponds to state 804 (FIG. 24). At step 850 the system performs any general initializations necessary to carry out the following steps relating to FIG. 26. At step 850, the system displays the user's current product list to the user. This list is a list of the products that the user intends or desires to purchase in the future. In step 852, the user enters the product from his home terminal 26 into the system. The entry may be made by scanning the bar code 810 relating to the product or by manual entry by the user. In the case of bar code entry, the user can scan the bar code 810 from a coupon 987 for the product, for example. Another of the many possible ways for bar code entry would be for the user to scan a bar code 810 from an empty package or container of the product. Since the bar code 810 contains identifying indicia relating to the product, scanning the bar code 810 provides a quick and easy means for the user to enter the product. With respect to manual entry, the user can instruct the system that he/she desires to perform a manual entry. Any suitable method for making such a manual entry may be performed. For example, the user could type in key words and in response the system could provide a small list of items corresponding to the key words. Alternatively, the user could request to see an index of products carried by the store in order to make the manual selection.

In step 856, the system retrieves the product data from its memory. Then in step 858, the system displays to the user a confirmation page corresponding to the entered product. The confirmation page includes information relating to the product such as product price, product availability, coupons, discounts, term on coupons/discounts, etc. The confirmation page may also include a bit map image of the product in its packaging or possibly a bit map of a cooked version of the product to entice the user into selecting it.

In step 860, the user decides whether or not to add the product to his/her shopping list 984. If yes, the system proceeds to step 862. If no, the system returns to step 852.

In step 862, after the product has been selected to be added to the customer shopping list 984, the system creates a record with the product data. This record is created at both the host computer 12 and the customer computer 14. In step 864, the customer is displayed a current shopping list 984 with the added product. Next, the system moves to step 866 where the customer is prompted to remove any unwanted items from the shopping list 984. If no, the system returns to step 852. If yes, the system moves to step 868 where it confirms with the customer whether this is indeed an item that customer wants to remove from the list. If no, the system returns to step 866. If yes, the system proceeds to step 870 where the item is removed, and a record is created of the removal time and date. Preferably, this record is created only at the host computer 12. Such removal data can be used by the store and/or manufacturers to perform a study on consumer behavior.

Figure 27:
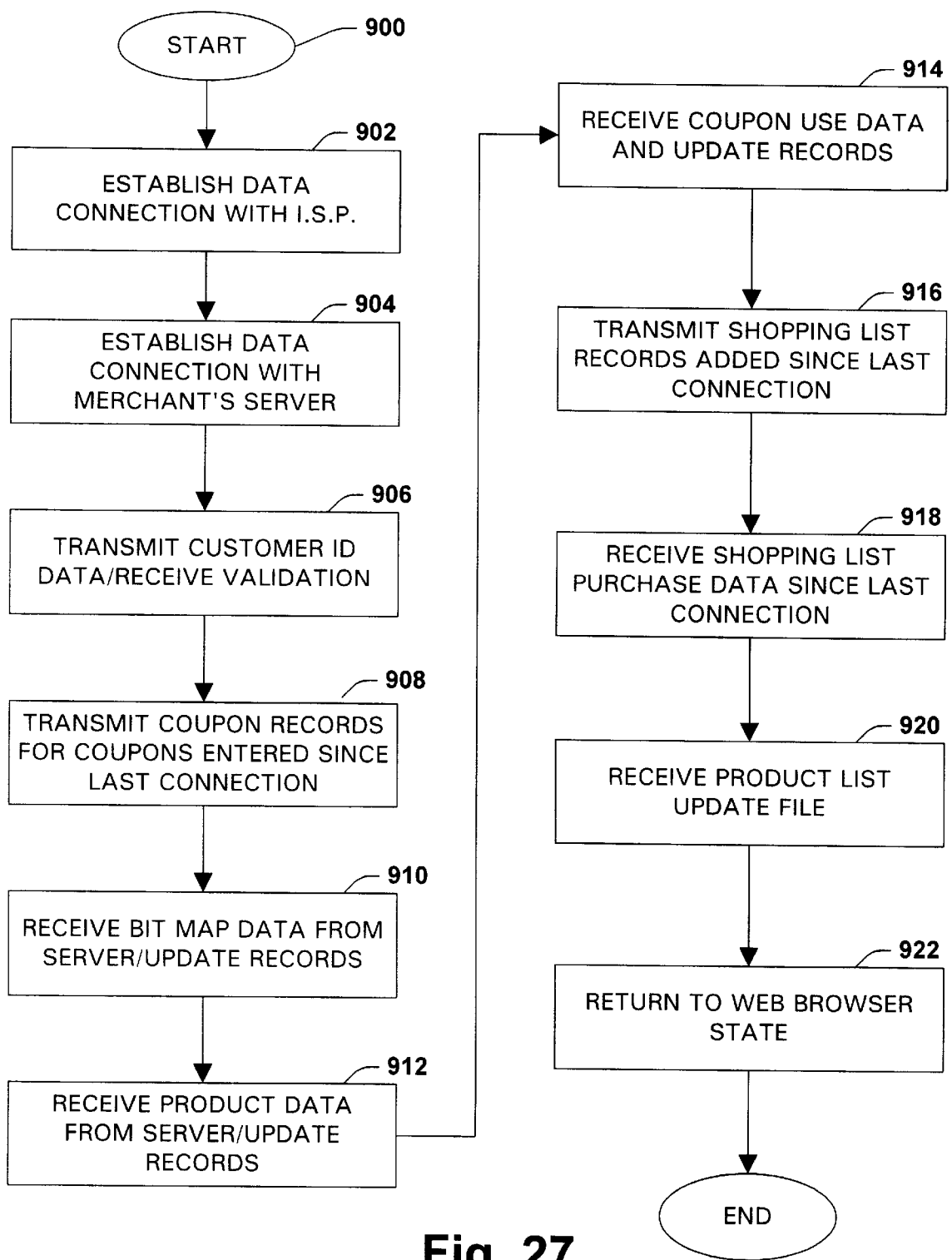
FIG. 27 is a flowchart of consumer home terminal (CHT) operations upon connection to the host computer 12 with respect to interaction with a cookie in accordance with the present invention.

FIG. 27 is a flowchart of consumer home terminal (CHT) operations upon connection to the host computer 12 with respect to interaction with a cookie, and corresponds to state 808 (FIG. 24). At step 900, the CHT 14 performs any general initializations necessary to carry on the following steps. In step 902, the CHT 14 establishes a data connection with the internet service provider (ISP) 32 (FIG. 1). After the ISP connection has been established, the system establishes a data connection with the merchant's host computer 12. Once this connection has been established the system in step 906 prompts the user transmit his/her customer ID. After a valid ID has been entered and validated, the system moves to step 908. In step 908, the CHT transmits the host computer coupon records entered since the last connection. Typically, the coupons are scanned into the CHT by the user in the herein described manner prior to step 902. However, the coupons may be entered (e.g., scanned) after step 906 and before step 908 if so desired.

Once the coupon records have been transmitted, the system in step 910 provides the CHT 26 with bit map data corresponding to the added coupons from the host 12.

In step 912 the CHT 26 receives product data from the host 12 and updates the product data record at the CHT 26; as mentioned above product data can correspond to price availability, discounts available, etc. Then in step 914 the system transmits to the user a coupon use data and update records. At this step the records of both the host computer 12 and the CHT 26 are matched and the consumer can view his/her coupon use. The coupon use data can also be employed by the store and manufacturers for tracking patterns relating to the coupon use by the consumer. After step 914, the system proceeds to step 916. In step 916 the user transmits shopping list records that have been added since his/her last connection. After step 916 the system compiles a shopping list 984 which is transmitted to the user, and received by the user in step 918. This shopping list 984 includes all of the newly added records additionally the user provided with a purchase data since the last connection. In step 920, the system provides the user of the CHT 26 with a product list update file which will contain the complete index list of all the products available. Then in step 922 the system returns to the web browser state 802 (FIG. 24).

Figure 28A:
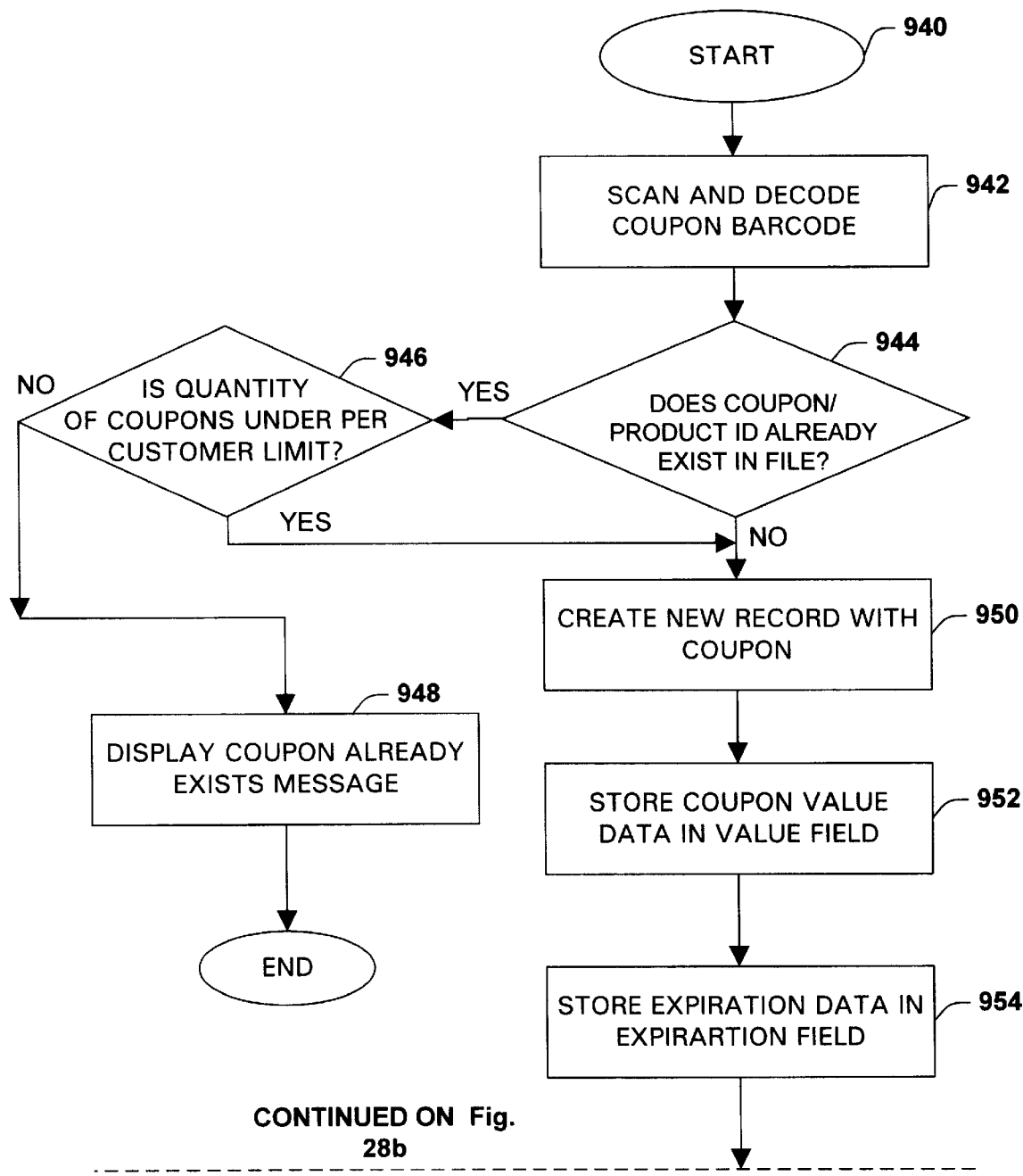
FIGS. 28a–28b is a flowchart depicting the coupon state in accordance with the present invention.
Figure 28B:
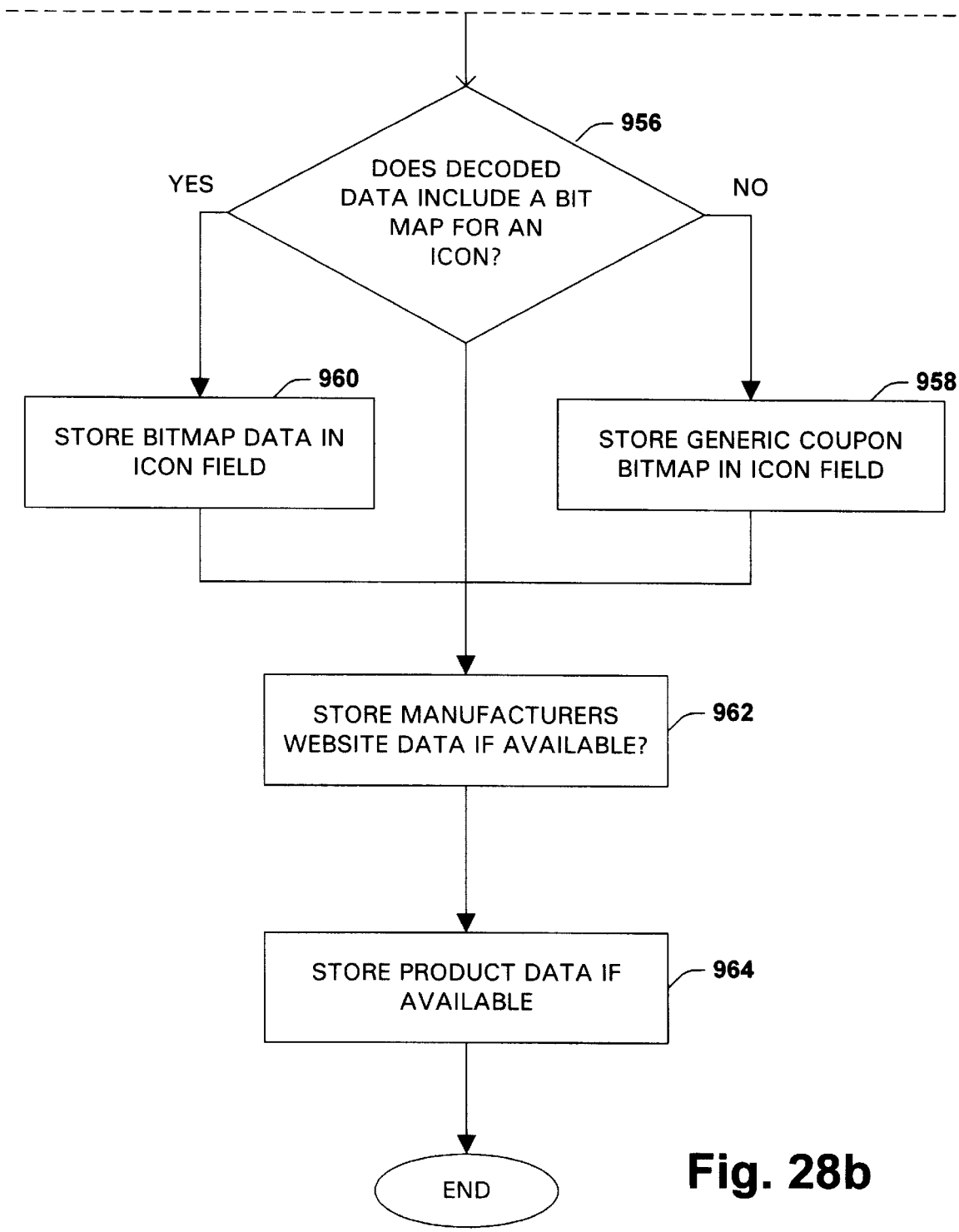

Turning now to FIGS. 28*a*–*b*, a flowchart is shown depicting the coupon state 806 (FIG. 24) with respect to the CHT 26. In step 940, any generalizations necessary to carry out the following steps are performed. In step 942 the coupon 987 is entered into the system by scanning and decoding of the coupon bar code 810. In step 944, the system determines if the coupon ID is already available or existing in the systems coupon file. If yes, the system proceeds to step 946, where the system determines if the quantity of coupons is under the customer limit. If yes, the system proceeds to step 950 If no, the system proceeds to step 948 where the consumer is notified that the coupon already exists. In other words, the consumer is notified that his or her limit has been exceeded with respect to that particular coupon. In step 950 a new record is created with respect to the scanned in coupon 987. Once a new record has been created, the system proceeds to step 952 where the coupon value data is stored in a value field. Then, the system proceeds to step 954 where the coupon expiration data is stored in an expiration field. After step 954 has been completed the system proceeds to step 956 where it determines if the decoded bar code data includes a bit map for an icon (See FIG. 37) corresponding to the particular coupon 987. If no, the system in step 958 stores a generic coupon bit map in the icon field. If yes, the system stores bit map data extracted from the decoded bar code data and stores this in the icon field. Next, the system proceeds to step 962 where the manufacturers web site data is stored if available. A manufacturers web site data would also be obtained from the extracted or decoded bar code data. Then, the system would proceed to step 964 where it would store product data also from the bar code data if available.

FIG. 29 shows a table representative of product list 970 in accordance with the present invention. The product list 970 includes information relating to every product available in the store. The information typically includes product description, UPC code for the product, product price, termination period for price quote, etc. The product list 970 may be stored in the memory 362*a* of the host 12. All of the product information generally only occupies about 4MB of memory, and thus this list 970 may be downloaded to the customer home terminal 26 for storage on its memory 362*c*. From the product list 970, the customer can create a shopping list 984 (FIG. 34) in accordance with the present invention as is described herein.

It will be appreciated that the shopping list 984 and coupon list 986 are similar in nature to the product list 970 in that they are merely tables storeable in memory. The shopping list 984 will be a smaller version of the product list and include only those products that the customer wishes to purchase. The coupon list 986 is another table which includes information relating to the various coupons scanned into the CHT 26 by the customer.

Turning now to FIG. 30, a web page depicting a customer coupon file is shown. The coupon file page 972 shows various icons 974 graphically informing the customer as to the nature of the product the coupon 987 is to be used for. Next to the icons 974 are product descriptions 976. Next to the product descriptions 976 is the value of the coupon and the expiration date of the coupons 987. As can be seen, the Tide® coupon is worth $0.75 and the coupon expires on Oct. 31, 1997. The cake mix coupon is dynamic in nature in that it is worth $0.50 if used by Aug. 31, 1997 and worth $0.25 if used between Aug. 31, 1997 and Dec. 31, 1997. The green bean coupon is worth $0.25 unless it is used on Sundays when it is worth double ($0.50). The cat food coupon is also dynamic in nature in that it is worth $0.25 normally, but if the customer also purchases cat litter it is worth $0.50. The milk coupon operates like a typical coupon worth $0.25 which expires on Apr. 30, 1997. Thus, the customer can quickly view all of his/her coupons while shopping or preparing to shop as a result of the present invention.

It will also be appreciated that the electronic nature of the coupons in accordance with the present invention facilitates reduction of misredemption of coupons as mentioned above since the coupons are electronically tied to the purchases of a particular customer.

FIGS. 31–33 show exemplary packet formats for coupon files, shopping list/purchase files and price look up files. The coupon file packet 978a includes company product identification field 978b. A coupon value field 978c includes information relating to the value of the coupon 987. This field 978b may include a formula for use in the case where the coupon value is dynamic in nature. An expiration field 978c includes data relating to when the coupon 987 expires. A bitmap icon field 978f includes data which may be used to generate an icon representing the product the coupon is to be used for. A manufacturer's website field 978g includes link information to the web site of the manufacturer which issued the coupon 987. A product data field 978h includes information relating the product the coupon is to be used for. A date used field 978j includes data relating to when the coupon was actually used by the customer.

FIG. 32 shows a customer shopping list/purchase log packet 980a. This packet includes a product identification field 980b which includes data for identifying the product. Field 980c includes data relating to the time the product was added to the shopping list 984. Field 980d includes data relating to the price the product will be sold for. The valid until field 980f includes data relating to how long the price quote for the product will remain in effect. Field 980g includes data relating to when the product was removed from the shopping list 984. Field 980h includes data relating to the time of purchase of the product. Field 980j includes data relating to what the customer paid for the product. Fields 980h and 980j include data which is only made available to the host 12 and possibly manufacturers 36. This data can be used for consumer trend and behavior analysis. Field 980k includes data which may be used for the generation of an icon graphically representing the product.

Turning now to FIG. 33, a price lookup packet 982a is shown. Field 982b includes UPC data relating to the product. Field 982c includes product description data. Field 982d includes customized bitmap data used by the merchant only for the generation of a customized icon for the product. Field 982f includes product price data, and field 982g includes data relating to how long the price will be valid.

FIG. 34 is a partial table representative of the shopping list 984. The shopping list can contain a variety of data relating to the products selected for future purchasing. It is to be understood that the scope of the present invention is intended to include a shopping list 984 including all such data relating to the products selected.

FIG. 35 is a partial table representative of the coupon list 986. The coupon list 986 can contain a variety of data relating to the coupons selected for future use. It is to be understood that the scope present invention is intended to include a coupon list 986 including all such data relating to the coupons selected and data relating to the respective products and their manufacturer's.

As noted above, the present invention provides for a system which avoids many of the problems associated with a paper coupon system; the difficulty associated with finding products in the store; the problems manufacturers face with advertising to customers; and the problems associated with conventional check-out procedures.

One particular way the present invention accomplishes the above is by allowing for a customer to scan coupons at home with a scanner associated with the CHT 26. The customer is able to modify data in a coupon file 986 (FIG. 35) by scanning the coupons into the home terminal 26.

At the store, the customer can use a shopping cart with a portable computing device (ie., CIT 14) attached thereto. The customer can identify himself/herself to the portable computing device 14. Once identified, the CIT 14 can assist the customer through the store for efficient shopping. The host computer 12 via the access points 18 and CIT 14 can guide the customer through the store in the most efficient manner. For example, the host computer 12 can generate a map (FIG. 39) and protocol for the user to find the products desired without having to go back and forth through the store.

Furthermore, the customer can scan the products found at the store with the bar code reader 90 attached to the CIT 14 before placing the products in the cart 84. This aspect along with the avoidance of handing over paper coupons at check-out substantially reduces the length of time necessary at the check-out line.

The portable computing device 14 can include a speaker 62 and a graphic interface 52 which manufacturers can use to advertise their products as well as provide information about its products to the customer. The retailers may also use the portable computing device 14 to provide the customer with recipes, store advertisements, etc. Icons can be displayed by the graphical interface 52 to promote the various products. The present invention can also be used to provide an easy link for the customer to the manufacturer's web site for product information.

Figure 36:
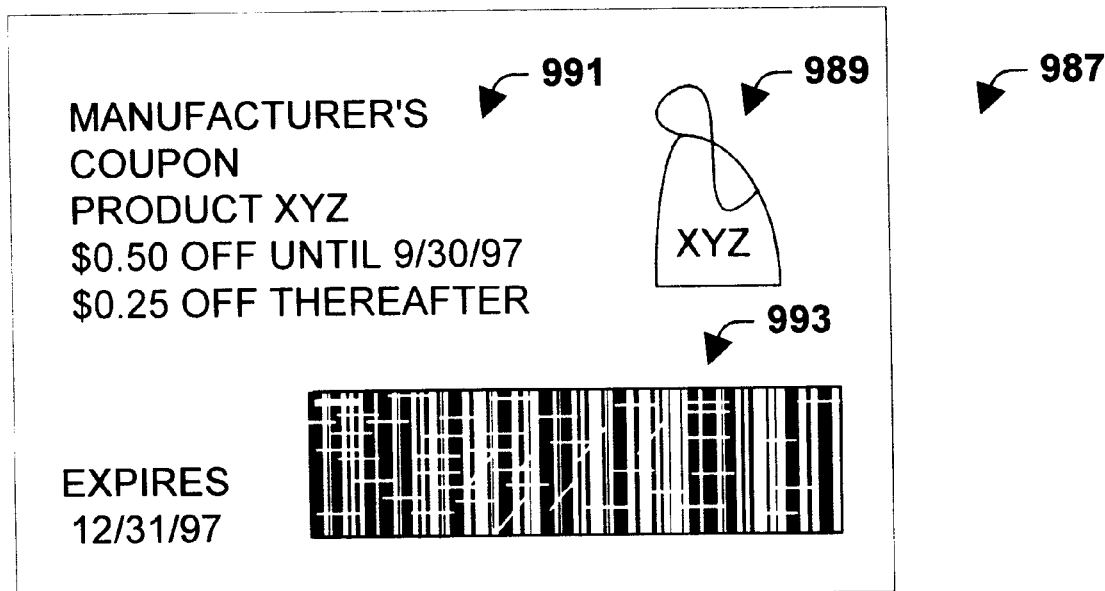
FIG. 36 is an illustration of a manufacturer's coupon in accordance with the present invention.

Referring now to FIG. 36, a manufacturer's coupon 987 is schematically shown in accordance with the present invention. The coupon 987 is typically printed on paper, however, any medium suitable for carrying out the present invention may be employed. The coupon 987 includes graphics 989 and text 991 as is conventional for providing a customer with information relating to the coupon 987 and the respective product the coupon 987 is to be applied against.

The coupon 987 also includes optically identifiable indicia 993, which in the preferred embodiment is a two-dimensional bar code. However, it will be appreciated that any suitable optically identifiable indicia may be employed to carry out the present invention. The bar code 993 is a type of dataform which provides for originally encoded data to be recovered for further use in a variety of ways. For example, the bar code 993 may be scanned to derive reflectance values which are digitized, stored in buffer memory and subsequently decoded to recover data encoded in the bar code 993. An image of the bar code or matrix code existing in a graphic image can be acquired by use of the scanner 420c or other suitable device which is capable of distinguishing between different reflectance values of light reflected from the dataform. Thus, for example, the bar code 993 typically includes black or dark colored bar type elements printed on a white or colored background area, with white or colored spaces between the bar code elements of the bar code. The spaces are typically the same color as the background area.

The present invention preferably employs a two-dimesional bar code which permits a greater amount of encoded data to be stored in a given bar code area. Instead of having a coding area occupied by a single row of bar code, as in a 1D bar code dataform, a 2D bar code dataform divides the total coding area into a plurality of multiple rows of bar code. Additionally, more sophisticated coding strategies have been developed which permit a greater density of data as compared to the original width varying format of UPC bar codes.

A two-dimensional bar code dataform is disclosed in U.S. application Ser. No. 08/280,490 filed on Jul. 26, 1994, entitled "Packet Bar Code Encoding and Decoding" which is incorporated in its entirety herein by reference.

The coupon's 2-D bar code 993 may include information relating to the price of the product, the value of the coupon, the expiration date of the coupon, diminishing value data relating to the coupon, icon data, bit-map data, manufacturer's website link data, etc.

More particularly, for example, the value of the coupon may be diminishing in value over time. Thus, if the customer does not use the coupon 987 by a particular date the value of the coupon can diminish as time passes. In other words, the coupon 987 may be designed to be dynamic in nature where its value is tied to predetermined criteria such as time of use, use in conjunction with other products, frequency of use, etc. Additionally, when the coupon 987 is scanned it may have a generic bitmap as a place holder for the CHT 14 until it matches the actual bitmap for what the product is. For example, if the product is Tide® the actual bitmap will look like a bottle of Tide® as opposed to a generic laundry bottle bitmap which is obtained from the optically identifiable indicia on the coupon. However, the actual bit map can be obtained from the 2-D bar code label so that when it is scanned in the CHT has the bitmap right away. Thus, the manufacturer can incorporate the actual bitmap for Tide®, for example, into the bar code of the coupon.

The 2-D bar code 993 may also contain manufacturer web site data which the CHT 26 can employ to access the web site of a manufacturer who printed the scanned coupon. For example, if the customer desired to know more about a particular cola, the customer could employ the present invention to scan the cola bar code label with the CHT 14. The bar code label having the website link for the manufacturer would be used by the CHT 14 to access the web page of the particular product. The manufacturer could also link the customer via the bar code information to a web page that advertises the particular product just scanned. It will be appreciated that the products themselves have bar codes thereon, and thus the customer could scan the bar code 993 on the product to reach similar results as described above with respect to the coupon bar code 993.

Figure 37:
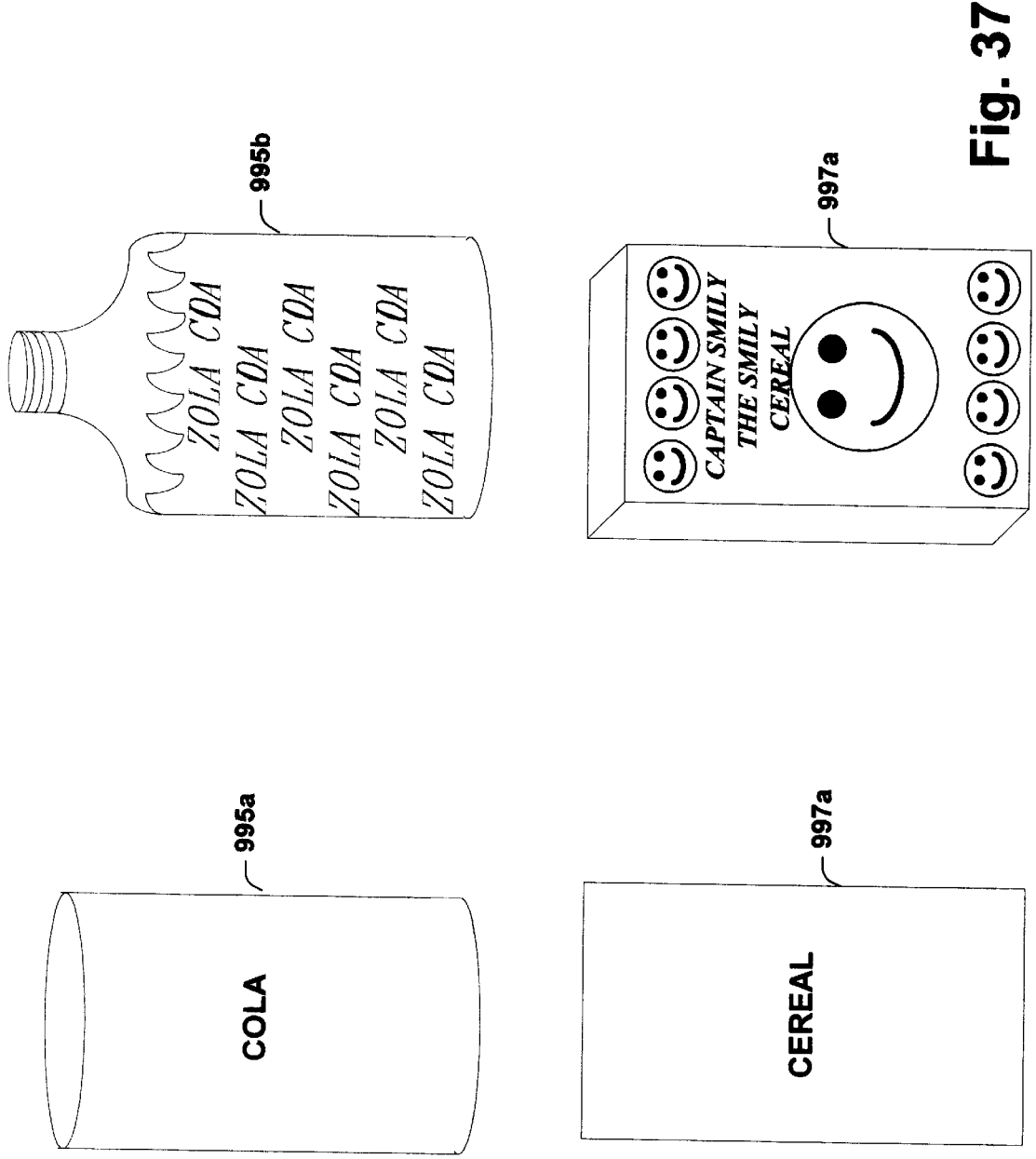
FIG. 37 is an illustration of generic icons and customized icons in accordance with the present invention.

FIG. 37 shows examples of generic icons and customized icons in accordance with the present invention. Icons are small graphical images displayed on the screen that represent certain objects (e.g., products). The use of icons is particularly useful, since the operator can quickly identify a particular object simply by the shape and appearance of the icon. The icons of the present invention may be designed to be manipulatable in a number of different ways, although the most typical is through use of a cursor control device (i.e., mouse) and a selection button located on the mouse. By manipulating the icon, the customer can access information and/or activate a program relating to a particular product, for example. The icon is typically displayed on the GUI as a static array of dots (i.e., pixels) on the display screen. Each icon is made up of an array of a number of display elements (e.g., small squares). By coloring some of the display elements black and others white, for example, a graphic image can be created. The graphic image created for each icon is stored in random access memory 358 or on a data storage device (e.g., bar code 993) as an icon bitmap. Each bit in the bitmap that is set to a value of one corresponds to a black display element in the icon, and bits in the bitmap set to zero correspond to white display elements. It will be appreciated that any suitable manner for the creation of icons may be employed in accordance with the present invention. Reference relating to the generation of icons may be found in U.S. Pat. No. 5,586,237 entitled METHOD FOR GENERATING AND DISPLAYING CONTENT-BASED DEPICTIONS OF COMPUTER GENERATED OBJECTS, assigned to Apple Computer, Inc., which is incorporated herein by reference in its entirety. For sake of brevity further discussion relating to the generation of icons is omitted.

A generic cola icon 995a is shown which provides a bar bones graphical representation of a cola product. Such an icon requires little memory for storage and can be easily encoded on a two-dimensional bar code 993 of a coupon. A customized icon 995b is also shown for a cola product. The cola product is Zola Cola and the icon 995b is a graphical representation of the actual Zola Cola bottle. This icon 995b has much more graphical detail and thus requires more memory storage. The manufacturer may opt to encode the customized icon 995b on the bar code 993 of a Zola Cola coupon or may simply encode a tag within the bar code 993 which would draw the CHT to a link at either the host 12, the ISP 32 or manufacturer's computer 36 to obtain the customized Zola Cola icon 995b.

Another generic icon is shown for a cereal icon 997a. Like the generic cola icon 995a, the generic cereal icon 997a is a low memory occupying bit-map image which may be encoded within the bar code 993 of a cereal coupon 987. A customized icon 997b is shown for Captain Smily Cereal. This customized icon 997b is also more detailed with respect to graphics than the generic cereal icon 997a. In the preferred embodiment, the manufacturer would encode a generic icon in the bar code 993 of the coupon 987, and set up a link for the CHT 26 to retrieve to the customized icon and/or receive it from the host 12, ISP 32 or manufacturer's server 36.

The availability of such customized icons which may be displayed on either or both of the CIT 14 and CHT 26 provides for a way for manufacturer's to further draw customers to their particular product.

Figure 38:
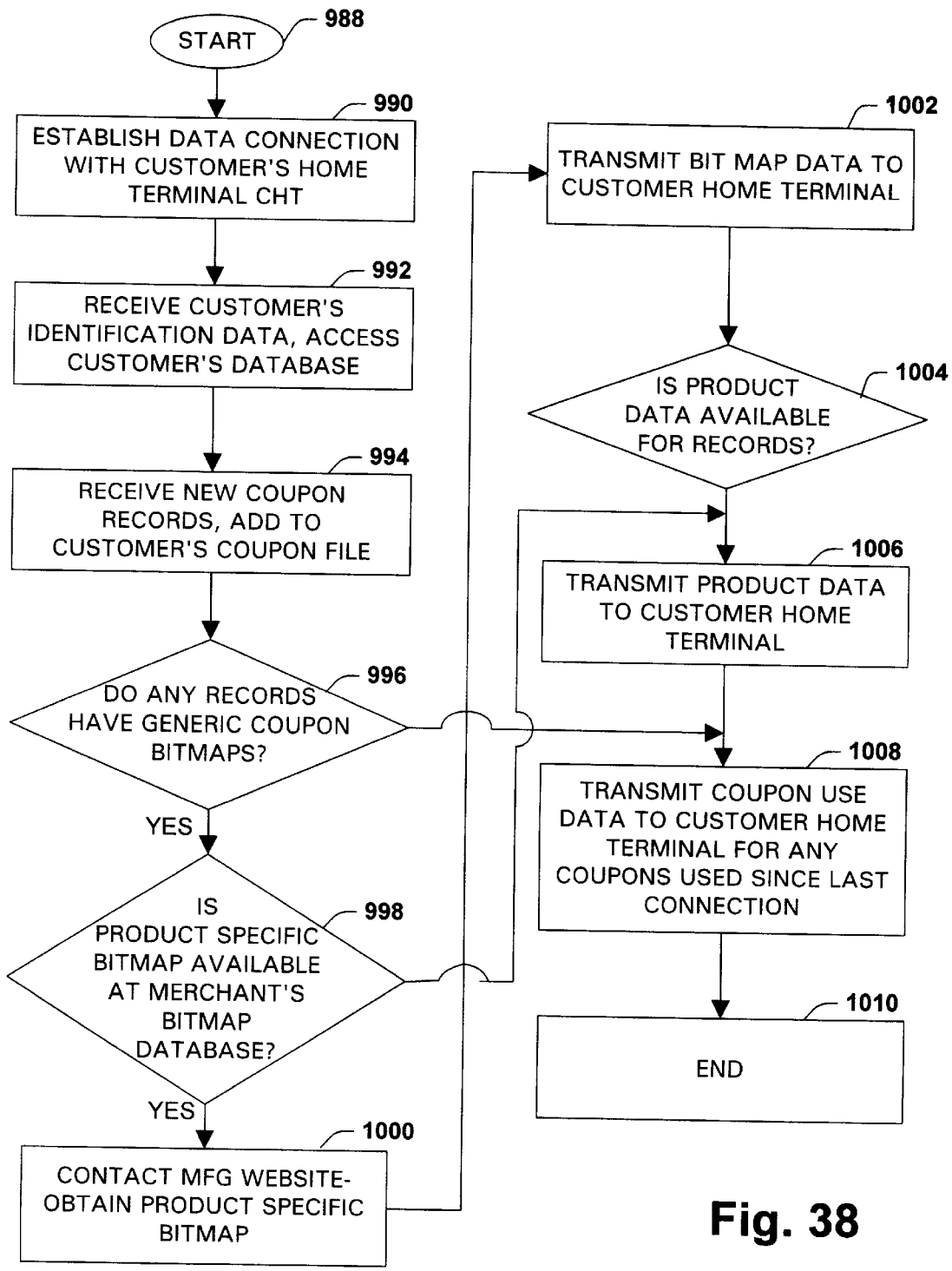
FIG. 38 is a flow chart relating to the obtaining of product specific bit map data from a merchants bit map database in accordance with the present invention.

Turning now to FIG. 38 a flow chart is shown relating to the obtaining of product specific bit map data from a merchants bit map database. In step 988 any generalization necessary to carry out the following steps is performed by the system. In step 990, a data connection is established between the customer's home terminal 26 and the host computer 12. In step 992, the system receives the customer's identification data and accesses the customer's database. In step 994, the system receives the new coupon records from the customer home terminal 26 and adds that to the customer's coupon file. Then in step 996 the system determines if any of the coupon records have generic coupon bit maps. If no, the system proceeds to step 998. If yes, the system proceeds to 980 where the system determines if product specific bit map data is available at the merchant's bit map database. In step 998, if such product specific bit map data is not available the system proceeds to step 996. If however such data is available the system advances to step 1000. In step 1000 the system contacts the manufacturers web site to obtain the product specific bit map data. In step 1002 after the product specific bit map data has been obtained, such bit map data is transmitted to the customer home terminal 26 by the system. Then, the system advances to step 1004 where it determines if product data is available for records. If no, the system advances to step 998. If yes, the system advances to step 1006 where such product data is transmitted to the customer home terminal. The system then advances to step 1008 where coupon use data is transmitted to the CHT 26 for any coupons used since the last connection.

One specific working example of the employment of the present example will now be provided for illustrative purposes only. It is to be appreciated that the present invention is not intended to be limited to only such an example, and that various iterations, combinations and variations of this example fall within the scope of the invention.

The present example relates to a customer deciding to go shopping in the near future. The customer may take the coupon section out of the Sunday paper for example and go to his home terminal 26. After activating the home terminal 26 so that it will operate in accordance with the present invention, the customer can peruse through the coupon section of the newspaper in search of coupons to be used for shopping. As desired coupons are found, the customer can scan the coupons into the computer via the scanner 420c (FIG. 9). As the coupons are scanned in they are added to a coupon file stored in the CHT 26. Additionally, as the coupons are scanned in, graphical and textual information relating to the coupon and the related is product is depicted on the screen. This information is primarily obtained from the information encoded on the bar code 993 of the coupon 987.

As mentioned above, the two-dimensional bar code 993 may contain information such as the value of the coupon, its diminishing value, expiration date, product identification information, generic and/or manufacturer specific icon information, etc. Typically, only generic iconic information is encoded on the bar code 993 due to memory constraints.

However, once the customer is linked to the merchant host computer 12 or the ISP 32 which provides manufacturer specific information, a customized icon (FIG. 37) will be made available to the customer. It will be appreciated that the manufacturers of products have an interest in attracting consumers to their products, and thus many will provide ISPs with customized icons to provide to customers for viewing.

After the customer has completed scanning in the coupons 987, he/she may decide to review his/her shopping list 984 and make additions or deletions. Also, as the coupons 987 are being added, the customer will be prompted if a coupon relating to a product is not found in the shopping list 984. The customer will then be prompted to add or not add the product to the shopping list 984. When making or updating the shopping list 984, the customer can view a store product list 970 containing information relating to every product available in the store. As mentioned above, this product list 970 generally only occupies 4MB of memory and thus can easily be stored on the customer's home terminal 26. The product list 970 will contain such data as UPC code, product description, price, duration of price, possibly generic icon data, etc.

After the shopping list 984 is completed, the customer can connect to the merchant's host computer 12 through the Internet, direct dial or any suitable manner. Once connected to the host computer 12, the coupon file, shopping file and product information between the host 12 and the CHT 26 will be compared and an updating will occur. The host 12 will update its version of the customer's coupon and shopping list 984. The host 12 will also update the CHT"s product list. The updating process will thus coordinate the files of both computers so that obsolete or invalid data is removed and both computers are current and consistent with respect to the various files.

More particularly, the customer's coupon file master is stored at the host computer 12, but because the host 12 and the CHT 26 are not connected all the time there has to be a duplicate stored at the customer's home terminal 26 and every time the host 12 and CHT connect a compare is done to update both files. If the customer has been shopping recently and some of the coupons have been used they will be removed from the coupon list file.

Once the coupon 987 is used, it will no longer show up in the file. This also prevents the customer from going home and scanning the coupon 987 again using it a later day. The coupon 987 can build into the bar code 993 information a limit as to how many times a customer may use the particular coupon 987. However, if the manufacturer is still obtaining its gross margins despite the coupon 987, the manufacturer may allow for the coupon 987 to be used an unlimited number of times within a given time period.

With respect to the shopping list 984, the customer can add things to the shopping list 984 from home as described herein. For example, when a coupon is scanned the processor 354 will prompt the customer to see whether the item should be added to the shopping list 984 as well. Or if a customer has used his/her last can of green beans he an scan it into the CHT 26 to add more green beans to shopping list 984. Again, the shopping list 984 at the host 12 and at the CHT 26 is updated every time they are connected. If the customer has just shopped, items will be removed from the list and if items are scanned in for adding they will be added to the list. The shopping list 984 requires the product ID code; the time the product was added to the shopping list 984; and a price quote.

The shopping list 984 will provide prices for products, and for how long that price is valid for. Then when the customer actually shops, he will pay the lower of the price the product is being offered at the store or the quoted price as long as the customer is in the time frame. Thus, the price quote remains in effect for the period of time noted to the customer.

Once the product is purchased the record relating thereto on the CHT 14 is deleted. However, the full record relating to the customer's interest in the product is maintained by the host computer 12. This full record can be used by manufacturer's for use in forecasting consumer trends and tracking consumer purchasing behavior.

Figure 39:
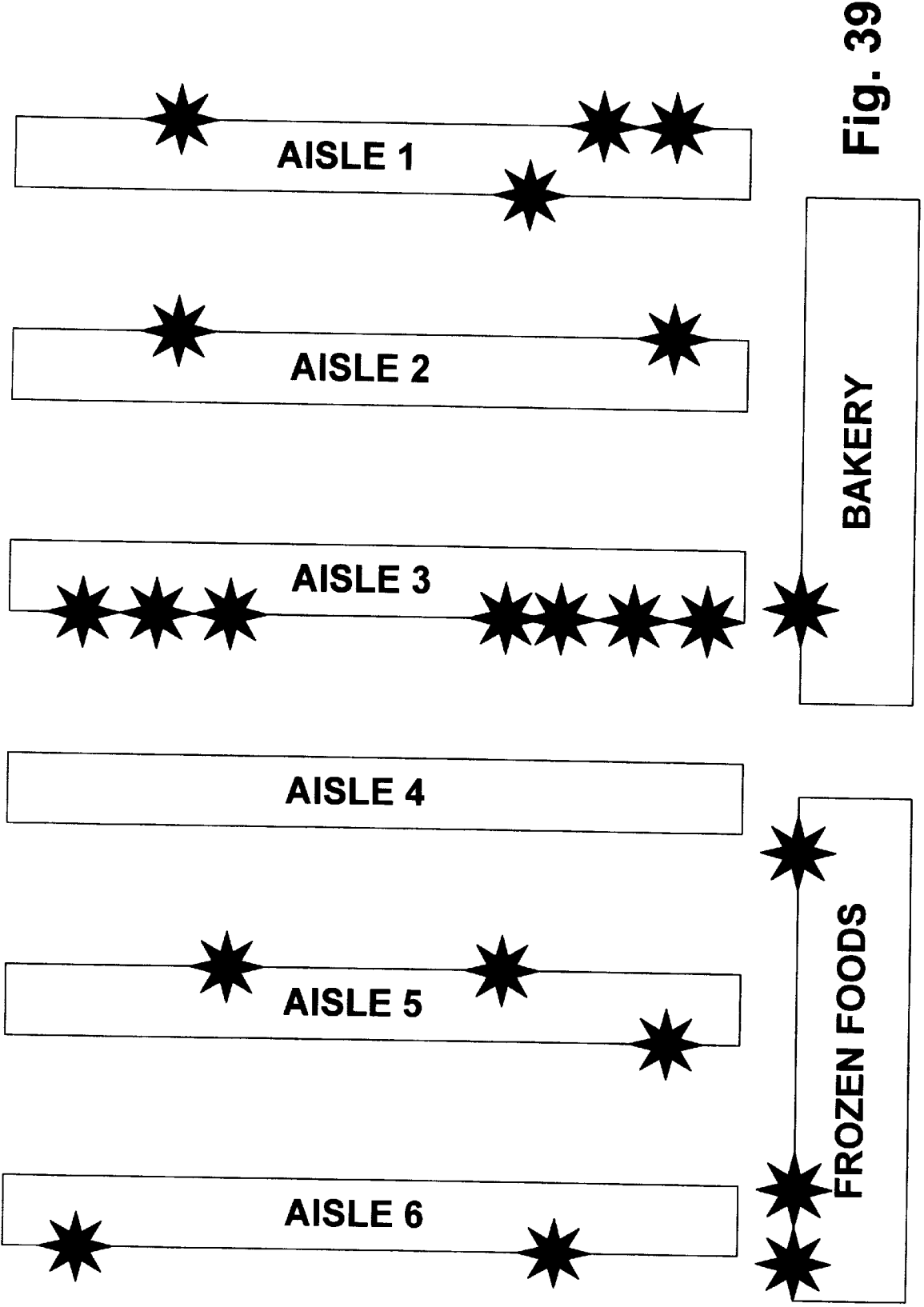
FIG. 39 is an HTML representation of the locations with a store of products on a customer shopping list in accordance with the present invention

Once the procedure at home is complete, the customer can go to the store at his/her leisure to obtain the products. When entering the store, the customer will pick up a cart 84 which has a customer information terminal (CIT) 14 mounted thereto in the manner discussed above. After the customer has properly logged on to the CIT 14, the host computer 12 will send the CIT 14 information relating to the particular customer. Such information will include the coupon file, the shopping list file, etc. The CIT 14 can display the location of the products within the store that are on the customer's shopping list 984 as shown in FIG. 39. In this way, the customer is avoided the problem of searching for hard to find products. As a result, the customer will only have to make a single pass through every aisle as opposed to haphazardly going back and forth between aisles.

Additionally, the CIT 14 can display customized web pages made by manufacturer's of the products on the customer's shopping list 984. Also, as the customer is walking along an aisle, for example, a proximity sensor detecting the presence of the CIT 14 could trigger the display 52 to show a web page relating to the sale of a particular product within the vicinity of the customer.

As the customer picks up products and scans them into the CIT 14, the shopping list 984 and coupon list 986 are updated to reflect the activity. If a customer decides to place the product back, the customer simply rescans the product and instructs the CIT 14 to remove the product. This step results in the shopping list 984 and coupon list 986 being updated to include the product again.

Once all of the products have been found by the customer, the customer can instruct the CIT 14 that the shopping has been completed. The CIT 14 can transmit this information to the host computer 12. The CIT 14 will prompt the customer as to what type of payment method (e.g., cash, check, charge, etc.) will be used. The host computer 12 will then select the next cashier available to process the customer's shopping cart. In this manner, the long lines at the cash register are reduced.

Thus, the present invention provides for avoiding many of the hassles associated with conventional coupon systems (e.g., clipping coupons) as well as retail and grocery store systems. The present invention makes shopping easier, faster and more enjoyable for customers. The present invention also reduces the costs associated with misredemption of coupons. Furthermore, the present invention provides a system which provides manufacturers with a way to better market their products and provide product information to customers.

The present invention includes all such equivalents and modifications, and is limited only by the scope of the following claims.

What is claimed is:

1. A shopping system network, comprising:
    a host computer coupleable to a network;
    a manufacturer's computer coupleable to the network;
    a customer computer coupleable to the network;
    an optical scanner coupleable to the customer computer; and
    a coupon including graphical indicia thereon and optically identifiable indicia thereon;
    wherein the optical scanner is adapted to scan the coupon when the customer computer is decoupled from the network, and wherein a customer can scan the coupon remote from the host computer with the optical scanner to provide the customer computer with the optically identifiable indicia which is processed by the customer computer to generate first data which is provided via the network to the host computer, the first data being used by the host computer to facilitate the customer's shopping;
    wherein the first data is used by the system to generate an icon representative of a product.

2. The shopping system of claim 1, wherein the host computer accesses the manufacturer's computer to facilitate generation of the icon.

3. The shopping system network of claim 1, wherein the customer computer accesses the manufacturer's computer to obtain additional product information.

4. The shopping system network of claim 1, wherein the optically identifiable indicia is a two-dimensional bar code.

5. A shopping system network, comprising:
    a host computer coupleable to a network;
    a manufacturer's computer coupleable to the network;
    a customer computer coupleable to the network;
    an optical scanner coupleable to the customer computer, and
    a coupon including graphical indicia thereon and optically identifiable indicia thereon the optically identifiable indicia being a two-dimensional bar code;
    wherein the optical scanner is adapted to scan the coupon when the customer computer is decoupled from the network, and wherein a customer can scan the coupon remote from the host computer with the optical scanner to provide the customer computer with the optically identifiable indicia which is processed by the customer computer to generate first data which is provided via the network to the host computer, the first data being used by the host computer to facilitate the customer's shopping;
    wherein the optically identifiable indicia provides the customer computer with a link to a web site of manufacturer's computer coupleable to the network.

6. The shopping system of claim 1, wherein the portable computing device includes a graphical interface, wherein the system provides the customer with graphical information to facilitate shopping.

7. A shopping system network, comprising:
    a host computer coupleable to a network;
    a manufacturer's computer coupleable to the network;
    a customer computer coupleable to the network;
    an optical scanner coupleable to the customer computer;
    a coupon including graphical indicia thereon and optically identifiable indicia thereon; and
    a portable computing device wirelessly coupleable to the network, the portable computing device includes a graphical interface, wherein the system provides the customer with graphical information to facilitate shopping, and the graphical information includes product advertising from a manufacturer computer coupleable to the network, the product advertising including iconic data;
    wherein the optical scanner is adapted to scan the coupon when the customer computer is decoupled from the network, and wherein a customer can scan the coupon remote from the host computer with the optical scanner to provide the customer computer with the optically identifiable indicia which is processed by the customer computer to generate first data which is provided via the network to the host computer, the first data being used by the host computer to facilitate the customer's shopping.

8. The shopping system of claim 1, further including optical sensors coupled to the host computer via a sub-network, the optical sensors being able to detect proximity of the portable computing device.

9. The shopping system of claim 1, wherein the portable computing device includes a speaker for providing the customer with audible information to facilitate shopping.

10. The shopping system network of claim 1, wherein the host computer stores a product list in a host computer memory and a client computer is communicatively coupleable to the host computer via the network, wherein a customer can generate a customer shopping list from the product list, wherein the client computer is situated at a remote location from the point of sale.

11. The shopping system network of claim 10, further including a scanner coupleable to the client computer; wherein the customer can scan at least one coupon into the client computer to generate a coupon list.

12. The shopping system of claim 11, wherein the host computer stores the shopping list and coupon list as a main customer shopping list and main customer coupon list in the host computer memory.

13. The shopping system of claim 12, wherein the product list is downloadable to the client computer.

14. The shopping system of claim 12, wherein the host computer generates a web page viewable from a customer information terminal; representative of the locations of the products listed on the main customer shopping list.

15. The shopping system of claim 12 further including a manufacturer's computer communicatively coupleable to the host computer via the network.

16. The shopping system of claim 15, wherein the manufacturer computer receives data relating to the purchase of its product by the customer.

17. The shopping system network in claim 1, wherein the host computer comprises at least one data processing device including a data storage adapted for selectively storing marketing data in a plurality of data fields, the data storage being selectively updateable in response to a customer scanning a product dataform, the data fields including a plurality of records, each record representing a discount available to a customer on a specific product and icon data including a graphic representation of the product and a trademark associated with the product; and a first data channel adapted for selectively communicating marketing data between a portable transaction computer and the data processing device;

wherein the portable transaction computer is adapted to update the data storage in response to the customer scanning the product dataform.

18. The shopping system of claim 17, wherein the portable transaction computer comprises:

a graphical user interface adapted to selectively display icon data representing data stored in the data storage;

a random access memory, a processor adapted to process instructions disposed in the random access memory, and a dataform reader adapted to allow the customer to scan the product dataform.

19. The shopping system network of claim 17, further including a second data channel adapted for selectively communicating with a product manufacturer's data processing device to obtain the icon data.

20. The shopping system network of claim 17, wherein the discount is at least one of:

(a) a fixed discount expiring on a specified date; and (b) a variable diminishing discount based on predetermined criteria.

21. The shopping system network of claim 20, wherein the predetermined criteria for varying the discount is a period of time.

22. The shopping system network of claim 20, wherein the predetermined criteria for varying the discount is related to the purchase of another product.

23. The shopping system network of claim 20, wherein the discount data for each specific product represents a discount available to the customer on such specified product, the discount being available to the customer because at least one of:

(a) the customer previously entered data from a printed coupon;

(b) the customer's demographic data matched a profile eligible for the discount; and (c) the customer's previous purchases matched a profile eligible for the discount.

24. The shopping system network of claim 23, wherein the printed coupon includes a two-dimensional bar code.

25. The shopping system network of claim 24, further including a customer home terminal including a bar code reader and a third data channel adapted to communicate discount data and icon data from the customer home terminal to the data processing device.

26. The shopping system network of claim 20, wherein the system further includes a position system for determining the portable transaction computer's location in the store, the data storage further including at least one of an audio and visual alert for the specific product and data representing the product's location in the store, the portable transaction computer adapted to alert a user when the portable transaction computer is in proximity of the specific product in the store.

27. The shopping system network of claim 20, wherein the portable transaction computer alerts the user of the discount via a graphical user interface.

28. The shopping system network of claim 20, wherein the portable transaction computer alerts the user of the discount via a speaker.

29. The shopping system of claim 1, wherein the customer computer is a portable customer information terminal wirelessly coupleable to the network, wherein the customer can view web pages on the customer information terminal of at least one of the product list and customer shopping list.

30. The shopping system of claim 5, further including a portable computer device wirelessly coupleable to the network.

* * * * *

UNITED STATES PATENT AND TRADEMARK OFFICE
CERTIFICATE OF CORRECTION

PATENT NO. : 6,314,406 B1
DATED : November 6, 2001
INVENTOR(S) : Timothy P. O'Hagan et al.

It is certified that error appears in the above-identified patent and that said Letters Patent is hereby corrected as shown below:

<u>Column 8,</u>
Line 43, please replace "(ite." with -- (i.e. --.

<u>Column 23,</u>
Line 11, please replace "Aug. 31, 1997" with -- Sept. 31, 1997 --.

Signed and Sealed this

Twenty-sixth Day of March, 2002

*Attest:*

*Attesting Officer*

JAMES E. ROGAN
*Director of the United States Patent and Trademark Office*